US006991852B2

(12) United States Patent
Carr et al.

(10) Patent No.: US 6,991,852 B2
(45) Date of Patent: Jan. 31, 2006

(54) SILICA-BASED MATERIALS AND METHODS

(75) Inventors: Peter W. Carr, St. Paul, MN (US); Marc A. Hillmyer, Minneapolis, MN (US); Huqun Liu, Lake Forest, CA (US); Hao Luo, Minneapolis, MN (US); Lianjia Ma, St. Paul, MN (US); Brian C. Trammell, Cranston, RI (US)

(73) Assignee: Regents of the University of Minnesota, Minneapolis, MN (US)

( * ) Notice: Subject to any disclaimer, the term of this patent is extended or adjusted under 35 U.S.C. 154(b) by 34 days.

(21) Appl. No.: 10/385,904

(22) Filed: Mar. 11, 2003

(65) Prior Publication Data

US 2003/0219597 A1 Nov. 27, 2003

Related U.S. Application Data

(60) Provisional application No. 60/364,424, filed on Mar. 13, 2002.

(51) Int. Cl.
B32B 9/04 (2006.01)

(52) U.S. Cl. .................... 428/447; 428/405; 428/407; 428/429; 428/702; 523/203; 523/212; 523/213; 523/216

(58) Field of Classification Search ......... 524/858–866; 523/203, 212, 213, 216; 428/447, 405, 407, 428/429, 702; 210/656, 660; 436/527

See application file for complete search history.

(56) References Cited

U.S. PATENT DOCUMENTS

| | | | |
|---|---|---|---|
| 3,936,388 A | | 2/1976 | Unger et al. |
| 4,017,528 A | | 4/1977 | Unger et al. |
| 4,169,069 A | | 9/1979 | Unger et al. |
| 4,539,061 A | | 9/1985 | Sagiv |
| 4,705,725 A | | 11/1987 | Glajch et al. |
| 4,746,572 A | | 5/1988 | Glajch et al. |
| 4,847,159 A | | 7/1989 | Glajch et al. |
| 4,919,804 A | | 4/1990 | Dorsey et al. |
| 5,015,373 A | | 5/1991 | Carr et al. |
| 5,134,110 A | | 7/1992 | Sudo et al. |
| 5,141,634 A | | 8/1992 | Carr et al. |
| 5,188,899 A | * | 2/1993 | Matsumoto et al. ........ 428/405 |
| 5,205,929 A | | 4/1993 | Carr et al. |
| 5,209,976 A | | 5/1993 | Ogawa |
| 5,271,833 A | | 12/1993 | Funkenbusch et al. |
| 5,385,988 A | * | 1/1995 | Yamamoto et al. ......... 525/479 |
| 5,540,834 A | | 7/1996 | Carr et al. |
| 5,599,625 A | | 2/1997 | Wirth et al. |
| 5,716,705 A | | 2/1998 | Wirth et al. |
| 5,750,258 A | | 5/1998 | Sakai et al. |
| 5,856,379 A | | 1/1999 | Shiratsuchi et al. |
| 5,869,724 A | | 2/1999 | Kirkland et al. |
| 6,210,790 B1 | | 4/2001 | Crivello |
| 6,528,604 B1 | | 3/2003 | Eriyama et al. |
| 2002/0070168 A1 | | 6/2002 | Jiang et al. |

OTHER PUBLICATIONS

Hanson et al., "A Model for Polybutadiene Coatings on Porous Silica," *Chromatographia*, 1993;35:403–409.
Li et al., "A Study of the Efficiency of Polybutadiene–Coated Zirconia as a Reversed–Phase Chromatographic Support," *Anal. Chem.*, 1997;69:2193–2201.
Li et al., "Factors influencing polybutadiene deposition within porous chromatographic zirconia," *J. Chromatogr. A*, 1997;791:45–52.
Nawrocki et al., "Part II. Chromatography using ultra–stable metal oxide–based stationary phases for HPLC," *J. Chromatogr. A*, Feb. 27, 2004;1028(I):31–62.
Neimark et al., "Fractal Analysis of the Distribution of High–Viscosity Fluids in Porous Supports," *J. Phys. Chem.*, 1993;97:6011–6015.
Reeder et al., "Models for polybutadiene pore wall coatings in porous zirconia," *J. Chromatogr. A*, 1997;760:71–79.
Sudo et al., "Characteristics of octadecylsilylated silica gels end–capped by high–temperature silylation," *J. Chromatogr.*, 1998; 813(2):239–46.
Sudo, "Optimization of end–capping of octadecyl–silylated silica gels by high–temperature silylation," *J. Chromatogr.*, 1997; 757(1+2):21–8.
Sudo, "End–capping of octadecylsilated silica gels by high–temperature silylation," *J. Chromatogr.*, 1996; 737(2):139–47.
Trammell et al., "A study of the Lewis acid–base interactions of vinylphosphonic acid–modified polybutadiene–coated zirconia," *Anal. Chem.*, 2001, 73:3323–31.
Trammell et al., "Novel approaches to overcoming the Lewis acidity of polybutadiene–coated zirconia," *Pittsburgh Conference on Analytical Chemistry and Applied Spectroscopy*, Oral Presentation Abstract, New Orleans, LA, Mar. 1, 2001, 1 pg.
Trammell et al., "A study of the Lewis acid–base interactions of vinylphosphonic acid modified polybutadiene–coated zirconia," *HPLC 2001 Conference*, Poster Presentation Abstract, Maastricht, The Netherlands, Jun. 2001, 1 pg.
Trammell et al., "Multi–layer, two–dimensionally polymerized stationary phases: an approach for greatly enhancing the pH stability of RPLC silica," *Pittsburgh Conference on Analytical Chemistry and Applied Spectroscopy*, Oral Presentation Abstract, New Orleans, LA, Mar. 17, 2002, 1 pg.
Trammell et al., "Multi–layer, two–dimensionally polymerized stationary phases: an approach for greatly enhancing the pH stability of RPLC silica," *HPLC 2002 Conference*, Oral Presentation Abstract, Montreal, Canada, Jun. 6–7, 2002, 1 pg.

(Continued)

*Primary Examiner*—Randy Gulakowski
*Assistant Examiner*—Christopher Keehan
(74) *Attorney, Agent, or Firm*—Mueting, Raasch & Gebhardt, P.A.

(57) ABSTRACT

A silica-based material that includes a silica-based substrate and a polymerized organic material disposed thereon. The polymerized organic material is made from reactive organic moieties bonded to the silica-based substrate.

75 Claims, 25 Drawing Sheets

OTHER PUBLICATIONS

Trammell et al., "Highly cross–linked self–assembled monolayer stationary phases: an approach to greatly enhancing the low pH stability of silica–based stationary phases," *Anal. Chem.,* 2002; 74(18):4634–9.

Trammell (abstract), *Carr Research Group* [online]. [retrieved Apr. 3, 2003]. Retrieved from the Internet: <http://www.chem.umn.edu/groups/carr/Brian.html>, 3 pgs.

Tsyurupa et al., "Use of the hyper–crosslinked polystyrene sorbents "Styrosorb" for solid phase extraction of phenols from water," *Fresenius' Journal of Analytical Chemistry,* 1995; 352(7/8):672–5.

Neue et al., "Properties of reversed phase packings with an embedded polar group," *Chromatographia,* 2001; 54(3/4):169–77.

Odian, "Principles of Polymerization, Third Edition," New York, 1991; title page, publication page, pp. 198, 200, 452–454.

Olah, "Friedel–Crafts and Related Reactions, Interscience Publishers," New York, NY, 1963; title page, table of contents, 3 pgs.

Ossenkamp et al., "New approaches to surface–alkoxylated silica with increased hydrolytic stability," *Chem. Mater.,* 2001; 13(11):3975–80.

Pesek et al., "The synthesis, characterization and modification of hydride silica surfaces," *Chemically Modified Surfaces, Proceedings of the Symposium on Chemically Modified Surfaces,* 1992; 57–72.

Pesek et al., "Synthesis of chemically bonded liquid crystals for high–performance liquid chromatography," *J. Chromatogr.,* 1991; 556(1–2)373–81.

Pesek et al., "Synthesis of a propyldimethylphenylsilane stationary phase using the ally bonded phase as an intermediate," *Chromatographia,* 1990, 30(7/8):442–6.

Roberts et al., "Polymerization (polycondensation) of alkanes over fluosulfonic acid and antimony pentafluoride," *J. Macromolecular Science, Chemistry,* 1973; 7(8):1629–40.

Sandoval et al., "Hydrolytically stable bonded chromatographic phases prepared through hydrosilation of olefins on a hydride–modified silica intermediate," *Anal.Chem.,* 1991; 63(22):2634–41.

Sandoval et al., "Synthesis and characterization of a hydride–modified porous silica material as an intermediate in the preparation of chemically bonded chromatographic stationary phases," *Anal. Chem.,* 1989; 61:2067–75.

Satoh et al., "Direct living cationic polymerization of p–hydroxystyrene with boron trifluoride etherate in the presence of water[1]," *Macromolecules,* 2000; 33(15):5405–10.

Sentell et al., "Ultrasound driven synthesis of reversed–phase stationary phases for liquid chromatography using 4–dimethylaminopyridine as acid–acceptor," *J. Chromatogr.,* 1988; 455:95–104.

Aguilar et al., "High–resolution reversed–phase high–performance liquid chromatography of peptides and proteins," *Methods in Enzymology,* 1996; 270:3–27.

Ascah et al., "Characterization and high performance liquid chromatographic evaluation of a new amide–functionalized reversed phase column," *J. Liq. Chrom. and Rel. Technol.,* 1996; 19(17&18):3049–73.

Baleizão et al., "On the activity of chiral chromium salen complexes covalently bound to solid silicates for the enantioselective epoxide ring opening," *Applied Catalysis, A: General,* 2002; 228:279–88.

Berthod, "Silica: backbone material of liquid chromatographic column packings," *J. Chromatogr.,* 1991; 549(1–2):1–28.

Buchmeiser, "New synthetic ways for the preparation of high–performance liquid chromatography supports,"0 *J. Chromatogr.,* 2001; 918(2):233–66.

Carr, "Advantages of HPLC with Ultra Stable ZR02 Based Phases," Grant Abstract, Grant No. 5R01GM054585–07 [online]. *National Institute of Health,* Aug. 1, 1996 to Jul. 31, 2003 [retrieved on Mar. 27, 2003]. Retrieved from the Internet: <URL:http://commons.cit.nih.gov/crisp3/CRISP_LIB.getdoc?textkey=6525827&p_grant_num=5R01GM054585–07&p_query=&ticket=2938203&p_audit_session_id=14516579&p$_{keywords}$=>; 2 pgs.

Cheng et al., "Hybrid organic–inorganic particle technology: breaking through traditional barriers of HPLC separations," *LC–GC,* 2000; 18(11):1162.

Chojnowski et al., "Cationic polymerization of a model cyclotrisiloxane with mixed siloxane units inititated by a protic acid. Mechanism of polymer chain formation," *Macromolecules,* 2002; 35(27):9904–12.

Chu et al., "A new approach for the preparation of a hydride–modified substrate used as an intermediate in the synthesis of surface–bonded materials," *Anal. Chem.,* 1993; 65:808–16.

Unger et al., "Recent developments in the evaluation of chemically bonded silica packings for liquid chromatography," *J. Chromatography,* 1976; 125(1):115–127.

Vydac, "The Handbook of Analysis and Purification of Peptides and Proteins by Reversed Phase HPLC," 3$^{rd}$ Edition, *W.R. Grace & Co.–Conn.,* Baltimore, MD, available online at www.gracevydac.com, 2002, title page and table of contents only, 2 pgs.

Wade, Jr., "Organic Chemistry, 4$^{th}$ Edition," New York, 1999; title page, publication page and table of contents only.

Waters, "A Review of Waters' New Hybrid Particle Technology and its Use in HPLC," *Waters Corporation,* Milford, MA, 1999; 4 pages.

Wheaton et al., "Chapter 6: Synthesis of ion–exchange resins," *Ion Exch.,* 1969; 2:191–234.

Wirth et al., "Mixed self–assembled monolayers in chemical separations," *Science,* 1997; 275(3):44–7.

Wirth et al., "Horizontal polymerization of mixed trifunctional silanes on silica. 2. Application to chromatographic silica gel," *Anal. Chem.,* 1993; 65:822–6.

Kirkland et al., "High pH mobile phase eeffects on silica–based reversed–phase high–performance liliquid chromatographic columns," *J. Chromatogr.,* 1995; 691:3–19.

Kirkland et al., "Synthesis and characterization of highly stable bonded phases for high–performance liquid chromatography column packings," *Anal. Chem.,* 1989; 61:2–11.

Kirkland et al., "Bidentate silane stationary phases for reversed–phase high–performance liquid chromatography," *Anal. Chem.,* 1998; 70:4344–52.

Kirkland et al., "Stability of silica–based, endcapped columns with pH 7 and 11 mobile phases for reversed–phase high–performance liquid chromatography," *J. Chromatogr.,* 1997; 762:97–112.

Kirkland et al., "Reversed–phase high–performance liquid chromatography of basic compounds at pH 11 silica–based column packings," *J. Chromatogr.,* 1987; 797:111–120.

Lork et al., "Role of the functional group in n–octyldimethylsilanes in the synthesis of $C_8$ reversed–phase silica packings for high–performance liquid chromatography," *J. Chromatogr.,* 1986; 352:199–211.

Luo (abstract), *Carr Research Group* [online]. [retrieved Apr. 3, 2003]. Retrieved from the Internet: <http://www.chem.umn.edu/groups/carr/Hao.html>, 2 pgs.

Ma (abstract), *Carr Research Group* [online]. [retrieved Apr. 3, 2003]. Retrieved from the Internet: <http://www.chem.umn.edu/groups/carr/Leo.html>, 2 pgs.

McCalley, "Reversed–phase HPLC of basic samples—an update," *LC–GC,* 1999; 17(5):11 pgs.

Meyers, ed., "Encyclopedia of Analytical Chemistry, Applications, Theory and Instrumentation," New York, 2001; title page, publication page, tabe of contents; 15 pgs.

Nawrocki, "The silanol group and its role liquid chromatography," *J. Chromatogr.,* 1997; 779–29–71.

Neue et al., "Use of high–performance LC packings from pH 1 to pH12," *American Laboratory,* 1999; 31(22): 36–39.

Claessens et al., "Effect of buffers on silica–based column stability in reversed–phase high–performance liquid chromatography," *J. Chromatogr.,* 1996; 728:259–70.

Doyle et al., "Reversed–phase HPLC: preparation and characterization of reversed–phase stationary phases," *Chromatographic Science Series, Handbook of HPLC,* 1998; 78:293–323.

Engelhardt et al., "Alkoxy silanes for the preparation of silica based stationary phases with bonded polar functional groups," *J. Liq. Chrom.,* 1987; 10(8&9):1999–2022.

Fairbank et al., "Use of methyl spacers in a mixed horizontally polymerized stationary phase," *Anal. Chem.,* 1995; 67(21):3879–85.

Fairbank et al., "Role of surface–adsorbed water in the horizontal polymerization of trichlorosilanes," *J. Chromatogr.,* 1999; 830–285–91.

Faust et al., eds., *Cationic Polymerization: Fundamentals and Applications,* 1997, Washington DC, title page, publication page, table of contents, 4 pgs.

Glajch et al., "Effect of column degradation on the reversed–phase high–performance liquid chromatographic separation of peptides and proteins," *J. Chromatogr.,* 1987; 384:81–90.

"Guide to Reversed Phase HPLC of Peptides and Proteins," *Thermo Hypersil–Keystone Scientific,* 1999; title page, table of contents only; 2 pgs.

Hair, "Infrared Spectroscopy in Surface Chemistry," New York, 1967; title page, publication page, p. 76.

Iler, "The Chemistry of Silica: Solubility, Polymerization, Colloid and Surface Properties, and Biochemistry," New York, 1979; title page, publication page, pp. 676–69.

Kallury et al., "Effect of surface water and base catalysis on the silanization of silica by (aminopropyl) alkoxysilanes studied by x–ray photoelectron spectroscopy and $^{13}C$ cross–polarizaton/magic angle spinning nuclear magnetic resonance," *Langmuir,* 1994; 10(2):492–9.

Fukui et al., "Formation of Polymethylsiloxane Network on Metal Oxides by Chemical Vapor Deposition of 1, 3, 5, 7–Tetramethylcyclotetrasiloxane," *Controlled Interphases in Composite Materials,* 1990:469–478.

Kutsuna et al., "Synthesis and characterization of highly stable polymer–coated aminosilica packing material for high–performance liquid chromatography," *Journal of Chromatography,* 1993; 635:187–193.

"Liquid Chromatography Columns," *Analytical Chemistry,* 1986;58(8):876–878.

Ohtsu et al., "Structures and Chromatographic Characteristics of Capsule–Type Silica Gels Coated with Hydrophobic Polymers in Reversed–Phase Liquid Chromatography," *Chromatographia,* 1987;24:380–384.

Ohtsu et al., "Performance of Polymer–Coated Silica $C_{18}$ Packing Materials Prepared from High–Purity Silica Gel. The Suppression of Undesirable Secondary Retention Processes," *Journal of Chromatography,* 1989;481:147–157.

Shirota et al., "Characterization of Polymer–Coated $C_{18}$ Packing Materials for Reversed–Phase Liquid Chromatography," *Journal of Chromatographic Science,* 1990;28:553–558.

Wilkström et al., "Gas Phase Silylation, a Rapid method for Preparation of High–Performance Liquid Chromatography Supports," *Journal of Chromatography,* 1988;455:105–117.

\* cited by examiner

Derivatization Steps 1 and 2

Chloromethylation of HS-DM-CMPES and Secondary Crosslinking

Octylbenzene Derivatization

Derivatization Steps 3 and 4

Benzene
Endcapping

Residual Cl
Hydrolysis

Synthesis of PEI-DM-CMPES

DM-CMPES        PEI-DM-CMPES

Example 6. Hydrophobic Highly Crosslinked C8 phase vs. Sterically Protected C18

Example 11. C8-SH-TVS vs. Sterically Protected C18

Example 12. Hydrophilic Highly Crosslinked C8 phase vs. Sterically Protected C18

Figure 15A
Figure 15B
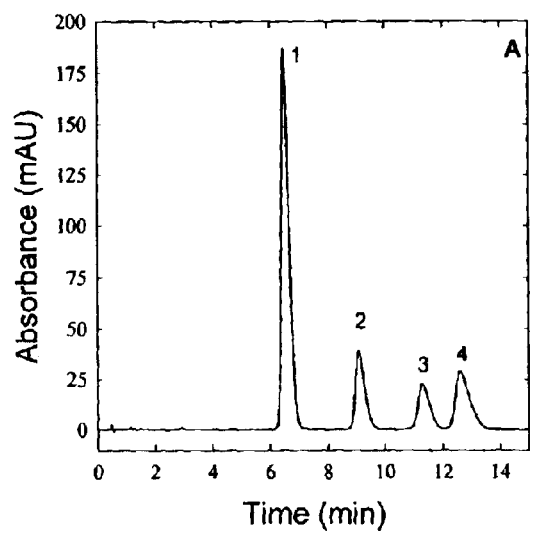
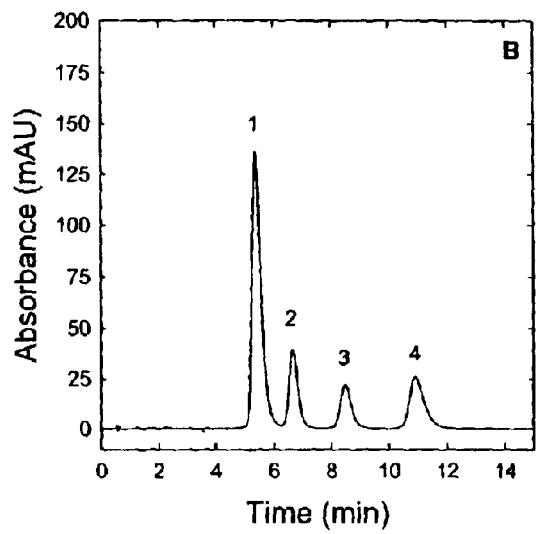

Figure 19A
Figure 19B
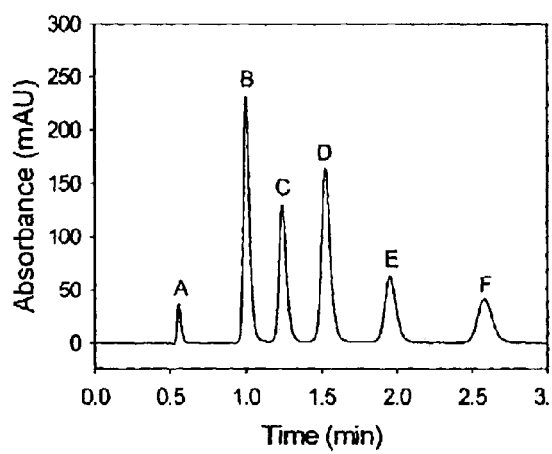
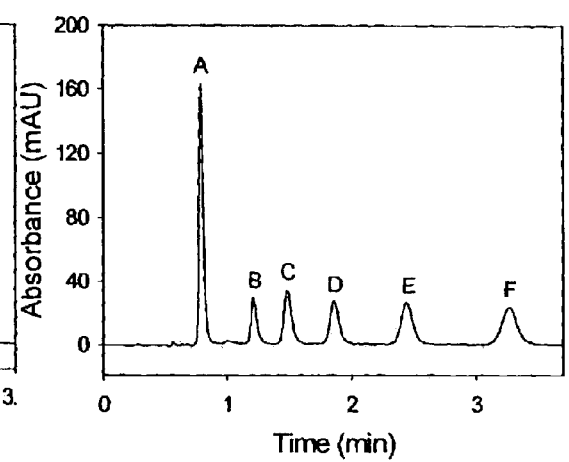

Demonstration of Network Polymer

Before HF digestion to remove silica    After HF removal of silica

SILICA-BASED MATERIALS AND METHODS

CROSS-REFERENCE TO RELATED APPLICATIONS

The present application claims priority to U.S. Provisional Patent Application Ser. No. 60/364,424, filed on Mar. 13, 2002, which is incorporated herein by reference.

STATEMENT OF GOVERNMENT RIGHTS

This work was supported in part by the National Institutes of Health under Grant Abstract Number 5R01GM054585-07. The government may have certain rights in the invention.

BACKGROUND

The majority of separations employing high-pressure liquid chromatography (HPLC) are performed in the so-called reversed-phase liquid chromatographic (RPLC) mode. In this mode, the column-packing material is referred to as the stationary phase. In RPLC the stationary phase is typically non-polar. The eluent, also referred to as the mobile phase, used to elute the various components from the stationary phase is relatively polar. It can include, for example, an aqueous buffer or a mixture of water and an organic solvent, e.g., an alcohol. Its polarity can be changed by increasing the concentration of the less polar liquid (the alcohol) in the mobile phase, a technique known in the art.

Reversed-phase HPLC is finding increased use in the area of bioprocessing because of HPLC's great ability to separate and purify biological materials. At the preparative scale, there are many unique considerations not applicable at the analytical scale. One such consideration is the need to sterilize a chromatography column prior to its use in the purification of a product intended for biological or human use. Another is the desirability of using larger particles, typically greater than 20 microns (i.e., micrometers or $\mu$m) in average particle diameter.

Among solid support materials, including synthetic organic polymers and metal oxides such as silica, alumina, titania, and zirconia, silica is by far the most widely used support for HPLC and almost the exclusively used support for RPLC stationary phases. The high mechanical stability, monodisperse particle sizes, high surface area, and easily tailored pore size distributions make silica an ideal choice for efficient analytical RPLC columns.

Silane bonding chemistry also allows for a wide variety of stationary phases with different selectivities to be made on silica. The most commonly used stationary phases feature a non-polar ligand covalently bound to a porous silica particle through one or more siloxane bonds (Si—O—Si) to render the surface hydrophobic. The most familiar type of silica-based RPLC stationary phase is the dimethyloctadecylsilane bonded phase.

Although these conventional silica-based bonded phases are very useful for a wide range of applications in RPLC, their routine use is limited to the pH range of between about 2 and 8. The poor stability of conventional columns under low pH conditions seriously inhibits the use of pH as a mobile phase variable in separation optimization. Low pH mobile phases hydrolyze the siloxane bond between the bonded silane and the silica surface resulting in a continuous loss of chromatographic retention and the attendant irreproducibility in performance.

Thus, it is particularly desirable to have an acid-stable silica-based material that can be used with acidic mobile phases. Low pH mobile phases are particularly useful for the HPLC separation of a wide variety of silanophilic solutes such as basic drugs, peptides, and proteins and they have found wide use when HPLC is combined with mass spectrometric detection. At sufficiently low pH, acidic mobile phases suppress or completely eliminate deleterious interactions between positively charged solutes and the surface by protonating the surface silanol groups. This often results in peak shapes and efficiencies far superior to that achieved for the separation of the same solutes with neutral mobile phases.

As mentioned above, in addition to the use of a pH-stable support material, the production of a stable, reversed-phase material also requires a process for modifying the support material, which results in a stable, hydrophobic surface. Silylation is the most widely used method to derivatize silica particles to produce hydrophobic reversed-phase supports.

A synthetic approach for enhancing the low pH stability of silica-based bonded phases has been achieved using a bulky silane to sterically protect the silane stationary phases as disclosed in J. J. Kirkland, *Analytical Chem.*, 61, 2–11 (1989); U.S. Pat. No. 4,705,725 (Glajch et al.); and U.S. Pat. No. 4,847,159 (Glajch et al.). Such sterically protected material is schematically shown in FIG. 1A. A synthetic approach for enhancing the high pH stability of silica-based bonded phases has been achieved using a bidentate silane with extensive endcapping as disclosed in J. J. Kirkland, *Analytical Chem.*, 61, 2–11 (1989); and U.S. Pat. No. 4,746,572 (Glajch et al.). Such material is schematically shown in FIG. 1B.

A synthetic approach for enhancing both the high and low pH stability of silica-based bonded phases has been achieved using a self-assembled monolayer (SAM) of alkyl chains with siloxane bonding between the self-assembled moieties in the SAM layer as well as siloxane bonds between the SAM layer and the silica as disclosed in R. W. P. Fairbank et al., *Analytical Chem.*, 67, 3879–3885 (1995); U.S. Pat. No. 5,716,705 (Wirth et al.); and U.S. Pat. No. 5,599,625 (Wirth et al.). Such material is schematically shown in FIG. 1C.

An alternate approach to silylation for modifying the surface polarity of inorganic bodies is the sorption of a preformed polymer (typically having a rather high molecular weight, e.g., 3000 or more) of desired polarity/functionality onto a $SiO_2$ support surface followed by crosslinking of the individual preformed polymer chains to one another to impart stability to the coating. Reversed-phase supports prepared in this fashion exhibit much improved low pH stability compared to those prepared by silylation. It is important to recognize, however, that the formation of a stable, crosslinked preformed polymer layer on the surface of the support does not reduce the need for a stable, inorganic support, since it is not possible to cover the entire inorganic surface. Although crosslinking of the polymer may keep it in place even as the underlying inorganic support dissolves, dissolution of the support will undoubtedly lead to a reduction in the mechanical stability of the support. In addition, problems related to increasing column back pressure are known to accompany the dissolution of the inorganic support and its subsequent appearance in the mobile phase and transport through the column and the accompanying instrumentation. Furthermore, the deposition of preformed polymers gives surfaces that are non-uniformly coated and can cause pore blockage of porous substrates.

SUMMARY

The present invention is directed to silica-based materials and methods of making. These materials have some level of acid stability. Particularly preferred embodiments of the silica-based material include porous particulate material (e.g., silica gel) with significant acid stability (preferably stable at a temperature of up to 150° C. and within a pH range of less than 7 down to 0.5, and more preferably stable at a pH of 0.5 at 150° C.). As such, they are useful as chromatographic stationary phases. These particularly preferred materials have dramatically improved acid stability compared to any currently available silica-based stationary phase.

The materials of the present invention are made by providing a silica-based substrate with reactive organic moieties bonded thereto. Typically, this substrate is created by bonding a monolayer of an organosilane having reactive organic moieties. These reactive organic moieties are then polymerized (which can include crosslinking). In one preferred embodiment this occurs by Friedel-Crafts crosslinking of the reactive moieties with their neighbors and/or by addition of one or more secondary, crosslinkable reagents. This phase can then be further modified (e.g., endcapped with an octyl ($C_8$) group) if desired.

In one embodiment, the silica-based material includes a silica-based substrate and an in situ polymerized organic material disposed thereon, wherein the polymerized organic material is made from reactive organic moieties bonded to the silica-based substrate.

In another embodiment, the silica-based material includes a silica-based substrate and an in situ polymerized organic material bonded to the silica-based substrate, with the proviso that there is substantially no residual nonbonded organic polymer disposed on the silica-based substrate.

In another embodiment, the silica-based material includes a silica-based core having pores and a network of crosslinked organic material bonded to the silica-based core and conforming to the surfaces of the pores.

In another embodiment, the silica-based material is preparable by a method that includes: providing a silica-based substrate having reactive organic moieties; and causing the reactive organic moieties to react with themselves, a secondary, reactive, crosslinking agent, or both to form a polymerized organic material disposed on the silica based substrate.

The present invention also provides various methods of preparation of the materials described herein.

In one embodiment, a method is provided that includes: providing a silica-based substrate having reactive organic moieties; and causing the reactive organic moieties to react with themselves, a secondary, reactive, crosslinking agent, or both to form a polymerized organic material disposed on the silica-based substrate. The method can optionally further include a step of combining the polymerized material with a different secondary, reactive, crosslinking agent to form a crosslinked network of polymerized organic material.

In another embodiment, a method is provided that includes: providing a silica-based substrate and an organosilane having reactive organic moieties; reacting the silica-based substrate with the organosilane to provide reactive organic moieties bonded to the silica-based substrate; and causing the reactive organic moieties to react with themselves, a secondary, reactive, crosslinking agent, or both to form a polymerized organic material bonded to the silica-based substrate with substantially no nonbonded organic polymer.

In another embodiment, a method is provided that includes: providing a silica-based substrate and an organosilane having reactive organic moieties; bonding the organosilane to the silica-based substrate; and polymerizing the organosilane bonded to the silica-based substrate to form an acid-stable silica-based material comprising a silica-based substrate and a polymerized organosilane material disposed on the silica-based substrate.

In another embodiment, a method is provided that includes: providing a silica-based substrate and an organosilane having reactive organic moieties; bonding the organosilane to the silica-based substrate; and polymerizing the organosilane bonded to the silica-based substrate using a Friedel-Crafts reaction to form an acid-stable silica-based material that includes a silica-based substrate and a polymerized organosilane material disposed on the silica-based substrate.

In another embodiment, a method is provided that includes: providing a silica-based substrate and an organosilane having reactive organic moieties; bonding the organosilane to the silica-based substrate; and polymerizing the organosilane bonded to the silica-based substrate to form an acid-stable silica-based material that includes a silica-based substrate and a polymerized organosilane material disposed on the substrate; wherein polymerizing comprises combining the organosilane bonded to the silica-based substrate with a polyvalent nucleophilic reagent.

As used herein, polymerizable organic material includes reactive organic groups that are capable of undergoing any of a variety of polymerization, self-condensation, or crosslinking reactions, including, for example, materials capable of reacting with secondary crosslinking agents. As used herein, polymerized organic material includes that which has undergone any of a variety of polymerization, self-condensation, or crosslinking reactions, including, for example, materials that have incorporated therein one or more secondary, reactive, crosslinking agents.

The polymerizable material preferably includes a polymerizable organosilane bonded to the silica-based substrate, which typically forms a monolayer (i.e., a single molecule in dimension). This monolayer can be a simple or monomolecular monolayer (i.e., a material that does not include siloxane bonds) or a self-assembled monolayer (i.e., a material that includes siloxane bonds). Although the polymerizable material is typically bonded (i.e., chemically bonded) to the silica-based substrate, the polymerized organic material can be bonded (i.e., chemically bonded) to the silica-based substrate or otherwise disposed thereon.

The silica-based substrate having reactive organic moieties thereon can be formed by reacting a silica-based substrate with an organosilane having reactive organic moieties. Alternatively, the reactive organic moieties can be formed during a process of forming the silica-based substrate.

The organosilanes are preferably selected from the group consisting of a halosilane, an alkoxysilane, an unsaturated silane, a hydrosilane, a disilazane, a cyclic siloxane, an aminosilane, a carboxylic-functional silane, an epoxysilane, and combinations thereof. Preferred such materials include a chlorosilane (e.g., chloromethylphenylethyltrichlorosilane or dimethyl-chloromethylphenylethylchlorosilane) and trivinylchlorosilane.

The polymerizable material can be polymerized, for example, by self-condensing the reactive organic moieties or by crosslinking the reactive organic moieties with a secondary, reactive, crosslinking agent.

The secondary, reactive, crosslinking agent can include a variety of reactive functional groups. The crosslinking agents are selected to be reactive with the reactive moieties bonded to the silica-based substrate. Preferred crosslinking agents include unsaturated hydrocarbons such as aromatic hydrocarbons (e.g., triphenylmethane, diphenylmethane, oligomers of styrene, biphenyl, terphenyl, naphthalene, anthracene, alkylated derivatives thereof, or combinations thereof), polyvalent nucleophilic reagents (e.g., a polyethyleneimine, a triamine, a polyvinylamine, a polyvinylalcohol, a diol, a triol, a higher polyol, a dithiol, a trithiol, or combinations thereof), and polyvalent electrophilic reagents (e.g., polyhalides and diacid halides). Various combinations of crosslinking agents can be used if desired. For example, the polymerized material can be further activated (e.g., by addition of $CH_3OCH_2Cl$) and reacted with a different crosslinking agent. This can be repeated a number of times with the same or different crosslinking agents. Alternatively, the activated polymerized material (e.g., with —$CH_2Cl$ groups) can be further modified with a nucleophilic reagent (e.g., benzene, toluene, octylbenzene, 1-hexene, or combinations thereof) and/or water to hydrolyze any residual halide groups, for example.

As used herein, "a," "an," "the," "at least one," and "one or more" are used interchangeably. Also herein, the recitations of numerical ranges by endpoints include all numbers subsumed within that range (e.g., 1 to 5 includes 1, 1.5, 2, 2.75, 3, 3.80, 4, 5, etc.).

The above summary of the present invention is not intended to describe each disclosed embodiment or every implementation of the present invention. The description that follows more particularly exemplifies illustrative embodiments.

BRIEF DESCRIPTION OF THE DRAWINGS

The following figures, which are idealized, are not to scale and are intended to be merely illustrative and non-limiting.

FIGS. 15A–B. Chromatograms showing the separation of basic drugs on select stationary phases at pH=2.0. A: Sterically protected $C_{18}$; 22/78 0.1% TFA in ACN/0.1% TFA in $H_2O$, pH=2.0. B: Highly crosslinked $C_8$ (Example 5); 15/85 0.1% TFA in ACN/0.1% TFA in $H_2O$, pH=2.0. Solutes: 1=Perphenazine, 2=Desipramine, 3=Nortriptyline, 4=Amitriptyline, T=35° C.; Flow Rate=1.0 ml/min.

FIG. 19A. Chromatogram showing the separation of alkylphenones on Highly Crosslinked Polyethyleneimine DM-CMPES Phase (Example 8). Solutes: A=Uracil, B=acetophenone, C=propiophenone, D=butyrophenone, E=pentanophenone, F=hexanophenone (plate count: 3371). Mobile Phase: 40/60 ACN/$H_2O$, Temperature: 30° C., Flow rate: 1 mL/min.

FIG. 19B. Chromatogram showing the separation of neutral compounds on Highly Crosslinked Polyethyleneimine DM-CMPES Phase (Example 8). Solutes: A=benzyl alcohol, B=benzene, C=toluene, D=ethylbenzene, E=propylbenzene, F=butylbenzene (plate count: 3538). Mobile Phase: 40/60 ACN/H$_2$O, Temperature: 30° C., Flow rate: 1 mL/min.

DETAILED DESCRIPTION OF ILLUSTRATIVE EMBODIMENTS OF THE INVENTION

The present invention provides a silica-based material that demonstrates at least some level of stability under acidic conditions. The material includes a silica-based substrate and a polymerized organic material disposed on the substrate. The silica-based substrate is one that includes silica (SiO$_2$), and optionally other components. The substrate can be glass, quarts, silicon substrates with a silica surface, other silicaceous materials, etc.

Figure 2:
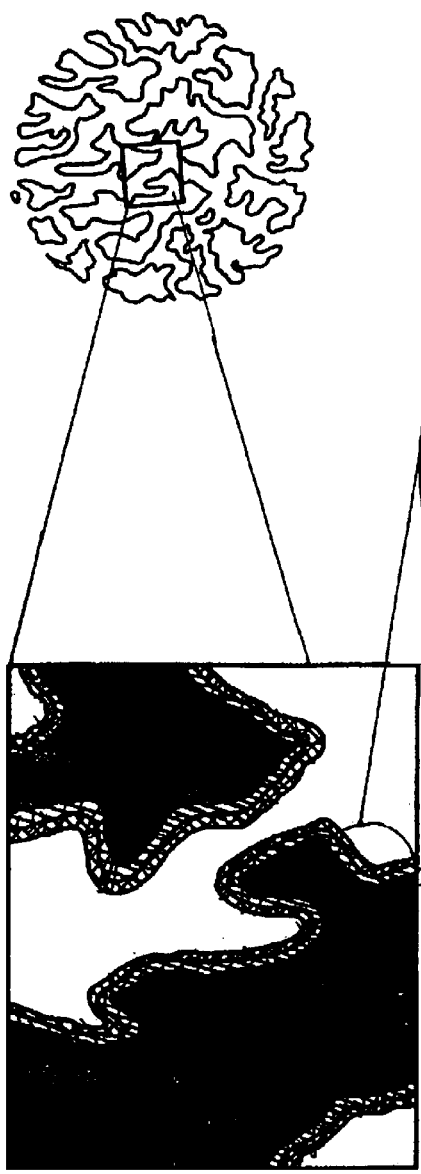
FIG. 2. Illustration of a porous silica particle with crosslinked C8 material thereon prepared according to one embodiment of the present invention.
Figure 2:
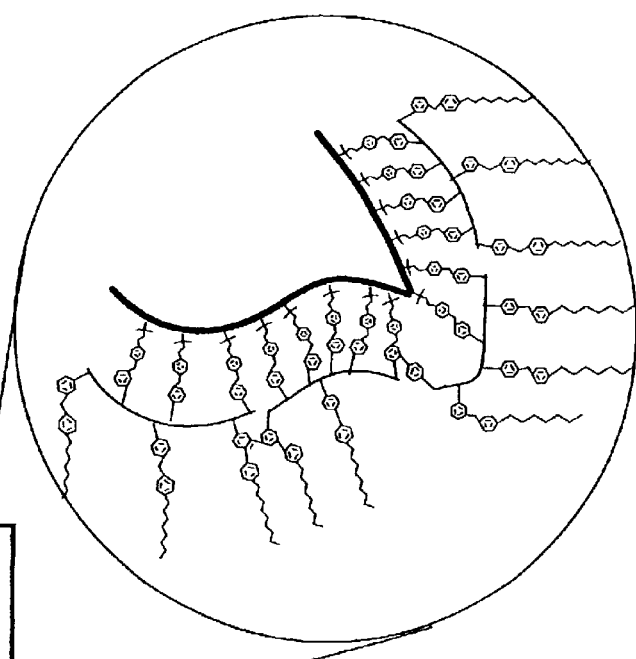

Preferably, for certain applications (e.g., as chromatographic solid supports), the substrate is in the form of particulate material (e.g., silica gel) and the polymerized organic material surrounds the particulate material (e.g., each particle thereby forms a core). If the material is porous, the polymerized organic material typically conforms to the surfaces of the pores, as seen in FIG. 2. These organic groups can be crosslinked by self-condensation or by using a secondary, reactive, crosslinking agent (a multivalent compound).

Preferably, the polymerized organic material includes organic groups bonded together in a highly branched, highly interconnected network in which preferably all the organic groups are bonded with other organic groups in the structure (preferably, this network is one giant molecule surrounding the entire surface of the silica). Herein, the term "polymerized" organic material is used to encompass materials prepared by polymerizing, crosslinking, or both, and can include those that are self-crosslinked and/or crosslinked using a secondary crosslinking agent. Thus, for certain embodiments the polymerized organic material forms a crosslinked network.

Preferably, the silica-based material of the present invention has a surface density of at least 1.0, more preferably at least 2.0, even more preferably at least 2.5 micromoles of organic material per meter squared ($\mu$m/m$^2$) of surface area of the silica-based substrate. Commercially available sterically protected C$_{18}$ stationary phase (e.g., ZORBAX from Agilent) has a surface density of 1.8–1.9 $\mu$m/m$^2$. It is also believed that the materials described in U.S. Pat. No. 4,746,572 (Glajch et al.) and U.S. Pat. No. 4,847,159 (Glajch et al.) would have similar surface densities (1.8–1.9 $\mu$m/m$^2$). This can be calculated using the method described in the Examples Section.

The polymerized organic material can include a preformed polymer (e.g., polyethyleneimine), which is used as a secondary crosslinking agent, although the initially deposited material (e.g., organosilane) is a monomeric compound. That is, the polymerized organic material is not formed from a preformed polymer, unless such polymer is a reactive crosslinking agent (e.g., a polyvalent oligomer or polymer).

The initially deposited material can form a self-assembled monolayer (e.g., a polysiloxane) or it can form simply a monomolecular layer. This initial layer can then be extended with crosslinking agents, although to avoid blocking pores of porous materials it is preferential that the polymerization process, which takes place laterally with regard to the surface, is confined to within a few Anstroms of the surface and that the polymer does not extend throughout the pore.

The silica-based materials of the present invention have some level of acid stability. Generally, the more highly crosslinked materials have better acid stability. Thus, particularly preferred embodiments of the silica-based material have significant acid stability.

As used herein, a "stable" material shows little or no degradation (e.g., of the active stationary phase) under conditions having a pH below 7. Preferably, this is true for at least 1000 column volumes when the material is used as a chromatorgraphic solid support. Typically, the material will degrade over time; however, it is useful as long as there is less than 10% loss in the carbon content (w/w) and/or less than 20% loss in retention factor. For example, for chromatographic materials, there is little or no loss in retention of nonpolar test solutes and little or no decrease in carbon content during reasonable periods of use. The silica-based material is stable at low pH values (i.e., below 7, preferably below 5, more preferably below 3, even more preferably, below 1, and even as low as 0.5) at room temperature (e.g., 25–30° C.), and in certain embodiments even as high as 150° C. (and even higher), for at least 1000 column volumes when used as chromatographic support material. Although conventional sterically protected silane (C$_3$, C$_8$, C$_{18}$, phenyl) phases are rather stable under aggressive, low pH (temperature=90° C., pH=0.9) mobile phase conditions, certain silica-based materials of the present invention are significantly more stable at low pH (e.g., temperature=150° C., pH=0.5). Thus, certain materials of the present invention can be used as RPLC phases that are more stable than any conventional phase.

Figures 21A, 21B:
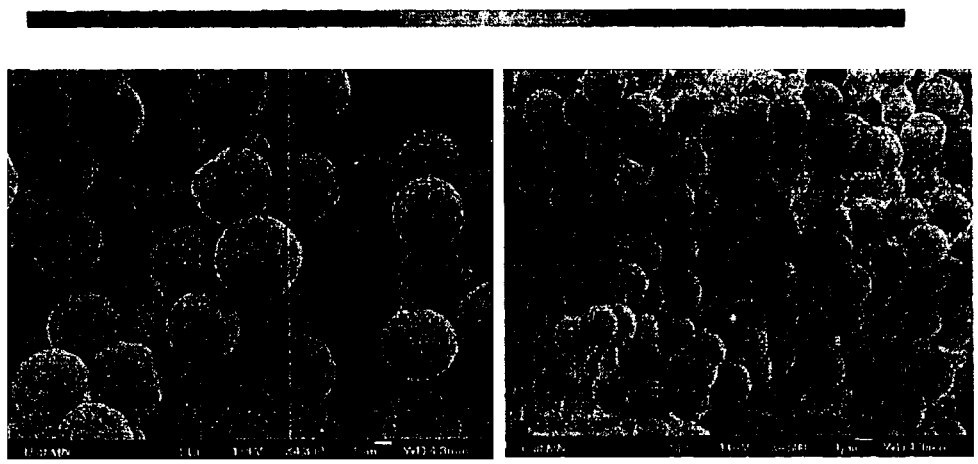
FIGS. 21A–B. Scanning electron micrographs of highly crosslinked (HC) C$_8$ modified phase (Example 5) before and after HF digest.

Although the polymerizable organic material is initially bonded (i.e., chemically bonded, for example, by covalent bonds) to the silica-based substrate, it is believed that it does not necessarily remain completely bonded to the substrate during subsequent processing (e.g., polymerization and/or crosslinking) to form the polymerized organic material. Even if the polymerized organic material remains bonded during processing, it may not remain completely bonded during use (e.g., in chromatography experiments with acidic solutes). This is evidenced by the fact that the material of certain embodiments can be digested with concentrated hydrofluoric acid to remove the silica leaving just the polymer matrix. This is illustrated in FIGS. 21A–B.

Thus, the polymerized organic material may be disposed on the silica-based substrate, whether it is bonded to the substrate or not. For example, it is believed that the polymerized organic material can form a nonbonded sheath, for example, around a core material, although this nonbonded material does not simply result from a coating the substrate with a layer of preformed polymer.

The initially deposited layer of the polymerizable organic material (and preferably the polymerized material) can be in the form of a simple monolayer or it can be in the form of a self-assembled monolayer. Herein, a "monolayer" is a single molecule in dimension, which is preferably no greater than 100 Angstroms thick, more preferably no greater than 50 Angstroms thick, even more preferably no greater than 30 Angstroms thick, and even more preferably no greater than 20 Angstroms thick.

Figure 1A:
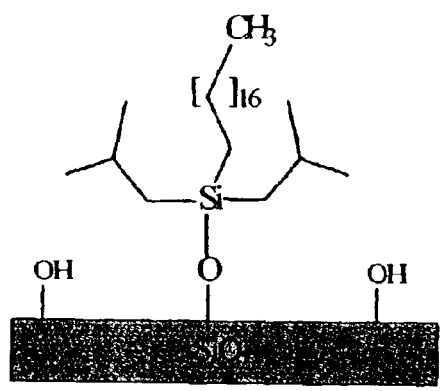
FIGS. 1A–C. (Prior Art). General structures of conventional protected silica stationary phases.
Figure 1B:
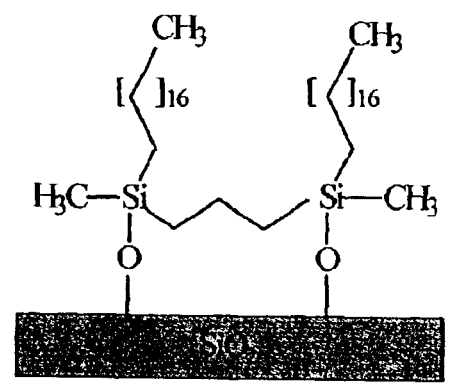
Figure 1C:
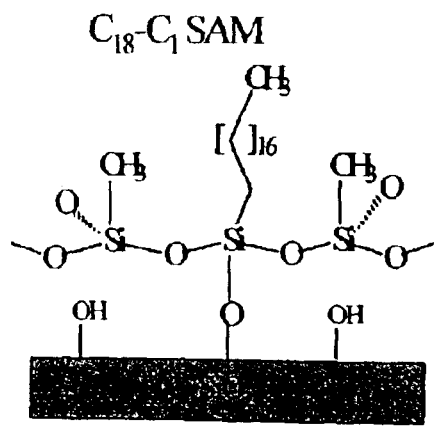

By "simple monolayer" or "monomolecular monolayer" it is meant that the organic material bonded to the silica surface does not include siloxane (—Si—O—Si—O—) bonds. By "self-assembled monolayer" (SAM) it is meant that the organic material bonded to the silica surface includes silicon-oxygen moieties, thereby forming siloxane —Si—O—Si—O— bonds. See, for example, FIGS. 3 (SAM), 4A/4B (SAM), and 5A ("simple" monolayer). By comparison, the materials of U.S. Pat. No. 5,716,705 (Wirth et al.) and U.S. Pat. No. 5,599,625 (Wirth et al.) include a monolayer of a siloxane polymer (i.e., a polysiloxane or siloxanyl-based monolayer) with pendant organic substituents that are not polymerized (see FIG. 1C). Such materials are not as stable under acidic conditions as the material of the present invention. A preferred material of the present invention includes a simple monolayer.

The silica-based substrate typically is in the form of particulate material (e.g., silica gel), although other substrates could be used as well. For example, glass or quartz plates or sheets could be used as well as silicon wafers with an oxidized layer of $SiO_2$ on the surface. Capillaries of glass or fused silica of the type used in capillary electrophoresis or capillary gas chromatography could be modified as described herein.

The particulate material can be in a wide variety of particle sizes. Preferably, the average particle size (i.e., the longest dimension (e.g., diameter for spherical particles)) is at least 0.5 micron, and more preferably at least 1.5 microns. Preferably, the average particle size is no greater than 100 microns, and more preferably no greater than 30 microns. For HPLC, the typical particle size is within a range of 1.5 microns to 10 microns. A preferred particulate material is spherical silica gel, which can be any of a wide variety of silica gels commercially available.

The silica-based substrate could be porous, nonporous, or both. For example, the silica-based substrate could be a "pellicular" particle, which is a small (1–50 microns) nonporous core surrounded by a thin (0.5–5 microns) porous skin (pellicle) of silica. When the particulate material is porous or partially porous, the polymerized organic material typically conforms to the surface of the pores.

Significant advantage is realized with porous materials using the methodology described herein. For example, inverse size exclusion chromatography and carbon content data indicate that the synthesis of materials of the present invention does not lead to blockage of the silica substrate pores. In contrast, when a preformed polymer is applied to a porous particle, often access to some pores is blocked and the pore size distribution distorted.

The silica-based materials of the present invention are particularly useful as chromatographic solid supports. The materials can be used in a wide variety of other applications as well. For example, the methodology described herein could be used to prepare materials with protective layers thereon having a variety of properties. Such materials could find use as "labs on a chip," integrated circuit chips, or as windshield glass on a car if a permanent overlayer of, for example, water-repellant glass is desired.

Preparation of Polymerizable Material

The material of the present invention can be prepared by initially attaching a layer of organic moieties (typically a simple or monomolecular monolayer and often a self-assembled monolayer) on the silica-based substrate (e.g., silica gel) and subsequently polymerizing (e.g., crosslinking). See, for example, the illustrations in FIG. 4A or 4B (SAM starting materials) and FIG. 5A (DM-CMPES "simple" monolayer).

In one embodiment, the present invention is exemplified using a chlorosilane (e.g., a trichloroorganosilane or a monochlorodialkylorganosilane) to form an organosilane (e.g., a chloromethylphenylsilane). For example, the first step in the modification is to covalently bond a monochloroaromatic silane (in a conventional process (see, e.g., U.S. Pat. No. 4,919,804; C. A. Doyle et al., *Chromatographic Science Series*, 78, 293–323 (1998); K. B. Sentell et al., *Journal of Chromatography*, 455, 95–104 (1988); U.S. Pat. No. 5,869,724; J. J. Kirkland et al., *Anal. Chem.*, 70, 4344–4352 (1998); J. J. Kirkland et al., *Anal. Chem.*, 61, 2–11 (1989)); and K. D. Lork et al., *Journal of Chromatography*, 352, 199–211 (1986)) or a trichloroaromatic silane (in a SAM-like process (e.g., M. J. Wirth et al. *Science*, 275, 44–47 (1997); M. J. Wirth et al., *Anal. Chem.*, 65, 822–826 (1993); and U.S. Pat. No. 5,599,625)) to the silica surface, preferably to form a densely bonded monolayer of a chlorosilane. The use of a monofunctional silane (e.g., dimethyl-chloromethylphenylethylchlorosilane or $Cl(CH_3)_2Si—(CH_2)_2—(C_6H_4)—CH_2Cl$ or DM-CMPES), as exemplified in Examples 4 and 5), for example, results in forming a simple layer of organic moieties, whereas the use of a multifunctional silane (e.g., chloromethylphenylethyltrichlorosilane or $Cl_3Si—(CH_2)_2—(C_6H_4)—CH_2Cl$ or CMPES, as exemplified in Examples 1–3), for example, results in the formation of a self-assembled monolayer. Examples of other chlorosilanes that could be used include, but are not limited to, diisopropyl-chloromethylphenylethylchlorosilane $(Cl(i-pr)_2Si—(CH_2)_2—(C_6H_4)—CH_2Cl$ wherein i-pr=isopropyl), di-sec-butyl-chloromethylphenylethylchlorosilane $(Cl(sec-butyl)_2Si—(CH_2)_2—(C_6H_4)—CH_2Cl$ or DM-CMPES)), dimethylphenylchlorosilane, phenyltrichlorosilane, as well as silanes with tertiarychloride, allylchloride, or benzylchloride. Well known techniques have been developed for attachment of such compounds to the surface of silica. See, for example, U.S. Pat. No. 4,919,804; C. A. Doyle et al., *Chromatographic Science Series*, 78, 293–323 (1998); U.S. Pat. No. 5,869,724; J. J. Kirkland et al., *Anal. Chem.*, 70, 4344–4352 (1998); J. J. Kirkland et al., *Anal. Chem.*, 61, 2–11 (1989); and K. D. Lork et al., *Journal of Chromatography*, 352, 199–211 (1986).

The organic functional silica surface could also be formed from (i.e., derived from) other halosilanes. Examples of other halosilanes that could be used include, but are not limited to, $X—Si(R)_2(CH_2)_nCl$ (X=Cl, Br, I, and each R is independently a wide variety of organic groups), as well as phenylmethylhalosilanes and phenylethylhalosilanes such as dimethyl-chloromethylphenylethylbromosilane.

A silica surface can be modified with unsaturated silanes such as those containing alkenyl or alkynyl groups, including vinyl silanes such as trivinyl silane and divinyl silane, or silane with acryl groups. Examples include, but are not limited to, chlorotrivinylsilane (i.e., trivinylchlorosilane), chloromethyl divinylsilane, chlorodimethyl vinylsilane, and 3-acryloxypropyl dimethylethoxysilane. Well known techniques have been developed for attachment of such compounds to the surface of silica. See, for example, U.S. Pat. No. 4,919,804; C. A. Doyle et al., *Chromatographic Science Series*, 78, 293–323 (1998); U.S. Pat. No. 5,869,724; J. J. Kirkland et al., *Anal. Chem.*, 70, 4344–4352 (1998); J. J.

Kirkland et al., *Anal. Chem.*, 61, 2–11 (1989); and K. D. Lork et al., *Journal of Chromatography*, 352, 199–211 (1986).

The organic functional silica surface could also be formed from (i.e., derived from) a wide variety of alkoxysilanes. Examples of suitable alkoxysilanes are those of the formula $(R^1—O)_n—Si(R^2)_{3-n}—R^3$, wherein $R^1$ and $R^2$ are alkyl groups and $R^3$ is a reactive group that can be polymerized (e.g., crosslinked)). Examples of such alkoxysilanes include, but are not limited to, analogs of any of the chlorosilanes mentioned above, including, for example, dimethyl-chloromethylphenylethylmethoxysilane. Well known techniques have been developed for attachment of such compounds to the surface of silica. See, for example, U.S. Pat. Nos. 5,209,976 and 4,539,061.

Other compounds such as disilazanes and even cyclic siloxanes could be used to make a suitable layer. For example, hexaphenylcyclotrisiloxane can be heated on silica to attach diphenyl silanes to the surface and the phenyl groups could, in principle, be activated (react with methoxy chloromethane) to make a phenylchloromethane that could be used in a manner similar to the method exemplified herein. Well known techniques have been developed for attachment of such compounds to the surface of silica. See, for example, Y. Sudo, *J. Chromatogr.*, 737, 139–147 (1996); U.S. Pat. No. 5,134,110; Y. Sudo et al., *Journal of Chromatography, A*, 813(2), 239–246 (1998); Y. Sudo et al., *Journal of Chromatography, A*, 757(1+2), 21–28 (1997); and Y. Sudo, *Journal of Chromatography, A*, 737(2), 139–147 (1996).

Also one could put a hydrosilane (—Si—H) on the silica surface and then use olefin chemistry with a chloroplatinic acid catalyst to build into the surface a reactive group, which could be polymerized. Well known techniques have been developed for attachment of such compounds to the surface of silica. See, for example, C. H. Chu et al., *Analytical Chemistry*, 65, 808–816 (1993); J. J. Pesek et al., *Chemically Modified Surfaces, Proceedings of the Symposium on Chemically Modified Surfaces*, 57–72 (1992); J. J. Pesek et al., *Journal of Chromatography*, 556, 373–381 (1991); J. E. Sandoval et al., *Analytical Chemistry*, 63, 2634–2641 (1991); J. J. Pesek *Chromatographia*, 30, 442–446 (1990); and J. E. Sandoval et al., *Analytical Chemistry*, 61, 2067–2075 (1989).

Also, the silica surface could be activated with chlorine (Si—OH+SOCl$_2$ to form Si—Cl bonds) and then react this with $R^4$—OH to give Si—O—$R^4$ where $R^4$ is a reactive organic group and can be polymerized (e.g., crosslinked). This method is less desirable due to the sensitivity of the Si—O—$R^4$ bond when the $R^4$ group is an alkyl group. Many well known techniques have been developed for attachment of such compounds to the surface of silica. See, for example, R. K. Iler, *The Chemistry of Silica: Solubility, Polymerization, Colloid and Surface Properties, and Biochemistry*, John Wiley & Sons, Inc., pages 676–679 (1979); and M. L. Hair, *Infrared Spectroscopy in Surface Chemistry*, Dekker, New York, P76 (1967).

The silica surface can be modified with amino silanes as well, such as gamma-aminopropylsilane and phenylbis(dimethylamino)chlorosilane. Well known techniques have been developed for attachment of such compounds to the surface of silica. See, for example, H. Engelhardt et al. In *Journal of liquid Chromatography*, Vol. 10, 1999–2022 (1987); K. M. R. Kallury et al. In *Langmuir*, Vol. 10, 492–499 (1994); and C. Baleizao et al. *Applied Catalysis, A: General*, 228, 279–288 (2002).

Other silanes, such as silanes functionalized with carboxylic groups, epoxy silanes, or a wide variety of silanes terminated in a reactive functional group that can be crosslinked with a multivalent crosslinker, will work. See, for example, G. Odian, Principles of Polymerization, John Wiley & Sons, Inc., 198–200, 452–454 (1991).

An alternative approach to manufacturing a highly acid-stable stationary phase is based on the use of so-called "hybrid" in organic-inorganic silica particles described in K. K. Unger et al., *J Chromatogr.*, 125, 115 (1976); *A Review of Waters' New Hybrid Particle Technology and its Use in HPLC*, Waters, 1999; Y.-F. Cheng et al., *LC-GC*, 18, 1162 (2000); U. D. Neue et al., American Laboratory, 36, November (1999); and U.S. Pat. No. 4,017,528 (Unger et al.). A hybrid particle can be manufactured using a mixture of a tetraalkoxysilane and an organosilane wherein the organic group includes one of the polymerizable functionalities described above (for example, a chloromethylphenyl group, a di- or tri-vinylsilane, etc.). Once the hybrid particle is synthesized its stability in both acid and basic solution could be improved by polymerizing the organic functional group of the organosilane as described herein, e.g., by addition of the appropriate crosslinkable agent (e.g., a polyaromatic compound such as styrene heptamer or a polyamine). Because the hybrid particles are claimed to be more stable in base than other conventional silica particles, the material modified according to the present invention, which provides enhanced acid stability, will likely have both very high acid and base stability.

These initially formed reactive groups on the silica surface provide the basis for further treatment. As exemplified herein, a chloromethylphenyl group is especially attractive because both the phenyl group is reactive and the chloro group is reactive for Friedel-Crafts chemistry.

Thus, it should be understood that the invention is not limited to the initial formation of an organochloride (or organohalide)-substituted silica surface (although these are preferred for subsequent Friedel-Crafts chemistry). Rather, the material of the present invention can be made using a wide variety of organic reactive moieties (i.e., groups) on the silica-based substrate that can be subsequently polymerized (e.g., crosslinked) using a wide variety of chemistries and techniques.

For example, any reactant (in various combinations) that reacts with silica and has functional groups (including double bonds, triple bonds, rings, amino group, etc.) that can subsequently be polymerized either by condensing with itself or with an added multivalent crosslinker to form a polymerized material (e.g., crosslinked material) on the surface of the silica can be used. For certain preferred embodiments, however, the sterically hindered silanes of U.S. Pat. No. 4,847,159 (Glajch et al.) and the bidentate silanes of U.S. Pat. No. 4,746,572 (Glajch et al.) are not used at least because the surface density is typically not as high as preferred.

Preparation of Polymerized Material

The organic moieties on the silica surface can be polymerized (e.g., crosslinked) using, for example, Friedel-Crafts chemistry and nucleophilic substitution as well as other chemistries involving electrophilic reactions, ring-opening reactions, anionic polymerization, cationic polymerization, condensation polymerization, etc., as well as a wide variety of mechanisms involving photoinitiation, thermal initiation, etc. Typically, the mechanisms of polymerization are those that can be easily controlled to cause reaction between the reactive moieties and/or with the secondary, reactive, crosslinking agent. Thus, preferably, free-radical chemistry is not used as this can cause uncontrollable reactions, and possibly result in self-condensation of the crosslinking agent.

U.S. Pat. No. 4,847,159 (Glajch et al.) and Pat. No. 4,746,572 (Glajch et al.) attach sterically hindered or bidentate organosilanes to a silica surface. It is suggested in these two patents that these sterically hindered or bidentate silanes can include functional groups for bonding the silane to other unsaturated monomers or polymers using free-radical chemistry. It is not clear what would result, although this suggests that these groups would be pendantly attached, as opposed to forming a crosslinked network. In one embodiment, it is suggested that the bonded silanes each include one vinyl group. Such mono-vinylsilanes are specifically not desirable because they will not readily form a polymeric material; rather, only dimers, trimers and low molecular weight oligomers are formed upon self-condensation. Furthermore, numerous residual unreacted monomers will be left. The only crosslinking agents mentioned (acrylonitrile and poly(vinylpyrrolidone)) include the same reactive groups (i.e., vinyl groups) as that of the reactive silanes on the silica surface. This is undesirable because the crosslinking agent will also self-condense and, for example, form a nonbonded polymeric material that could plug the pores of a porous substrate. Thus, the methodology of the present invention where a secondary, reactive, crosslinking agent is used is carried out under conditions that reduce or prevent self-condensation of the crosslinking agents (although self-condensation of the surface reactive moieties is acceptable and desirable). It is also suggested in U.S. Pat. No. 4,847,159 (Glajch et al.) that functionalities on the silane can be used to crosslink or polymerize the silane to itself; however, there are no details as to how this could be accomplished other than what is discussed above with respect to the vinyl group and free-radical chemistry.

The organic moieties are preferably polymerized by self-condensation if they include reactive organic moieties capable of reacting with each other (often this is referred to as self-crosslinking). Alternatively, the organic moieties can be crosslinked using a secondary, reactive, crosslinking agent (i.e., crosslinkable agent or reagent). The reactive functionality of the crosslinking agent is orthogonal with the reactive functionality of the reactive organic moieties (e.g., the polymerizable material). That is, they are reactive but do not include the same functional groups. If the crosslinking agents and the reactive organic moieties (e.g., of the polymerizable material) include the same functionality (e.g., vinyl groups), the crosslinking agents can self-react, which is undesirable. Relative amounts of each can be readily determined by one of skill in the art, based on the disclosure herein. Furthermore, the reaction conditions for polymerization (e.g., crosslinking) reactions described herein can be readily determined by one of skill in the art, based on the disclosure herein.

Such crosslinkable agents include, for example, unsaturated hydrocarbons (e.g., aromatic hydrocarbons), polyvalent nucleophiles, and polyvalent electrophiles. A preferred crosslinkable reagent for Friedel-Crafts chemistry (discussed below) is an aromatic hydrocarbon or another unsaturated hydrocarbon (e.g., olefins, alkynes). A wide variety of aromatic compounds that do not have electron withdrawing groups and preferably have at least one electron donor group, such as alkylkated aromatic compounds and haloalkylated aromatic compounds, will work. Examples include, but are not limited to, triphenylmethane, diphenylmethane, styrene heptamer, anthracene, and biphenyl.

A preferred crosslinkable reagent for crosslinking with nucleophilic substitution chemistry (discussed below) is a polyvalent nucleophile. Examples include, but are not limited to, polyethyleneimines (e.g., having a molecular weight of 600 to 1400, for example), triamines (e.g., $NH_2$—$CH_2$—$CH_2$—$NH$—$CH_2$—$CH_2$—$NH_2$), polyvinylamines (($CH_2CH_2NH_2$)$_n$) and polyvinylalcohols (($CH_2CH_2OH$)$_n$), diols, triols, higher polyols (i.e., more than three —OH groups), dithiols, and trithiols.

A preferred crosslinkable reagent for crosslinking with electrophilic substitution chemistry is a polyvalent electrophile. Examples of polyvalent electrophiles include, but are not limited to, polyhalides (e.g., $Cl(CH_2)_nCl$, $I(CH_2)_nI$) and diacid halides (e.g. terephthaloyl chloride, sebacoyl chloride, adipoyl chloride, azelaoyl chloride, dodecanedioic acid chloride, and dimer acid chloride).

Figure 5A:
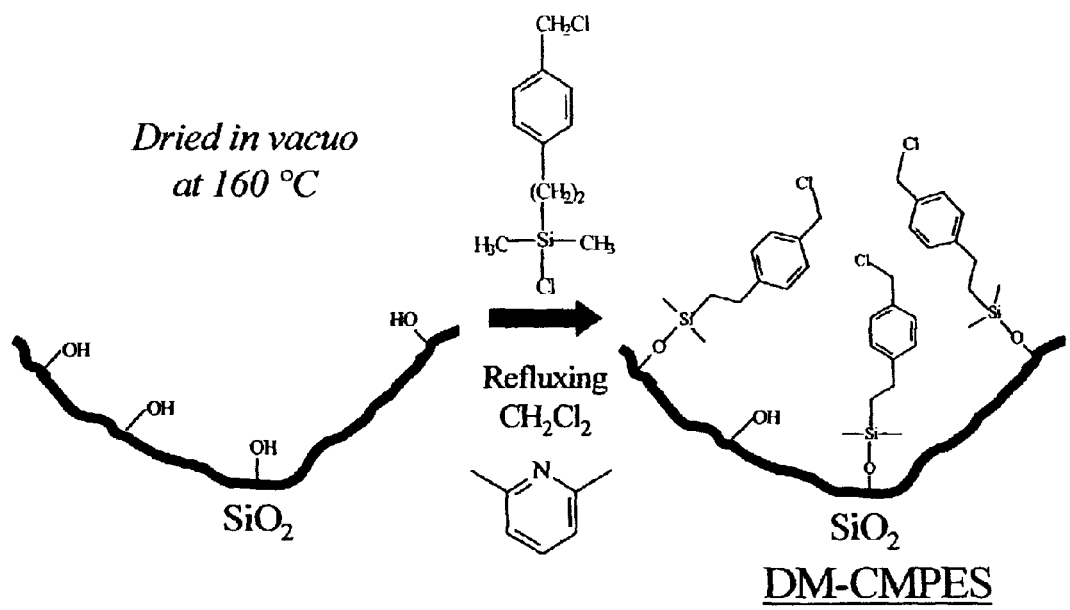
FIGS. 5A–C. Schematic illustration of an alternative approach to preparing silica-based material according to the present invention using DM-CMPES, styrene heptamer crosslinker, secondary crosslinking with activation by methoxychloromethane, octylbenzene derivatization, benzene endcapping, and residual chlorine elimination by hydrolysis.

Various combinations of crosslinking agents (with or without simultaneous self-crosslinking) can be used if desired. Furthermore, such crosslinking agents can be added in sequential steps to provide multiply crosslinked material. For a schematic illustration of the use of multiple crosslinkers see FIGS. 5B and 5C (and Examples 5, 6, and 7) wherein styrene heptamer is initially used to crosslink DM-CMPES bound moieties, which then undergoes activation with $CH_3OCH_2Cl$ and secondary crosslinking in Examples 5 and 6, and then tertiary crosslinking by a second reaction with styrene heptamer in Example 7.

If all the organic moieties are bonded to other organic moieties through polymerization, and preferably through crosslinking using a secondary crosslinking agent, a highly branched, highly interconnected network is formed (also referred to as a "hypercrosslinked" material).

Friedel-Crafts Method

Figures 4A, 4B:
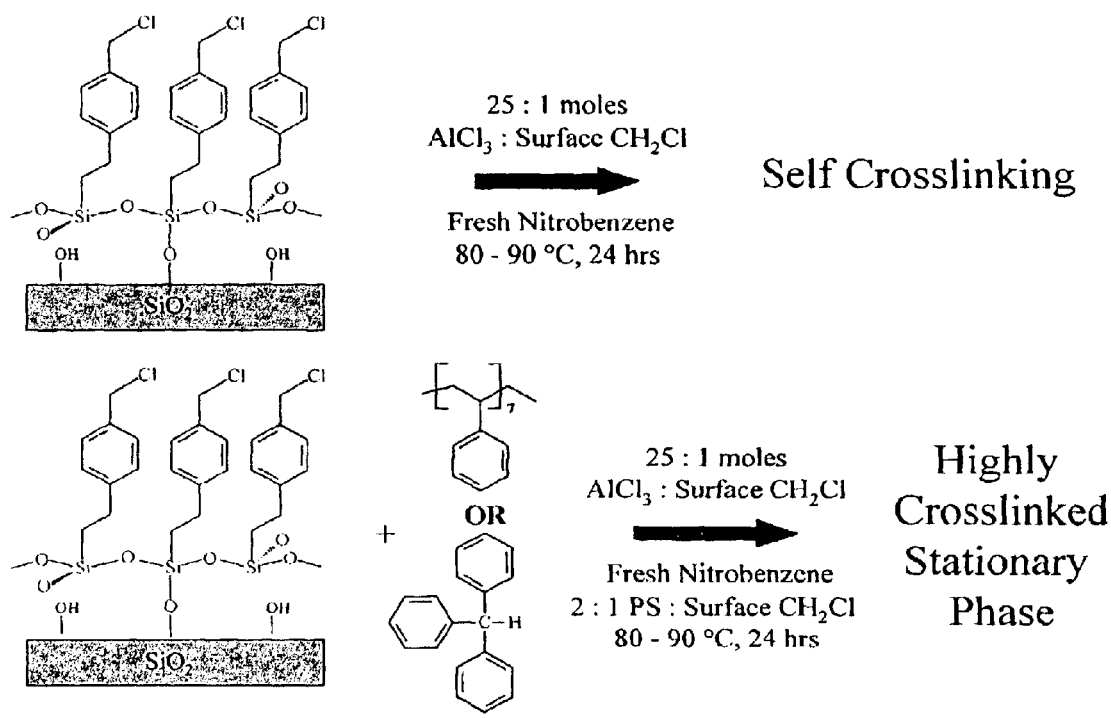
FIGS. 4A–B. Schematic illustration of two approaches to preparing silica-based material according to the present invention.

In one embodiment, the reactive organic moieties can be polymerized (e.g., self-condensed), as shown in FIG. 4A and exemplified in Example 1, and preferably crosslinked with additional reagents through the use of Friedel-Crafts chemistry, as shown in FIG. 4B and exemplified in Examples 2–5. For example, a crosslinkable aromatic (e.g., polyaromatic compound), such as triphenylmethane, diphenylmethane, small oligomers (e.g., heptamer) of styrene, biphenyl, terphenyl, naphthalene, anthracene, or alkylated derivatives thereof can be used (in combination if desired) to extensively crosslink the self-assembled phenyl rings on a silica-based substrate, typically while self-condensation proceeds in parallel.

As used herein, a reaction step that uses Friedel-Crafts chemistry (also referred to as a Friedel-Crafts reaction) involves a wide variety of conditions and catalysts that activate an organic halide, preferably an organic chloride, to add the organic group to the phenyl ring of toluene (or a toluyl group). Traditional Friedel-Crafts chemistry involves the use of $AlCl_3$ dissolved in nitrobenzene (or similar solvent), although there are many catalysts (hard Lewis acids such as $SnCl_4$, $ZnCl_2$, $BF_3$, $AlBr_3$, $AlI_3$, $FeCl_3$, $ZrCl_4$) and a vast number of alkylating agents (e.g., methylene chloride, benzyl chloride, methoxychloromethane, and the related fluorinated, brominated, or iodinated compounds) that can be used in this embodiment of the invention. Almost any aromatic ring that does not have a strong electron-withdrawing group (e.g., $NO_2$) attached to it can be alkylated. Such chemistry is very rapid and the reactions are commonly run at temperatures well below 0° C. to control polyalkylation.

Self-condensation typically does not occur when $SnCl_4$ or $ZnCl_2$ are used as the catalysts; rather, self-condensation is best carried out with $AlCl_3$, $AlBr_3$, or $AlI_3$.

Friedel-Crafts chemistry can be used to provide various degrees of crosslinking, and hence stabilization of the material of the present invention. For example, crosslinked phenyl rings can be further reacted with methoxychloromethane ($CH_3OCH_2Cl$) or similar compounds, such as bis(chloromethyl)ether ($ClCH_2OCH_2Cl$), in the presence of a mild catalyst (e.g., $ZnCl_2$ at low temperatures such as 30° C. to 50° C.) to chloromethylate the moieties. The additional chloromethyl groups could be used for further crosslinking or as attachment points for other moieties of interest (e.g., chromatographic interest). Alternatively, dimethyl formal ($CH_3OCH_2OCH_3$) or ethyl methyl formal ($CH_3CH_2OCH_2OCH_3$) could be used to activate toward further crosslinking of surface attached aromatic groups or to provide additional functionality for additional subsequent crosslinking or as attachment points for other moieties of interest (e.g., chromatographic interest).

For example, subsequently, a stronger catalyst (e.g., $AlCl_3$ at higher temperatures such as 80° C. to 100° C.) can be used to self-condense the rings further with —$CH_2$— bridges. This method will provide a very extensively crosslinked polymer which is fully confined to the surface with no bulk polymerization. Herein, such material typically demonstrates very strong acid stability (i.e., is stable in hot acid).

Friedel-Crafts chemistry, which can be varied within well known parameters, is desirable for the following reasons: it can be controlled so that all reactions are confined to the surface, thereby preventing any bulk polymerization and pore blockage; each neighboring ring offers several (up to four) potential sites for reaction with the —$CH_2Cl$ group, which greatly promotes complete reaction of all surface —$CH_2Cl$ groups and the formation of a network polymer; methylation of a phenyl ring with a neighboring —$CH_2Cl$ group in fact activates the ring toward further alkylation, thereby allowing for the formation of highly alkylated aromatics; and the extent of crosslinking can be increased almost indefinitely by re-chloromethylating the rings by addition of $CH_3OCH_2Cl$ (or other reagents) and Friedel-Crafts catalysts ($AlCl_3$, $SnCl_4$, etc.).

Figure 3:
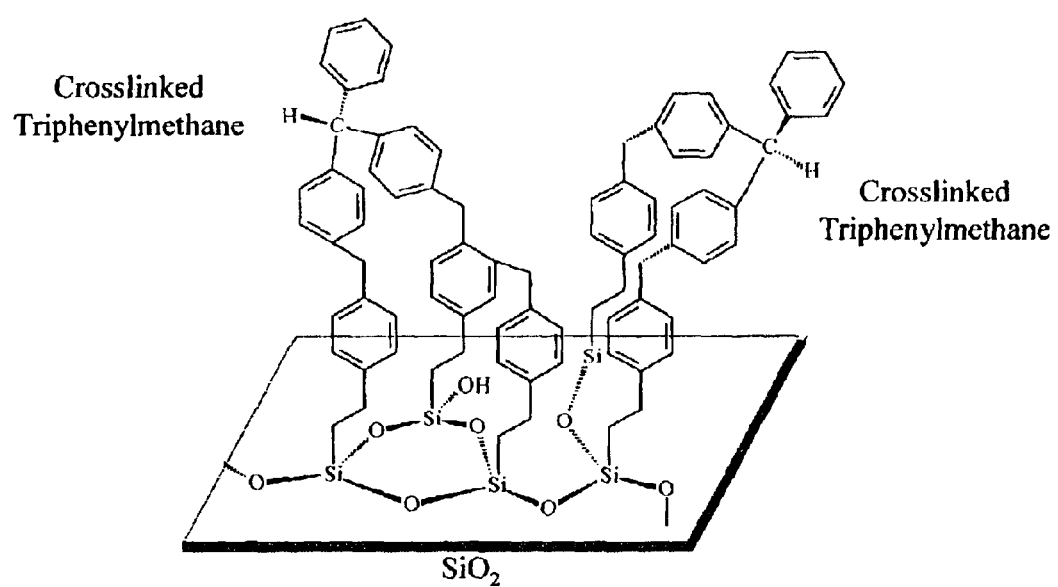
FIG. 3. Illustration of a self-assembled CMPES monolayer phase and Friedel-Crafts crosslinked phases using triphenylmethane as the crosslinker according to one embodiment of the present invention.

An illustration of a CMPES self-assembled monolayer and the crosslinked phases is shown in FIG. 3. By extensively crosslinking the self-assembled monolayer on the surface, the attachment of the stationary phase to the surface and its confinement within the pores is greatly enhanced and its propensity to bleed from the column under low pH conditions is greatly reduced. Thus, stability is enhanced.

Furthermore, the use of phenyl rings on the surface allows for subsequent derivitization with functionality (e.g., $C_{18}$, $NH_2$), as is done with polystyrene, to produce a suite of materials with a variety of chromatographic selectivities including various phases for reversed phase, normal phase, ion exhange, and chiral chromatography.

Other Polymerizing Methods

Figure 6:
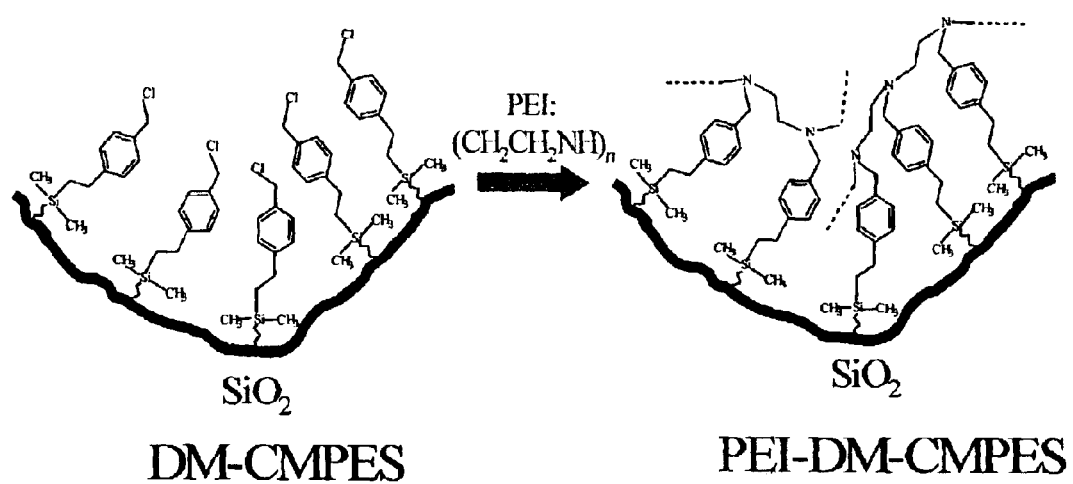
FIG. 6. Schematic illustration of an alternative approach to preparing silica-based material according to the present invention using DM-CMPES and low molecular weight (600) polyethyleneimine (PEI) as the crosslinker.

In one embodiment, the reactive organic moieties can be crosslinked with additional reagents through the use of nucleophilic substitution, as shown in FIG. 6 and exemplified in Examples 8 and 9. For example, a crosslinkable polyvalent (i.e., multivalent) nucleophile, such as polyethyleneimine, can be used to extensively crosslink the organic chlorides on silica. Examples include relatively low molecular weight polyethyleneimines (e.g., having a molecular weight of 600 to 1400, for example), triamines (e.g., $NH_2$—$CH_2$—$CH_2$—$NH$—$CH_2$—$CH_2$—$NH_2$), polyvinylamines (($CH_2CH_2NH_2$)$_n$) and polyvinylalcohols (($CH_2CH_2OH$)$_n$), diols, triols, polyols, dithiols, and trithiols.

There are several advantages in using nucleophilic substitution reactions between amines and halides to crosslink the surface ligands. For example, the reaction conditions are mild and usually no catalyst is needed, which results in less cleavage of the initial surface ligands. Like phenyl groups, amines can also be multiply substituted, the number of the covalent bonds connected to amine groups can be as much as four, which greatly enhances the crosslinking degree of the surface polymer network. Since tertiary amines are more reactive than secondary amines and secondary amines are more reactive than primary amines, reaction between the amines and halides will make the further substitution easier. This also dramatically facilitates effective crosslinking and the formation of a stable integral network on the silica surface. The ability of the multiple substitution of amino groups also enables a large variety of further derivatizations to provide different selectivity, such as the introduction of alkyl groups to the surface network (see, for example, Example 9).

Alternatively, a silica surface modified with an amine (e.g., a propyl amino silane) and can be crosslinked using a di or polyhalide, such as $Cl(CH_2)_nCl$ or $I(CH_2)_nI$ or other polyvalent electrophiles. Examples of polyvalent electrophiles include polyhalides (e.g., $Cl(CH_2)_nCl$, $I(CH_2)_nI$) and diacid halides (e.g. terephthaloyl chloride, sebacoyl chloride, adipoyl chloride, azelaoyl chloride, dodecanedioic acid chloride, and dimer acid chloride).

Vinyl groups when used as the reactive organic moieties can be polymerized with protonic acids. Techniques for such polymerizations are disclosed in J. Chojnowski et al., *Macromolecules*, 35(27), 9904–9912 (2002); K. Satoh et al., *Macromolecules*, 33(15), 5405–5410 (2000); D. T. Roberts et al., *Journal of Macromolecular Science, Chemistry*, 7(8), 1629–40 (1973); and Rudolf Faust and Timothy D. Shaffer, editors, *Cationic Polymerization: Fundamentals and Applications*, Washington, D.C.: American Chemical Society, 1997.

Such reactions are known to be very fast and easily carried out under conditions that will lead to very little loss in the silane coating during phase synthesis. The above reagents would lead to phases useful both as anion exchangers and in reversed and normal phase liquid chromatography.

Modification of Polymerized Material

The resultant products may have many residual —$CH_2Cl$ groups that can react with water when heated in aqueous organic mixtures (e.g., acetonitrile and water) to form —$CH_2OH$ groups as described above. This can be done using well-known techniques, which are illustrated in Examples 5 and 12, for example.

Alternatively, such residual —$CH_2Cl$ groups can be "endcapped" and/or derivatized with one or more nucleophilic reagents (e.g., benzene, toluene, octylbenzene, 1-hexene, etc.) using, for example, Friedel-Crafts chemistry, to remove all but traces of the chlorine and provide a very hydrophobic product. For example, the material can be made more hydrophobic and aminated by reacting the available halide with octyl benzene or residual —$CH_2Cl$ groups can be converted to a cyanide group with CN—. Illustrative endcapping reaction is exemplified in Examples 5, 6, and 12, for example.

Figure 5B:
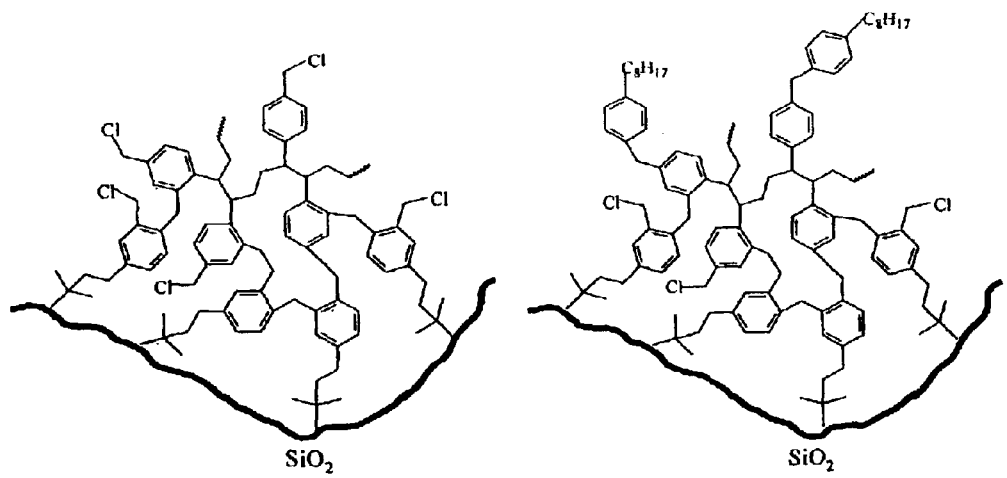
Figure 5C:
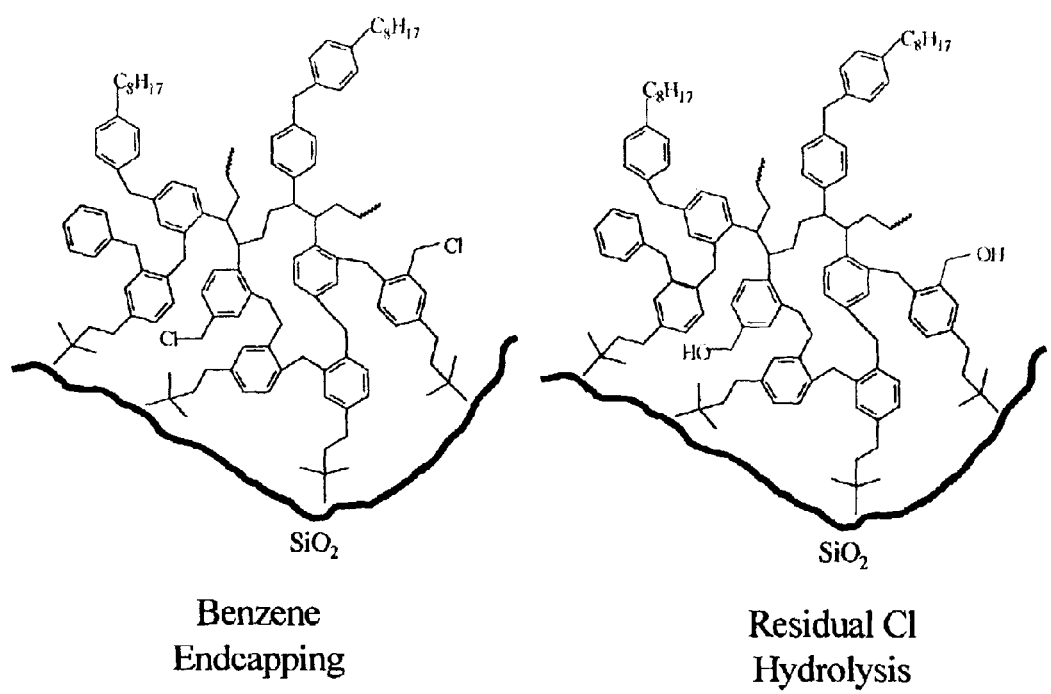

For a schematic illustration of some of these reactions see FIGS. 5B (octylbenzene derivatization) and 5C (benzene end-capping and residual chlorine hydrolysis).

Thus, the additional chloromethyl groups could be used for attachment points for other moieties of interest (e.g., chromatographic interest). Seven different types of chloromethylphenyl group substitution reactions are shown in Scheme I.

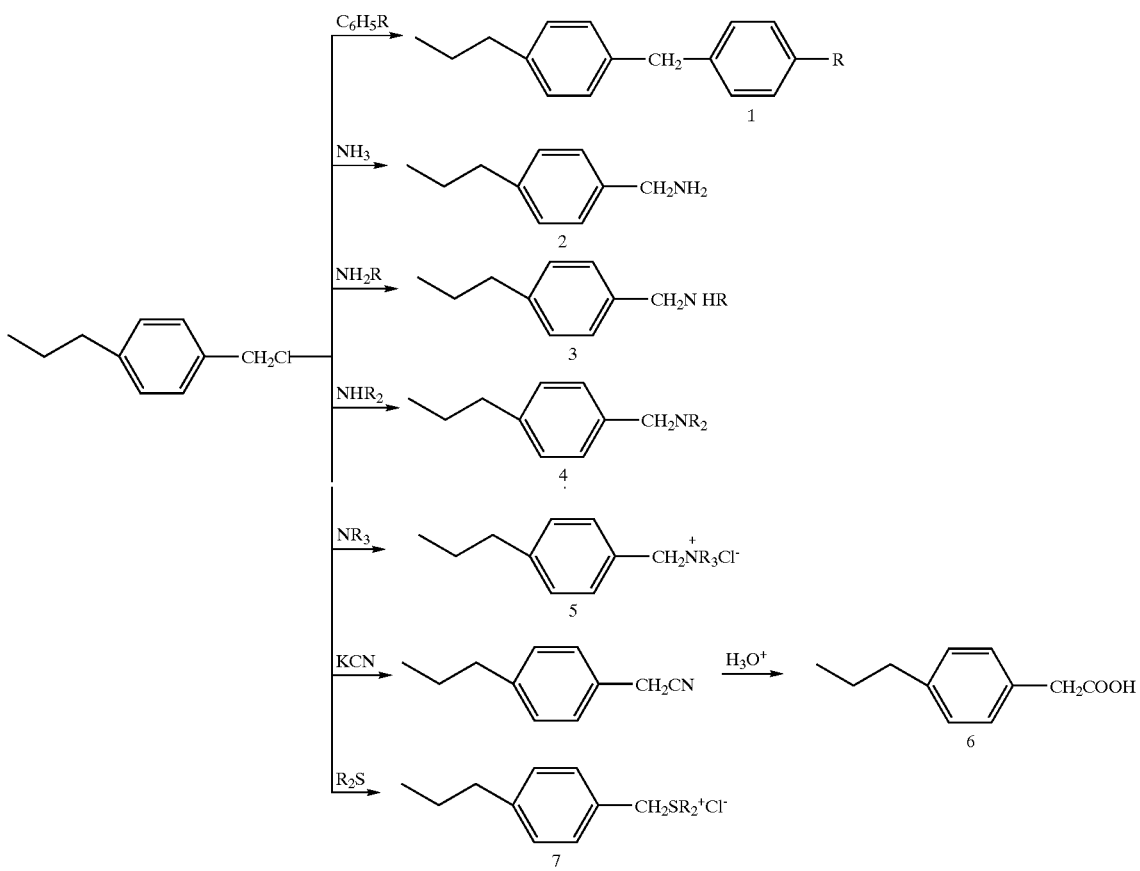

Scheme I

Reaction 1 in Scheme I allows for the attachment of an alkyl benzene. By this route a $C_{18}$-phenyl group can be introduced onto many of the phenyl rings of the underlying support. The next four reactions use ammonia, and primary, secondary, and tertiary amines as the nucleophiles and the products (ligands 2–5) can be used for anion exchange chromatography. Ligand 2 will be a very stable amino normal phase. When the R groups of ligands 3 are 4 are long chain alkyl groups, a polar embedded RPLC stationary phase can be obtained. Ligand 6 with a carboxyl group is a good choice for use as a cation exchange phase and can be made by hydrolysis of a nitrile. Furthermore, carboxyl groups could be further derivatized by dicyclohexylcarbodiimide or dimethylamino propyl-ethyl carbodiimide chemistry to make additional polar embedded amide type phases for RPLC (T. L. Ascah et al., *J. Liq. Chrom. and Rel. Technol.*, 19, 3049–3073 (1996); and U. D. Neue et al., *Chromatographia*, 54, 169–177 (2001)). Route 7 shows the reaction of the chloromethyl group with an alkyl sulfide. Ligand 7 is easily converted by reaction with water, a tertiary amine, or sodium sulfite (R. M. Wheaton et al., *Ion Exch.*, 2, 191–234 (1969)) into an alcohol, a quaternary amine, or a sulfonate, respectively. The quaternary amine and sulfonate will act as strong anion and cation exchangers, respectively. An independent approach is to use Friedel-Crafts chemistry directly on the phenyl rings to make any number of alkylated, acylated, carboxylated or sulfonic acid derivatives (L. G. Wade, Jr., *Organic Chemistry*, 4th ed.; Prentice Hall, Inc.: New Jersey, (1999); and G. A. Olah, Friedel-Crafts and Related Reactions, Interscience Publishers, New York, N.Y. (1963–65)). All the R groups in the above reactions can be long chain alkyl groups or functionalized groups for different separation purposes, provided the steric bulk of the ligand does not severely diminish its reactivity. Thus a family of highly stable silica-based HPLC packings can be prepared from a dense, hyper-crosslinked protective network on the silica surface.

Conditions of polymerization, crosslinking, and/or other surface modification reactions will vary depending on the chemistry involved. Typically, conditions are desired that reduce or prevent the occurrence of silane cleavage. Generally, lower temperatures and lower catalyst concentrations are desired. For example, preferred temperatures for Friedel-Crafts reactions are typically at least 0° C., and more preferably at least 20° C. They are preferably no greater than 150° C., and more preferably no greater than 120° C. Preferably, the amount of crosslinker used is no greater than 50 moles per mole of reactive surface group, and more preferably at least 1 mole per mole of reactive surface group, with a ratio of crosslinker amount to reactive surface group of 1 mole to 1 mole being the most preferred. Preferably, the amount of catalyst used is no greater than 50 moles catalyst to 1 mole of reactive surface group, and more preferably no more than 10 moles catalyst to 1 mole of reactive surface group. Preferably, the amount of catalyst is at least 0.1 mole of catalyst to 1 mole of reactive surface group, and more preferably at least 2 moles of catalyst to 1 mole of reactive surface group. Suitable reaction solvents include, for example, polar aliphatic and polar aromatic solvents, hexamethyl benzene, and high boiling aliphatic solvents, such as cyanobenzene, nitrobenzene, and methoxybenzene. Specific conditions for exemplary reactions are in the following Examples Section.

EXAMPLES

Objects and advantages of this invention are further illustrated by the following examples, but the particular materials and amounts thereof recited in these examples, as well as other conditions and details, should not be construed to unduly limit this invention.

Chemicals and Substrates

All solvents used in this work were HPLC grade. Acetonitrile and heptane were obtained from Burdick and Jackson (Muskegon, Mich.). Tetrahydrofuran was obtained from EM Science (Gibbstown, N.J.). Acetone and isopropanol were obtained from PharmCo (Brookfield, Conn.). Trifluoroacetic acid was obtained from Spectrum (New Brunswick, N.J.). Nitrobenzene, 1.0 Molar (M) aluminum chloride in nitrobenzene, polystyrene (number average molecular weight ($M_n$)=770), and triphenylmethane were obtained from Aldrich (Milwaukee, Wis.). Chloromethylphenylethyl-trichlorosilane (CMPES), dimethyl-chloromethylphenylethylchlorosilane (DM-CMPES), and trivinylchlorosilane (TVS) were obtained from Gelest Inc. (Tullytown, Pa.). Methoxychloromethane, 1-phenyloctane, polyethyleneimine (weight average MW=600, octyliodide, and 1-chlorooctane were obtained from Aldrich (Milwaukee, Wis.). Styrene heptamer ($M_n$=770) was obtained from Aldrich (Milwaukee, Wis.). The aluminum chloride in nitrobenzene solution and the CMPES were stored under nitrogen at all times. HPLC water was prepared by purifying house deionized water with a Barnstead Nanopure II deionizing system with an organic-free cartridge and a 0.2 $\mu$m final filter.

All chromatographic solutes were obtained from Aldrich (Milwaukee, Wis.) or Sigma (St. Louis, Mo.). Chromatographic solutes were dissolved in acetonitrile/water or pure THF (polystyrene standards) at a concentration of approximately 0.5 to 2 milligrams per milliliter (mg/mL).

Type B ZORBAX silica particles from Agilent Technologies (Wilmington, Del.) were used for all stationary phases. The particle diameter, surface area, pore diameter and pore volume of the particles are 4.8 microns, 180 square meters per gram ($m^2$/g) (BET), 80 Angstroms (Å) and 0.4 mL/g, respectively, as reported by Agilent.

Elemental Analysis

Carbon, hydrogen, and chlorine analyses were performed by MicroAnalysis Inc., Wilmington, Del.

Chromatography Columns

All stationary phases were packed in 5.0×0.46 centimeter (cm) columns. Stainless steel column hardware was obtained from Isolation Technologies (Hopedale, Mass.). The phases were slurried in isopropanol and sonicated for twenty minutes prior to packing. Columns were packed by downward slurry technique at a packing pressure of 5,000 pounds per square inch (psi) (35 megapascals (MPa)) using pure isopropanol as the driving solvent.

Chromatography Experiments

Chromatographic experiments were performed on an HP 1090 Series II chromatograph. For acid stability tests, a heating apparatus from Systec Inc. (New Brighton, Minn.) was used to control the column temperature. This apparatus consisted of a mobile phase preheater assembly and insulating jacket, which allowed the column to be heated up to 200° C. Unless otherwise noted all data were obtained using 1.0-microliter ($\mu$L) injection volumes of solute with an absorbance detector set to a wavelength of 254 nanometers (nm).

Dynamic acid stability testing was performed using a 47.5/47.5/5.0 ACN/Water/TFA (pH=0.5) mobile phase at a flow rate of 2.0 milliliters per minute (mL/min) and a column temperature of 150° C. Inverse size exclusion chromatography was performed with toluene and low polydispersity polystyrene standards ($M_w$=1000–18,700 g/mol) in pure THF mobile phase at a flow rate of 1.0 mL/min and a column temperature of 40° C. Flow curve analysis was performed over a reduced velocity range of approximately one to twenty using toluene (k'=1.6) as the probe solute and a column temperature of 40° C. The mobile phases, flow rates, and column temperatures are given in the figure captions.

EXAMPLES 1–12

Stationary Phase Syntheses

Example 1

Chloromethylphenylethyltrichlorosilane (CMPES) Self-Assembled Monolayer (CMPES-SAM) Formation Step 1: CMPES-SAM Synthesis.

The CMPES self-assembled monolayer (SAM) was synthesized following the method summarized by Wirth and coworkers with a few modifications (M. J. Wirth et al., Science, 275, 44–47 (1997); M. J. Wirth et al., Research Corporation Technologies Inc.: U.S.A. (U.S. Pat. No. 5,599, 625) (1997); M. J. Wirth et al., Research Corporations Technologies Inc.: U.S.A. (U.S. Pat. No. 5,716,705) (1998); R. W. P. Fairbank et al., *Journal of Chromatography*, 830, 285–291 (1999); and R. W. P. Fairbank et al., *Analytical Chemistry*, 67, 3879–3885 (1995)). All glassware was rigorously cleaned in an ethanol-KOH bath, rinsed thoroughly with HPLC water and dried at 150° C. overnight prior to use. An activated silica column was packed for removing trace amounts of water in the heptane. All reagents, solvents, activated silica and alumina columns and glassware were transferred to a drybox for the reaction.

Heptane was dried in the drybox using an activated silica column. A small amount of methyltrichlorosilane was added to a 5-mL aliquot of the dried heptane to test for gross water contamination. If no hydrochloric acid bubbles were generated upon mixing, the heptane was deemed acceptably dry for the reaction.

Three grams of the Type B ZORBAX silica was dried under vacuum at 120° C. overnight prior to use. After cooling to room temperature under vacuum, a monolayer of water was carefully adsorbed to the silica particle surfaces by exposing them to a 50% relative humidity atmosphere for 24 hours. One liter of 5.55 M sulfuric acid solution was placed in a sealed chamber to generate the 50% relative humidity atmosphere.

After surface hydration, the 3.0 grams of silica was transferred to the drybox, slurried in 50 mL of heptane and continuously stirred. To the stirring slurry, 16 $\mu$moles/$m^2$ (of silica) of CMPES (2.49 grams) was added dropwise by syringe. An activated alumina column (5 cm alumina heated T 700° C. for 5 hours and cooled under vacuum) was used to trap the hydrochloric acid generated by the reaction. The reaction mixture was stirred for 24 hours at ambient temperature.

After 24 hours, the silica particles were washed with ten, 50-mL aliquots of dried heptane. Once the silica particles were removed from the drybox, they were washed sequentially with 500 mL of each of hexane, hot isopropanol, and acetone on a medium porosity glass fritted funnel, and allowed to dry under vacuum at 60° C.

Step 2: Friedel-Crafts Self-Condensation to Form SC-CMPES-SAM.

All glassware was rigorously cleaned in an ethanol-KOH bath, rinsed thoroughly with HPLC water, and dried at 150° C. overnight prior to use. Two grams of CMPES-SAM silica (surface density of CMPES=5.6±0.1 $\mu$moles/m$^2$ based on carbon content) as made in Step 1 were slurried in 20 mL of nitrobenzene in a 150-mL round-bottomed flask and sonicated under vacuum for 30 minutes to fully wet the particle pores. The slurry was magnetically stirred and placed in a thermostatted oil bath at 90° C.

To the stirring slurry, 50 mL of 1.0 M AlCl$_3$ in nitrobenzene solution was transferred from the drybox and immediately added to the round-bottomed flask. The catalyst:CMPES mole ratio was 25:1. The total volume of the reaction mixture was 100 mL. An activated alumina column was used to prevent atmospheric water from deactivating the catalyst. The reaction mixture was stirred continuously at 90° C. for 24 hours. After the reaction, particles were filtered on a medium porosity grass fritted filter and washed sequentially with 250 mL of fresh nitrobenzene, and 500 mL of each of tetrahydrofuran, 30/70 tetrahydrofuran/water, and acetone. The stationary phases were dried under vacuum overnight at 60° C. No crosslinker was added for this self-crosslinked (i.e., self-condensed) CMPES phase.

Example 2

Synthesis of Highly Crosslinked Triphenylmethane-CMPES-SAM

Step 1: Same as above in Example 1.
Step 2: Friedel-Crafts Crosslinking (and Self-Condensation) of the CMPES-SAM Phase with Triphenylmethane to Form TPM-CMPES-SAM.

All glassware was rigorously cleaned in an ethanol-KOH bath, rinsed thoroughly with HPLC water, and dried at 150° C. overnight prior to use. Two grams of CMPES silica (surface density of CMPES=5.6±0.1 $\mu$moles/m$^2$ based upon carbon content) were slurried in 20 mL of nitrobenzene in a 150 mL round-bottomed flask and sonicated under vacuum for 30 minutes to fully wet the particle pores. Immediately after sonication, 0.295 gram of triphenylmethane was added directly to the slurry and dissolved by swirling the round-bottomed flask. The triphenylmethane:CMPES mole ratio was 0.6:1. The slurry was magnetically stirred and placed in a thermostatted oil bath at 90° C. To the stirring slurry, 50 mL of 1.0 M AlCl$_3$ in nitrobenzene solution was transferred from the drybox and immediately added to the round-bottomed flask. The catalyst:CMPES mole ratio was 25:1. The total volume of the reaction mixture was 100 mL. An activated alumina column was used to prevent atmospheric water from deactivating the catalyst. The reaction mixture was stirred continuously at 90° C. for 24 hours. After the reaction, particles were filtered on a medium porosity grass fritted filter and washed sequentially with 250 mL of fresh nitrobenzene, and 500 mL of each of tetrahydrofuran, 30/70 tetrahydrofuran/water, and acetone. The stationary phases were dried under vacuum overnight at 60° C.

Example 3

Synthesis of Highly Crosslinked Styrene Heptamer CMPES-SAM

Step 1: Same as above in Example 1.
Step 2: Friedel-Crafts Crosslinking (and Self-Condensation) of the CMPES-SAM Phase with Styrene Heptamer to Form PS-CMPES-SAM.

All glassware was rigorously cleaned in an ethanol-KOH bath, rinsed thoroughly with HPLC water, and dried at 150° C. overnight prior to use. Two grams of CMPES silica (surface density of CMPES=5.6±0.1 $\mu$moles/m$^2$ based upon carbon content) was slurried in 20 mL of nitrobenzene in a 150 mL round-bottomed flask and sonicated under vacuum for 30 minutes to fully wet the particle pores. Immediately after sonication, 3.11 grams of styrene heptamer (pre-dissolved in 10 mL of nitrobenzene) was added to the round-bottomed flask. The styrene heptamer:CMPES mole ratio was 2:1 (14:1 based on phenyl groups per CMPES). The slurry was magnetically stirred and placed in a thermostatted oil bath at 90° C. To the stirring slurry, 50 mL of 1.0 M AlCl$_3$ in nitrobenzene solution was transferred from the drybox and immediately added to the round-bottomed flask. The catalyst:CMPES mole ratio was 25:1. The total volume of the reaction mixture was 100 mL. An activated alumina column was used to prevent atmospheric water from deactivating the catalyst. The reaction mixture was stirred continuously at 90° C. for 24 hours. After the reaction, particles were filtered on a medium porosity grass fritted filter and washed sequentially with 250 mL of fresh nitrobenzene, and 500 mL of each of tetrahydrofuran, 30/70 tetrahydrofuran/water, and acetone. The stationary phases were dried under vacuum overnight at 60° C.

Example 4

Synthesis of Highly Crosslinked Styrene Heptamer Dimethyl-chloromethylphenylethylchlorosilane (SH-DM-CMPES)

Step 1: Monomeric Silanization with DM-CMPES

The DM-CMPES silica was synthesized with some modifications by a method summarized by Dorsey (U.S. Pat. No. 4,919,804).

All glassware was rigorously cleaned in an ethanol-KOH bath, rinsed thoroughly with HPLC water, and dried at 150° C. overnight prior to use. Five grams of the Type B ZORBAX silica were dried under vacuum at 160° C. overnight prior to use. After cooling to room temperature under vacuum, 5.0 grams of the dried silica was slurried in a 250-mL round-bottomed flask using 100 mL of fresh dichloromethane (new dichloromethane with <0.01% water was used each time). The slurry was sonicated under vacuum for 30 minutes to fully wet the pores. After sonication, 32 $\mu$moles/m$^2$ (of silica) of 2,6-lutidine (3.08 grams) were added to the slurry. 2,6-Lutidine (Aldrich) acted as an "acid scavenger" or silanization catalyst. The slurry was magnetically stirred and placed in a thermostatted oil bath at 50° C. To the stirring slurry, 16 $\mu$moles/m$^2$ (on silica) of DM-CMPES (3.56 grams of coated silica) were added. The total volume of the reaction mixture was 125 mL. An activated alumina column was used to prevent water contamination. The reaction mixture was refluxed at 50° C. for 24 hours.

After 24 hours, the silica particles were washed sequentially on a medium porosity glass fritted funnel with 500-mL aliquots of dichloromethane, tetrahydrofuran, methanol, methanol/water, and acetone. After washing, the DM-CMPES silica was dried under vacuum at 60° C.
Step 2: Friedel-Crafts Crosslinking (and Self Condensation) of the Monomeric Phase with Styrene Heptamer to Form SH-DM-CMPES.

All glassware was rigorously cleaned in an ethanol-KOH bath, rinsed thoroughly with HPLC water, and dried at 150° C. overnight prior to use. Four grams of DM-CMPES silica (surface density of DM-CMPES=2.9±0.1 $\mu$moles/m$^2$ based upon carbon content) was slurried in 20 mL of nitrobenzene in a 150-mL round-bottomed flask and sonicated under vacuum for 30 minutes to fully wet the particle pores.

Immediately after sonication, 3.22 grams of styrene heptamer (pre-dissolved in 10 mL of nitrobenzene) was added to the round-bottomed flask. The styrene heptamer:DM-CMPES mole ratio was 2:1. The slurry was magnetically stirred and placed in a thermostatted oil bath at 50° C. To the stirring slurry, 10.5 mL of 1.0 M $AlCl_3$ in nitrobenzene solution was transferred from the drybox and immediately added to the round-bottomed flask. The catalyst:CMPES mole ratio was 5:1. The total volume of the reaction mixture was 100 mL. An activated alumina column was used to prevent atmospheric water from deactivating the catalyst. The reaction mixture was stirred continuously at 90° C. for 24 hours.

After the reaction, particles were filtered on a medium porosity glass fritted filter and washed sequentially with 250 mL of fresh nitrobenzene, and 500 mL of each of tetrahydrofuran, 30/70 tetrahydrofuran/water, and acetone. The stationary phases were dried under vacuum overnight at 60° C.

Example 5

Synthesis of Highly Crosslinked $C_8$-Modified Phase Based on Styrene Heptamer DM-CMPES Steps 1 and 2: Same as above in Steps 1 and 2 of Example 4.

Step 3: Secondary Crosslinking upon Activation with Methoxychloromethane.

Four grams of the highly crosslinked styrene heptamer DM-CMPES (surface density of DM-CMPES=2.9±0.1 $\mu$moles/m$^2$ based upon carbon content) was slurried in 20 mL of nitrobenzene in a 50-mL round-bottomed flask and sonicated under vacuum for 30 minutes to fully wet the particle pores. Immediately after sonication, 1.69 grams of mehoxychloromethane were added to the round-bottomed flask in a fume hood. The methoxychloromethane:DM-CMPES mole ratio was 10:1. The slurry was magnetically stirred and placed in a thermostatted oil bath at 50° C. To the stirring slurry, 10.5 mL of 1.0 M $AlCl_3$ in nitrobenzene solution was transferred from the drybox and immediately added to the round-bottomed flask. The catalyst:CMPES mole ratio was 5:1. An activated alumina column was used to prevent atmospheric water from deactivating the catalyst. The reaction mixture was stirred continuously at 50° C. for 24 hours.

After 24 hours, particles were filtered on a medium porosity glass fritted filter and washed sequentially with 250 mL of fresh nitrobenzene, and 500 mL of each of tetrahydrofuran, 30/70 tetrahydrofuran/water, and acetone. The stationary phases were dried under vacuum overnight at 60° C.

Step 4: Simultaneous Derivatization with Octylbenzene and Benzene Endcapping of the Crosslinked Styrene Heptamer DM-CMPES Phase.

Four grams of the secondary crosslinked highly crosslinked styrene heptamer DM-CMPES from previous step was slurried in 20 mL of nitrobenzene in a 50-mL round-bottomed flask and sonicated under vacuum for 30 minutes to fully wet the particle pores. Immediately after sonication, 4.11 grams of octylbenzene were added to the round-bottomed flask in a fume hood. The octylbenzene:DM-CMPES mole ratio was 10:1. The slurry was magnetically stirred and placed in a thermostatted oil bath at 50° C. To the stirring slurry, 10.5 mL of 1.0 M $AlCl_3$ in nitrobenzene solution was transferred from the drybox and immediately added to the round-bottomed flask. The catalyst:CMPES mole ratio was 5:1. An activated alumina column was used to prevent atmospheric water from deactivating the catalyst. The reaction mixture was stirred continuously at 50° C. for 24 hours. After 24 hours, 1.0 mL of benzene was added directly to the round-bottomed flask. The reaction mixture was stirred continuously at 50° C. for 24 hours.

After the reaction, particles were filtered on a medium porosity glass fritted filter and washed sequentially with 250 mL of fresh nitrobenzene, and 500 mL of each of tetrahydrofuran, 30/70 tetrahydrofuran/water, and acetone. The stationary phase were dried under vacuum overnight at 60° C. prior to packing.

Step 5: Removal of Residual Chlorine by Hydrolysis in Hot Aqueous Acid.

Approximately 2.0 grams of stationary phase was slurried in isopropanol and sonicated for twenty minutes prior to packing. A 10.0×0.46 cm column was packed by downward slurry technique at a packing pressure of 5000 psi (35 MPa) using pure isopropanol as the driving solvent. High temperature acid washing of the column was performed on an HP 1090 Series II chromatograph. A heating apparatus from Systec Inc. (New Brighton, Minn.) was used to control the column temperature. This apparatus consisted of a mobile phase preheater assembly and insulating jacket, which allowed the column to be heated to 150° C. A 7.5/87.5/5.0 ACN/Water/TFA (pH=0.5) and an 87.5/7.5/5.0 ACN/Water/TFA (pH=0.5) mobile phase were used for channels A and B respectively. The following gradient profile was used to wash the phase.

| Time | Percent A | Percent B |
|---|---|---|
| 0.00–2.00 | 100 | 0 |
| 2.01–18.00 | 100% A → 100% B | |
| 18.01–25.00 | 0 | 100 |

After two gradient cycles, the column was removed from the heater and cooled by flushing with ACN at a flow rate of 2.0 mL/min for twenty minutes. After cooling, the phase was unpacked from the 10.0×0.46 cm column and dried under vacuum for at least 2 hours at 60° C.

Example 6

Synthesis of Highly Crosslinked $C_8$ Modified Phase with Complete Reaction of Residual Chlorine by Reaction with 1-Hexene Based on a Highly Crosslinked $C_8$ Modified Phase Steps 1 and 2: Same as in Steps 1 and 2 of Example 4.
Step 3 and 4: Same as in Steps 3 and 4 of Example 5.
Step 5: End-capping of Residual Chlorine by 1-Hexene through Friedel-Crafts Chemistry.

Approximately 1.5 grams of the Highly Crosslinked C8 (as made in Steps 1–3 of Example 5) phase were slurried in 15 mL of nitrobenzene in a 50-mL round-bottomed flask and sonicated under vacuum for 30 minutes to fully wet the particle pores. Immediately after sonication, 1.10 grams (approximately 1.75 mL) of 1-hexene was added to the round-bottomed flask. The slurry was magnetically stirred and placed in a thermostatted oil bath at 50° C. To the stirring slurry, 14.0 mL of 1.0 M $AlCl_3$ in nitrobenzene solution was transferred from the drybox and immediately added to the round-bottomed flask. The total volume of the reaction mixture was 30.75 mL. An activated alumina column was used to prevent atmospheric water from deactivating the catalyst. The reaction mixture was stirred continuously at 50° C. for 24 hours.

After the reaction, particles were filtered on a medium porosity glass fritted filter and washed sequentially with 250 mL of fresh nitrobenzene, and 500 mL of each of tetrahydrofuran, 30/70 tetrahydrofuran/water, and acetone. The stationary phases were dried under vacuum overnight at 60° C.

Example 7

Synthesis of Triply-Crosslinked DM-CMPES Phase
Steps 1 and 2: Same as in Steps 1 and 2 of Example 4.
Step 3: Same as in Step 3 of Example 5.
Step 4: Triply-Crosslinked DM-CMPES.

Approximately 1.5 grams of secondary crosslinked DM-CMPES phase (as made in Steps 1–3 of Example 5) was slurried in 15 mL of nitrobenzene in a 50-mL round-bottomed flask and sonicated under vacuum for 30 minutes to fully wet the particle pores. Immediately after sonication, 1.10 (1.4 mmole) of styrene heptamer (number average MW=770 g/mol) (pre-dissolved in 11 mL of nitrobenzene) was added to the round-bottomed flask. The slurry was magnetically stirred and placed in a thermostatted oil bath at 50° C. To the stirring slurry, 3.75 mL of 1.0 M $AlCl_3$ in nitrobenzene solution was transferred from the drybox and immediately added to the round-bottomed flask. The total volume of the reaction mixture was 29.75 mL. An activated alumina column was used to prevent atmospheric water from deactivating the catalyst. The reaction mixture was stirred continuously at 50° C. for 24 hours.

After the reaction, particles were filtered on a medium porosity glass fritted filter and washed sequentially with 250 mL of fresh nitrobenzene, and 500 mL of each of tetrahydrofuran, 30/70 tetrahydrofuran/water, and acetone. The stationary phases were dried under vacuum overnight at 60° C.

Example 8

Synthesis of Highly Crosslinked Polyethyleneimine DM-CMPES Phase (PEI-DM-CMPES)
Step 1: Same as in Step 1 of Example 4.
Step 2: Crosslinking of the Monomeric Phase with Polyethyleneimine.

All glassware was rigorously cleaned in an ethanol-KOH bath, rinsed thoroughly with HPLC water, and dried at 150° C. overnight prior to use. Three grams of DM-CMPES silica (surface density of DM-CMPES=2.9±0.1 $\mu$moles/m$^2$ based upon carbon content) was slurried in 30 grams of ethanol in a 250-mL two-necked round-bottomed flask and sonicated under vacuum for 30 minutes to fully wet the particle pores. After sonication, the slurry was magnetically stirred and placed in a thermostatted oil bath at 78° C. To the stirring slurry, 0.6 grams of polyethyleneimine (weight average MW=600, pre-dissolved in 30 grams of ethanol) were added drop-wise to the round-bottomed flask over 30 minutes through an addition funnel with pressure-equalization arm. The mole ratio of polyethyleneimine repeat unit:DM-CMPES was 8.6:1. The reaction mixture was stirred continuously at 78° C. for 24 hours.

After reaction, the particles were filtered on a medium porosity glass fritted funnel and washed sequentially with 500 mL of each of fresh ethanol, isopropanol, tetrahydrofuran, 30/70 tetrahydrofuran/water, and acetone. After washing, the stationary phases were dried under vacuum overnight at 60° C.
Step 3: Removal of Residual Chlorine by Hot Acid Washing.

Approximately 2.0 grams of stationary phase was slurried in isopropanol and sonicated for twenty minutes prior to packing. A 15.0×0.46 cm column was packed by downward slurry technique at a packing pressure of 5000 psi (35 MPa) using pure isopropanol as the driving solvent. High temperature acid washing of the column was performed on an HP 1090 Series II chromatograph. A heating apparatus from Systec Inc. (New Brighton, Minn.) was used to control the column temperature. This apparatus consisted of a mobile phase preheater assembly and insulating jacket, which allowed the column to be heated to 150° C. A 7.5/87.5/5.0 ACN/Water/TFA (pH=0.5) and a 87.5/7.5/5.0 ACN/Water/TFA (pH=0.5) mobile phase were used for channels A and B respectively. The following gradient profile was used to wash the phase at 1.0 mL/min.

| Time | Percent A | Percent B |
| --- | --- | --- |
| 0.00–1000 | 100 | 0 |
| 10.01–40.00 | 100% A → 100% B | |
| 40.01–50.00 | 0 | 100 |

After four gradient cycles, the column was removed from the heater and cooled by flushing with 50/50 ACN/H$_2$O at a flow rate of 1.0 mL/min for forty minutes. After cooling, the phase was unpacked from the 15.0×0.46 cm column and washed with 500 mL of each 50/50 ACN/H$_2$O, isopropanol, 0.01M NaOH aqueous solution, H$_2$O, acetone. After washing, the stationary phases were dried under vacuum for at least 2 hours at 60° C.

Example 9

Synthesis of Highly Crosslinked C$_8$ Modified Phase Based on Polyethyleneimine DM-CMPES
Step 1: Same as in Step 1 of Example 4.
Step 2: Same as in Step 2 of Example 8.
Step 3: Derivatization with Octyliodide.

A sample of 0.15 gram of the highly crosslinked polyethyleneimine DM-CMPES (surface density of polyethyleneimine repeat unit=4.2±0.1 $\mu$moles/m$^2$ based upon nitrogen content) was slurried in 3 grams of ethanol in a 25-mL round-bottomed flask and sonicated under vacuum for 30 minutes to fully wet the particles pores. After the sonication, 0.08 gram of 2,2,6,6-pentamethylpiperadine and 0.123 gram of octyliodide were added to the slurry. The 2,2,6,6-pentamethylpiperadine acted as an "acid scavenger" to aid the reaction between polyethyleneimine and octyliodide. The mole ratio of 2,2,6,6-pentamethylpiperadine:polyethyleneimine repeat unit was 5:1. The mole ratio of octyliodide:polyethyleneimine repeat unit was also 5:1. The reaction mixture was magnetically stirred at 78° C. for 24 hours.

After the reaction, particles were filtered on a medium porosity glass fritted filter and washed sequentially with 50 mL of each of fresh ethanol, isopropanol, tetrahydrofuran, 30/70 tetrahydrofuran/water, and acetone. The stationary phases were dried under vacuum overnight at 60° C.
Step 4: Same as in Step 3 of Example 8 (Removal of Residual Chlorine).

Example 10

Synthesis of Highly Crosslinked Styrene Heptamer Trivinylchlorosilane (SH-TVS) Stationary Phase Synthesis
Step 1: Monomeric Silanization with TVS.

The TVS silica was synthesized with some modifications by a method summarized by Dorsey (U.S. Pat. No. 4,919, 804). All glassware was rigorously cleaned in an ethanol-KOH bath, rinsed thoroughly with HPLC water, and dried at 150° C. overnight prior to use. Five grams of the Type B ZORBAX silica were dried under vacuum at 160° C. overnight prior to use. After cooling to room temperature under vacuum, 5.0 grams of the dried silica was slurried in a 250-mL round-bottomed flask using 50 mL of N, N-dimethylformamide. The slurry was sonicated under vacuum for 30 minutes to fully wet the pores. After sonication, 32 μmoles/m² (of silica) of 4-(dimethylamino) pyridine (DMAP) (3.52 grams) were added to the slurry. The DMAP acted as the "acid scavenger" or silanization catalyst. The slurry was magnetically stirred and placed in a thermostatted oil bath at 120° C. To the stirring slurry, 16 μmoles/m² (of silica) of TVS (2.08 grams) were added. The total volume of the reaction mixture was about 53 mL. An activated alumina column was used to prevent water contamination. The reaction mixture was refluxed at 120° C. for 24 hours.

After 24 hours, the silica particles were washed sequentially on a medium porosity glass fritted funnel with 500 mL aliquots of each of N, N-dimethylformamide, tetrahydrofuran, methanol, methanol/water, and acetone. After washing, the TVS silica was dried under vacuum at 60° C.

The 2,6-lutidine is used with the chloromethylphenyl silanes to prevent reaction of chlorine with the dimethyl amino group in DMAP. The trivinylsilane reagent does not react with DMAP and because DMAP gives a higher silane coverage DMAP is used as the silanization catalyst with trivinylsilane reagents.

Step 2: Friedel-Crafts Crosslinking of the Monomeric Phase with Styrene Heptamer.

All glassware was rigorously cleaned in an ethanol-KOH bath, rinsed thoroughly with HPLC water, and dried at 150° C. overnight prior to use. A sample of 2.5 grams of TVS silica (surface density of TVS=3.69±0.1 μmoles/m² based upon carbon content) was slurried in 10.8 mL of nitrobenzene in a 100-mL round-bottomed flask and sonicated under vacuum for 30 minutes to fully wet the particle pores. Immediately after sonication, 4.5 grams of styrene heptamer (pre-dissolved in 13.5 mL of nitrobenzene) was added to the round-bottomed flask. The slurry was magnetically stirred and placed in a thermostatted oil bath at 80° C. To the stirring slurry, 5.7 mL of 1.0 M AlCl₃ in nitrobenzene solution was transferred from the drybox and immediately added to the round-bottomed flask. The total volume of the reaction mixture was 30 mL. An activated alumina column was used to prevent atmospheric water from deactivating the catalyst. The reaction mixture was stirred continuously at 80° C. for 24 hours.

After the reaction, particles were filtered on a medium porosity glass fritted filter and washed sequentially with 250 mL of fresh nitrobenzene, and 500 mL of each of tetrahydrofuran, 30/70 tetrahydrofuran/water, and acetone. The stationary phases were dried under vacuum overnight at 60° C.

Example 11

Synthesis of Highly Crosslinked $C_8$ Modified Phase Based on Styrene Heptamer TVS ($C_8$-SH-TVS)

Steps 1 and 2: Same as in Steps 1 and 2 of Example 10.

Step 3: Derivatization with 1-Chlorooctane of the Crosslinked Styrene Heptamer SH-TVS Phase.

A sample of 1.35 grams of the highly crosslinked styrene heptamer TVS (surface density of TVS=3.69±0.1 μmoles/m² based upon carbon content) was slurried in 15 mL of nitrobenzene in a 50-mL round-bottomed flask and sonicated under vacuum for 30 minutes to fully wet the particle pores. Immediately after sonication, 4.0 milliliter of 1-chlorooctane was added to the round-bottomed flask in a fume hood. The slurry was magnetically stirred and placed in a thermostatted oil bath at 80° C. To the stirring slurry, 6.0 mL of 1.0 M AlCl₃ in nitrobenzene solution was transferred from the drybox and immediately added to the round-bottomed flask. An activated alumina column was used to prevent atmospheric water from deactivating the catalyst. The reaction mixture was stirred continuously at 80° C. for 24 hours.

After the reaction, particles were filtered on a medium porosity glass fritted filter and washed sequentially with 250 mL of fresh nitrobenzene, and 500 mL of each of tetrahydrofuran, 30/70 tetrahydrofuran/water, and acetone. The stationary phase were dried under vacuum overnight at 60° C. prior to packing.

Example 12

Synthesis of Fully Hydroxyl SH-DM-CMPES

Steps 1 and 2: Same as in Steps 1 and 2 of Example 4.

Step 3: Same as in Step 3 of Example 5 (Secondary Crosslinking with Methoxychloromethane).

Step 4: Same as in Step 4 of Example 5 (Removal of Residual Chloride).

Elemental Analysis

Tables 1–8 summarize the elemental analysis data for the sterically protected $C_{18}$ and certain of the crosslinked monolayer phases prepared above.

TABLE 1

Examples 1–3

| Ex. | Stationary phase | Elemental percentage | | | | Surface Coverage (micro mole/m²) | | | Atomic Weight Ratio (relative to Si) | | |
|---|---|---|---|---|---|---|---|---|---|---|---|
| | | C % | H % | Cl % | N % | C | Cl | N | C | Cl | N |
| | CMPES SAM | 9.39 | 0.79 | 3.07 | 0.00 | 5.57 | 5.54 | 0.00 | 10.82 | 3.54 | 0.00 |
| 1 | SC-CMPES SAM | 10.66 | 0.89 | 0.91 | 0.00 | 6.26 | 1.63 | 0.00 | 12.18 | 1.04 | 0.00 |
| 2 | TPM-CMPES SAM | 12.87 | 1.11 | 0.61 | 0.00 | 0.99ᵃ | 1.12 | 0.00 | 15.07 | 0.71 | 0.00 |

TABLE 1-continued

Examples 1–3

| Ex. | Stationary phase | Elemental percentage | | | | Surface Coverage (micro mole/m$^2$) | | | Atomic Weight Ratio (relative to Si) | | |
|---|---|---|---|---|---|---|---|---|---|---|---|
| | | C % | H % | Cl % | N % | C | Cl | N | C | Cl | N |
| 3 | PS-CMPES SAM | 14.45 | 1.26 | 0.12 | 0.00 | 0.37$^b$ | 0.22 | 0.00 | 17.17 | 0.14 | 0.00 |

TABLE 2

Examples 4–5

| Ex. | Stationary phase | Elemental percentage | | | | Surface Coverage (micro mole/m$^2$) | | | Atomic Weight Ratio (relative to Si) | | |
|---|---|---|---|---|---|---|---|---|---|---|---|
| | | C % | H % | Cl % | N % | C | Cl | N | C | Cl | N |
| 4 | DM-CMPES | 6.29 | 0.83 | 1.51 | 0.00 | 3.54 | 2.59 | 0.00 | 6.88 | 1.65 | 0.00 |
| | SH-DM-CMPES | 6.34 | 0.65 | 0.00 | 0.00 | 0.00444$^b$ | 0.00 | 0.00 | 6.82 | 0.00 | 0.00 |
| 5 | Secondary Crosslinked SH-DM-CMPES | 7.25 | 0.88 | 1.24 | 0.00 | 4.65$^c$ | 2.14 | 0.00 | 8.00 | 1.37 | 0.00 |
| | Highly Crosslinked C8 | 10.89 | 1.05 | 0.54 | 0.00 | 1.38$^d$ | 0.97 | 0.00 | 12.44 | 0.62 | 0.00 |
| | Benzene endcapped Highly Crosslinked C8 | 11.21 | 0.91 | 0.37 | 0.00 | 0.28$^e$ | 0.66 | 0.00 | 12.81 | 0.42 | 0.00 |
| | Acid conditioned Highly Crosslinked C8 | 11.00 | 0.93 | 0.00 | 0.00 | 0.27$^e$ | 0.00 | 0.00 | 12.49 | 0.00 | 0.00 |

TABLE 3

Example 6

| Ex. | Stationary phase | Elemental percentage | | | | Surface Coverage (micro mole/m$^2$) | | | Atomic Weight Ratio (relative to Si) | | |
|---|---|---|---|---|---|---|---|---|---|---|---|
| | | C % | H % | Cl % | N % | C | Cl | N | C | Cl | N |
| 6 | DM-CMPES | 6.29 | 0.88 | 1.39 | 0.00 | 3.54 | 2.38 | 0.00 | 6.88 | 1.52 | 0.00 |
| | SH-DM-CMPES | 6.46 | 0.91 | 0.00 | 0.00 | 0.0152$^b$ | 0.00 | 0.00 | 6.97 | 0.00 | 0.00 |
| | Secondary Crosslinked SH-DM-CMPES | 7.45 | 0.86 | 1.72 | 0.00 | 5.09$^c$ | 2.99 | 0.00 | 8.28 | 1.91 | 0.00 |
| | Highly Crosslinked C8 | 11.41 | 1.16 | 0.43 | 0.00 | 1.51$^d$ | 0.77 | 0.00 | 13.11 | 0.49 | 0.00 |
| | Hydrophobic Highly Crosslinked C8 phase | 11.57 | 1.41 | 0.00 | 0.00 | 0.14$^e$ | 0.00 | 0.00 | 13.30 | 0.00 | 0.00 |

TABLE 4

Example 7

| Ex. | Stationary phase | Elemental percentage | | | | Surface Coverage (micro mole/m$^2$) | | | Atomic Weight Ratio (relative to Si) | | |
|---|---|---|---|---|---|---|---|---|---|---|---|
| | | C % | H % | Cl % | N % | C | Cl | N | C | Cl | N |
| 7 | DM-CMPES | 6.28 | 0.88 | 1.41 | 0.00 | 3.53 | 2.41 | 0.00 | 6.87 | 1.54 | 0.00 |
| | SH-DM-CMPES | 5.98 | 0.88 | 0.00 | 0.00 | N/A | 0.00 | 0.00 | 6.42 | 0.00 | 0.00 |
| | Secondary Crosslinked SH-DM-CMPES | 7.25 | 0.92 | 1.45 | 0.00 | 6.51$^c$ | 2.51 | 0.00 | 8.02 | 1.60 | 0.00 |
| | Triply Crosslinked SH-DM-CMPES | 9.99 | 1.06 | 0.67 | 0.00 | 0.26$^b$ | 1.19 | 0.00 | 11.32 | 0.76 | 0.00 |

TABLE 5

Example 8

| Ex. | Stationary phase | Elemental percentage | | | | Surface Coverage (micro mole/m²) | | | Atomic Weight Ratio (relative to Si) | | |
|---|---|---|---|---|---|---|---|---|---|---|---|
| | | C % | H % | Cl % | N % | C | Cl | N | C | Cl | N |
| 8 | DM-CMPES | 6.18 | 0.77 | 1.32 | 0.00 | 3.47 | 2.25 | 0.00 | 6.74 | 1.44 | 0.00 |
| | PEI DM-CMPES | 7.51 | 1.12 | 0.00 | 1.00 | 0.23$^f$ | 0.00 | 0.14 | 8.31 | 0.00 | 1.11$^h$ |
| | Acid washed PEI DM-CMPES | 7.51 | 1.04 | 0.00 | 0.91 | 0.23$^f$ | 0.00 | 0.12 | 8.29 | 0.00 | 1.01$^h$ |

TABLE 6

Example 9

| Ex. | Stationary phase | Elemental percentage | | | | Surface Coverage (micro mole/m²) | | | Atomic Weight Ratio (relative to Si) | | |
|---|---|---|---|---|---|---|---|---|---|---|---|
| | | C % | H % | Cl % | N % | C | Cl | N | C | Cl | N |
| 9 | DM-CMPES | 6.38 | 0.88 | 1.39 | 0.00 | 3.59 | 2.38 | 0.00 | 6.98 | 1.52 | 0.00 |
| | PEI DM-CMPES | 7.70 | 0.96 | 0.00 | 0.96 | 0.23$^f$ | 0.00 | 0.13 | 8.52 | 0.00 | 1.06$^h$ |
| | C8-PEI-DM-CMPES | 10.56 | 1.52 | 0.00 | 0.98 | 1.90$^g$ | 0.00 | 0.14 | 12.15 | 0.00 | 1.13$^h$ |

TABLE 7

Examples 10–11

| Ex. | Stationary phase | Elemental percentage | | | | Surface Coverage (micro mole/m²) | | | Atomic Weight Ratio (w/w Si) | | |
|---|---|---|---|---|---|---|---|---|---|---|---|
| | | C % | H % | Cl % | N % | C | Cl | N | C | Cl | N |
| 10 | TVS | 4.46 | 0.57 | 0.00 | 0.00 | 2.42 | 0.00 | 0.00 | 4.70 | 0.00 | 0.00 |
| | SH-Crosslinked TVS | 5.67 | 0.65 | 0.00 | 0.00 | 0.11$^b$ | 0.00 | 0.00 | 6.05 | 0.00 | 0.00 |
| 11 | SH-Crosslinked TVS C8 | 6.28 | 1.03 | 0.00 | 0.00 | 0.38$^g$ | 0.00 | 0.00 | 6.78 | 0.00 | 0.00 |

TABLE 8

Example 12

| Ex. | Stationary phase | Elemental percentage | | | | Surface Coverage (micro mole/m²) | | | Atomic Weight Ratio (relative to Si) | | |
|---|---|---|---|---|---|---|---|---|---|---|---|
| | | C % | H % | Cl % | N % | C | Cl | N | C | Cl | N |
| 12 | DM-CMPES | 6.38 | 0.77 | 1.30 | 0.00 | 3.58 | 2.22 | 0.00 | 6.97 | 1.42 | 0.00 |
| | SH-DM-CMPES | 5.69 | 0.69 | 0.00 | 0.00 | N/A | 0.00 | 0.00 | 6.08 | 0.00 | 0.00 |
| | 2nd linked SH-DM-CMPES | 7.29 | 0.75 | 1.65 | 0.00 | 8.20$^c$ | 2.86 | 0.00 | 8.07 | 1.83 | 0.00 |
| | Fully Hydrolyzed 2nd linked SH-DM-CMPES | 7.00 | 0.76 | 0.00 | 0.00 | N/A | 0.00 | 0.00 | 7.59 | 0.00 | 0.00 |

By assuming there is no loss of organic moiety from substrate surface, $^a)$ surface coverage of triphenylmethane was calculated based on the increase of C % relative to its predecessor. $^b)$ surface coverage of styrene heptamers was calculated based on the increase of C % relative to its predecessor. $^c)$ surface coverage of methylene linkage was calculated based on the increase of C % relative to its predecessor. $^d)$ surface coverage of phenyl-C8 groups was calculated based on the increase of C % relative to its predecessor. $^e)$ surface coverage of benzene/C6 groups was calculated based on the increase of C % relative to its predecessor $^f)$ surface coverage of polyethyleneimine was calculated based on the increase of C % relative to its predecessor. $^g)$ surface coverage of C8 was calculated based on the increase of C % relative to its predecessor. $^h)$ surface coverage of PEI was calculated based on the increase of N % relative to its predecessor.

The commercial sterically protected $C_{18}$ stationary phases (ZORBAX from Agilent) had approximately 10% (w/w) carbon. This corresponds to a surface density of 1.8 micromoles/m². The surface density was calculated by the following equation, $$\text{Surface density } (\mu\text{moles/m}^2) = \frac{10^6 \times (\% \text{ carbon}/100)}{SA \times N_c \times MW_c} \quad (1)$$

where SA is the surface in m²/g, $N_c$ is the number of carbon atoms in the silane, and $MW_c$ is the atomic weight of carbon.

The carbon and chlorine content of the self-assembled CMPES monolayer (CMPES-SAM) stationary phase was 10.82% and 3.54%, respectively. This result is consistent with the ratio of carbon to chlorine in the self-assembled CMPES. The calculated surface density of the phase was 5.6±0.05 micromoles/m². The high bonding density of this phase makes it a useful platform for building a highly crosslinked self-assembled monolayer stationary phase. The high density of reactive chlorine on the surface is well-suited for obtaining a highly crosslinked surface layer which resists acid catalyzed hydrolysis of the stationary phase. As shown in Table 1, treatment with the aluminum chloride catalyst resulted in a dramatic decrease in chlorine content and substantial increase in carbon content for all phases. For the self-crosslinked CMPES-SAM, the chlorine content decreased by approximately 70%. This drop in chlorine content indicated significant crosslinking of the self-assembled phenyl rings on the surface. An increase in the total weight percent carbon was expected because the heavy chlorine in the sample was consumed. The amount of chlorine lost when styrene heptamer and triphenylmethane were added as crosslinking reagents was approximately 96% and 80%, respectively. The increase in carbon content for theses phases was approximately 6.2% and 4.1%, respectively. Since self-crosslinking and reaction between the crosslinker and the surface were occurring simultaneously with different, unknown rates, elemental analysis data alone is not able to quantitatively determine the percent of chlorine consumed by each reaction. For the styrene heptamer crosslinked DM-CMPES, which is more desirable chromatographically compared to CMPES-SAM (see below), the carbon and chlorine content data show a reasonably high surface density of about 2.9 μmoles/m² of DM-CMPES groups. This is comparable to the best commercially available stationary phases, which have at most 3.0–3.5 μmoles/m² of bonded ligands.

The material of Example 5 was prepared using four Friedel-Crafts steps after the initial silanization with DM-CMPES and Friedel-Crafts crosslinking with styrene heptamer. The steps were chloromethylation and secondary crosslinking, octylbenzene derivatization, benzene endcapping and residual chlorine hydrolysis. In order to better understand this multi-step synthesis, the product from each stage in the reaction was characterized by elemental analysis. The elemental analysis data is summarized in Table 2.

Based upon the carbon and chlorine content, the chloromethylation and secondary crosslinking step added 5.60±0.05 μmoles/m² of $CH_2$ crosslinks and 3.3±0.1 μmoles/m² of chloromethyl groups. The percent carbon increase indicates that octylbenzene derivatization resulted in the bonding of 1.30±0.05 μmoles/m² of octylbenzene chains to the highly crosslinked stationary phase. The decrease in chlorine content after octylbenzene derivatization corresponds to approximately 1.9±0.1 μmoles/m² of chlorine consumption. The surface density of chlorine consumed was higher than the surface density of octylbenzene groups added to the phase. This suggests that some octylbenzene groups were multiply bonded to the highly crosslinked phase. The chlorine content after octylbenzene derivatization corresponds to approximately 1.4±0.1 μmoles/m². Benzene "endcapping" added 0.34±0.05 μmoles/m² of benzene. Once again, the amount of chlorine consumed (0.6±0.1 μmoles/m²) in the reaction was higher than the amount of benzene added, thus suggesting the formation of multiple bonds between the added benzene rings and the stationary phase surface. Both the elemental analysis data and the $^{13}C$ NMR spectra of the highly crosslinked $C_8$ phase before and after acid hydrolysis (data not shown) indicated that the residual 0.8±0.1 μmoles/m² of chloromethyl groups were completely hydrolyzed to give $CH_2OH$ groups.

Dynamic Stability Testing

The crosslinked self-assembled monolayer phases prepared as described above were compared to the silica-based stationary phase (ZORBAX SB-C18 from Agilent) with the best acid stability commercially available. It is very important to note that the reaction conditions described above have by no means been optimized to maximize stability. Dynamic acid stability comparisons of the crosslinked phases with the sterically protected $C_{18}$ (ZORBAX SB-C18) are discussed below.

There were two goals for the dynamic acid stability testing. The first goal was to show how Friedel-Crafts crosslinking impacts the overall acid stability of a self-assembled monolayer phase. The second goal was to compare the retention stability of our crosslinked phases to the sterically protected $C_{18}$ phase.

FIGS. 7 and 8A–D summarizes the normalized retention data for decylbenzene as a function of column volumes of acidic mobile phase purge on the self-assembled CMPES with no crosslinking, the crosslinked monolayer stationary phases of Examples 1, 2, 3, 4, 5, 6, 11, and 12, and the commercial sterically protected $C_{18}$ phase.

A very acidic mobile phase containing 5% volume/volume (v/v) TFA and a high column temperature were required to make the timescale of the acid stability testing reasonable. This is an accelerated acid stability test. It is reasonable to infer that a stationary phase with the best stability under such harsh conditions will have the longer lifetime under more typical acid mobile phase conditions and column temperatures.

Figure 7:
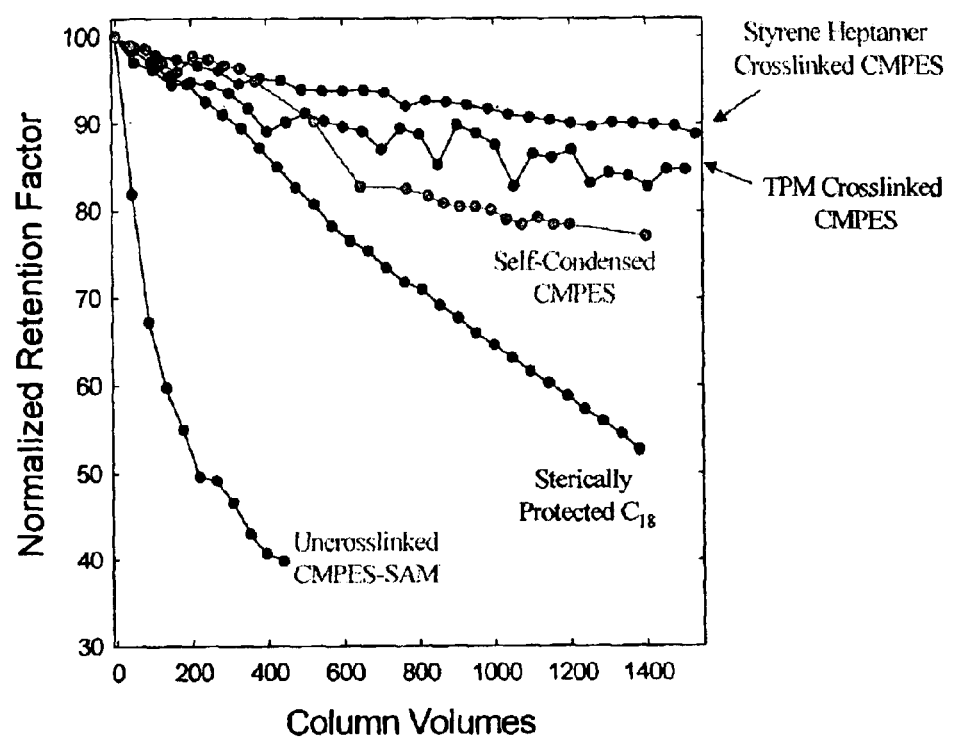
FIG. 7. Dynamic acid stability comparison of Sterically Protected $C_{18}$ and Uncrosslinked and Crosslinked Self-Assembled Monolayer Stationary Phases (Examples 1, 2, and 3). Columns: 5.0×0.46 cm; Mobile Phase: 47.5/47.5/5.0 ACN/$H_2O$/TFA, pH=0.5; T=150° C.; Flow Rate=2.0 mL/min; Solute=Decylbenzene.

As shown in FIG. 7, the retention factor trend for decylbenzene on all of the Friedel-Crafts crosslinked self-assembled monolayer phases is markedly different compared to the CMPES stationary phase with no crosslinking. The retention factor of decylbenzene dropped by 60% in 500 column volumes on self-assembled CMPES with no crosslinking. In contrast, the retention factor of decylbenzene on the styrene heptamer crosslinked (Example 3), triphenylmethane crosslinked (Example 2) and self-crosslinked (Example 1) CMPES phases dropped by only 10%, 14%, and 22%, respectively in 1400 column volumes. This data strongly indicates that Friedel-Crafts crosslinking provides a drastic improvement in the acid stability of the self-assembled monolayer.

The retention factor stability on the sterically protected $C_{18}$ stationary phase was significantly worse compared to all of the crosslinked, self-assembled CMPES monolayer stationary phases. The retention factor of decylbenzene decreased by 45% in 1400 column volumes on the sterically protected $C_{18}$. As stated above, the crosslinked self-assembled phases showed a dramatically lower loss in retention at 10–22%. This level of acid stability enhancement makes this type of phase a substantial advancement in the synthesis of silica-based stationary phases for separations requiring low pH mobile phases Despite the incomplete crosslinking of the CMPES monolayer phases (up to 30% of the surface chlorine remained), this approach gives stationary phases that are significantly more resistant to acid catalyzed hydrolysis than a sterically protected $C_{18}$ stationary phase. It is believed that unreacted chlorine indicates that there are areas of the surface that are less densely crosslinked than others. Since Friedel-Crafts crosslinking dramatically improves the acid stability of the self-assembled CMPES monolayer, which is only bonded to the surface and neighboring CMPES molecules via siloxane bonds, it is reasonable to draw the conclusion that complete crosslinking (0% chlorine remaining) will give a stationary phase with even further enhanced acid stability.

Figure 8A:
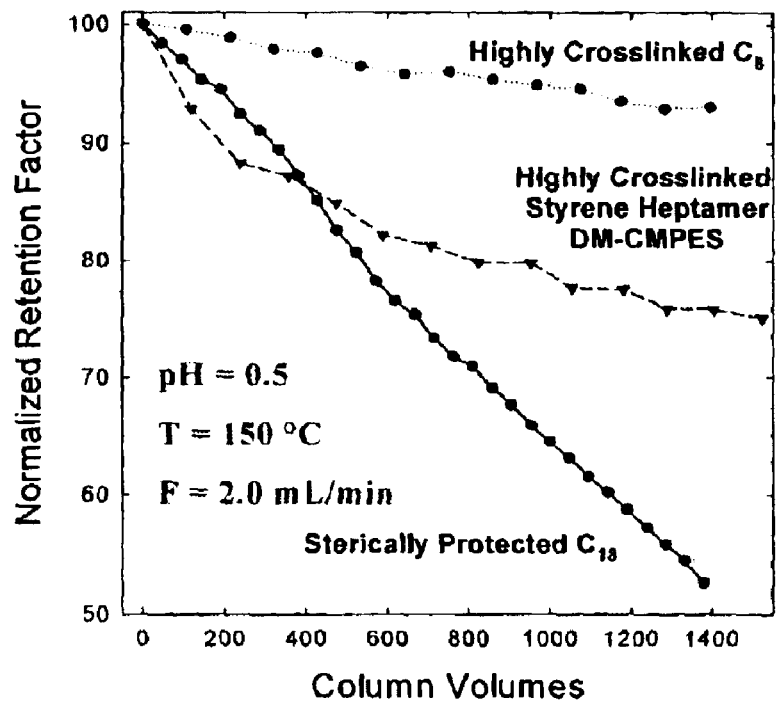
FIGS. 8A–D. Dynamic acid stability comparison of Sterically Protected $C_{18}$ and Uncrosslinked and Crosslinked Self-Assembled Monolayer Stationary Phases (Examples 4, 5, 6, 11, and 12). Columns: 5.0×0.46 cm; Mobile Phase: 47.5/47.5/5.0 ACN/$H_2O$/TFA, pH=0.5; T=150° C.; Flow Rate=2.0 mL/min; Solute=Decylbenzene.

The results of the dynamic acid stability testing of the highly crosslinked styrene heptamer DM-CMPES (Example 4) are shown in FIG. 8A. Examination of the k' trends showed that the highly crosslinked styrene heptamer DM-CMPES is substantially more stable under very aggressive conditions compared to the sterically protected $C_{18}$. After 1400 column volumes of acid aging mobile phase, the highly crosslinked styrene heptamer DM-CMPES phase lost approximately 22% of its initial retention while the sterically protected $C_{18}$ phase lost approximately 45% of its initial retention. The initial rate of k' loss was somewhat faster for the highly crosslinked styrene heptamer DM-CMPES of Example 4 than for the sterically protected $C_{18}$, but the rate of loss slowed considerably after the first 400 column volumes of acid aging mobile phase and became substantially slower than the rate of k' loss for the sterically protected $C_{18}$. The k' loss trend for the highly crosslinked styrene heptamer DM-CMPES was consistent with the hydrolysis and removal of incompletely bonded stationary phase early in the aging process (percent carbon loss is less than 0.5%). Once the majority of the weakly bonded material was removed, the rate of bonded phase loss and the rate of k' loss slowed. It is important to keep in mind that the highly crosslinked styrene heptamer DM-CMPES was not Soxhlet extracted or extensively acid washed prior to testing. Despite the lack of thorough post-synthetic clean-up, the highly crosslinked styrene heptamer DM-CMPES phase of Example 4 was substantially more stable than the sterically protected $C_{18}$ phase under very aggressive acidic conditions.

The dynamic acid stability comparison of the highly crosslinked $C_8$ stationary phase material of Example 5 is also shown in FIG. 8A. It is immediately obvious that the highly crosslinked $C_8$ phase is much more stable under very aggressive acid aging conditions. The highly crosslinked $C_8$ phase of Example 5 also demonstrated significant improvement in acid stability over its parent phase, the highly crosslinked styrene heptamer DM-CMPES phase of Example 4 (FIG. 8A), which illustrates the benefit of the second crosslinking step and the addition of the alkyl groups. The highly crosslinked $C_8$ phase of Example 5 lost only 7% of its initial retention compared to the approximately 22% loss in retention experienced by its parent phase (Example 4). The sterically protected $C_{18}$ phase was the least stable losing nearly 50% of its retention in 1400 column volumes.

Figure 8B:
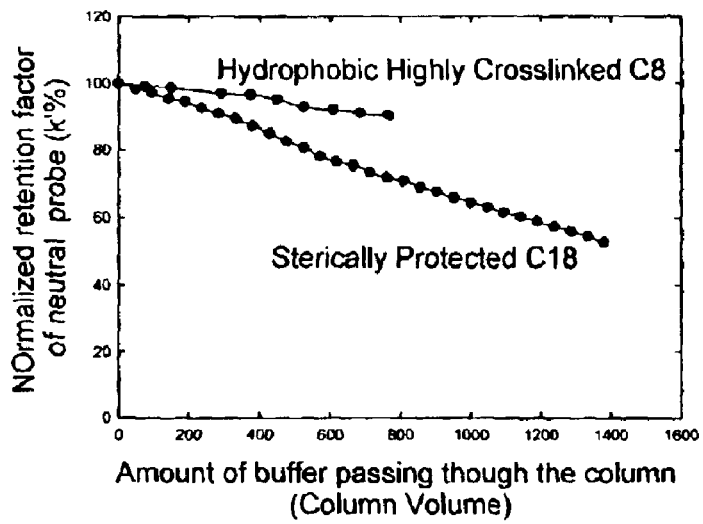
Figure 8C:
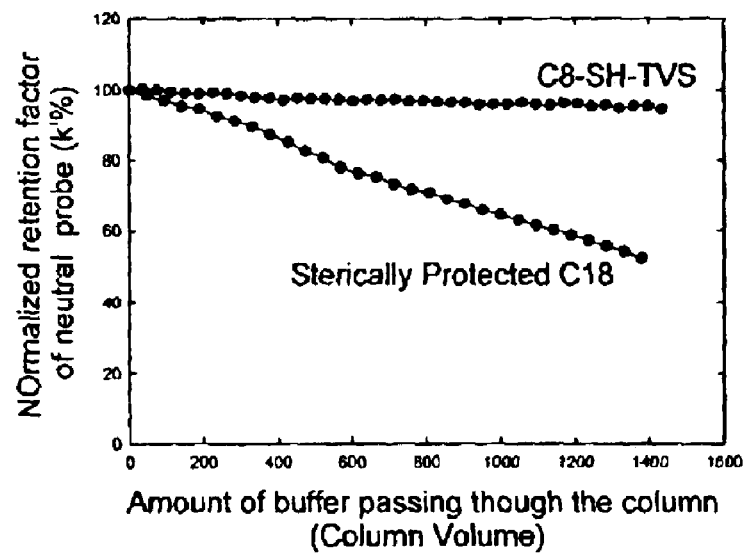
Figure 8D:
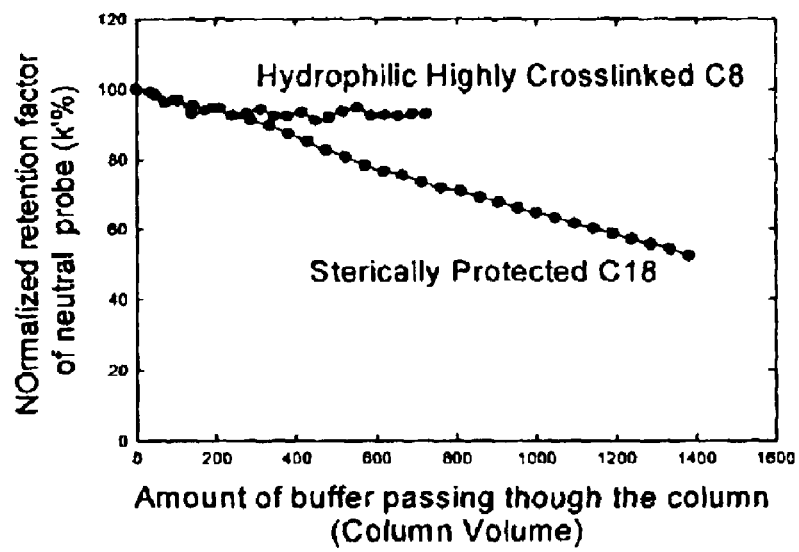

As shown in FIG. 8C the crosslinked TVS phase (Example 11) is extraordinarily stable and shows very little percent loss in k'. It is believed that this results from the multivalent nature of the silane, which has three reactive functional groups, and the high reactivity of the olefinic group towards Friedel-Crafts crosslinking with heptylstyrene with the $AlCl_3$ catalysis. The data of FIG. 8D (material of Example 12) shows that the conversion of all chloro groups to hydroxyl groups did not decrease the phase stability compared to the more hydrophobic phase of Example 6 (FIG. 8B).

Efficiency Characterization

The chromatographic efficiency of the crosslinked self-assembled CMPES monolayer phases has been evaluated by inverse size exclusion chromatography and flow curve analysis. The calculated pore accessibility and flow curve of bare silica, material of the present invention, and the sterically protected $C_{18}$ (ZORBAX SB-C18) stationary phases are compared below.

Inverse size exclusion chromatography evaluates the accessibility of the pores through simple elution volume measurements. The fraction of pore volume accessible to a particular solute, K, is calculated as shown in the equation, $$K = \frac{V_{SOLUTE} - V_{EX}}{V_{TOTAL} - V_{EX}} = \text{fraction of total pore volume accessible} \quad (2)$$

where $V_{TOTAL}$=total pore and interstitial volume (elution volume of toluene), $V_{EX}$=interstitial volume (elution volume of a 6,000,00 g/mol polystyrene), and $V_{SOLUTE}$=elution volume of a particular polystyrene standard.

Figure 9:
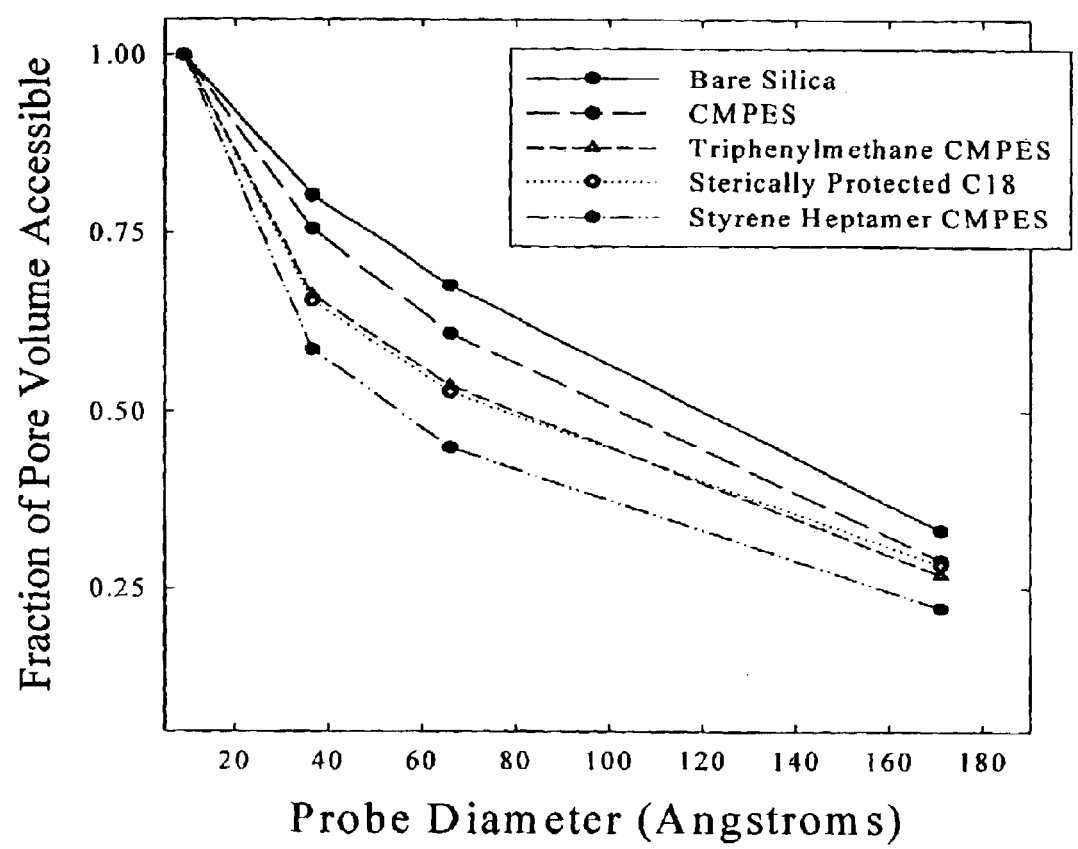
FIG. 9. Plot of pore accessibility of Sterically Protected $C_{18}$ and Crosslinked Self-Assembled Monolayer Stationary Phases (Examples 1, 2, and 3) by inverse size exclusion chromatography. Mobile Phase: 100% THF, T=40° C.; Flow Rate=1.0 mL/min.

The K values for the polystyrene standards on the different columns are shown graphically in FIG. 9. Toluene is used as the totally included solute. By definition, its K value is one on all stationary phases. The pore accessibility of the bare silica used in the synthesis of the crosslinked self-assembled monolayer phases was evaluated to determine how each step in the synthesis effects the pore volume. As shown in FIG. 9, the pore volume decreased as the total amount of stationary phase (as measured by carbon content) increased. This result is not surprising. Interestingly, the pore accessibility of triphenylmethane crosslinked CMPES-SAM of Example 2 (13.3% carbon) was nearly identical to the sterically protected $C_{18}$ phase (10.1% carbon), but the pore accessibility of styrene heptamer crosslinked CMPES-SAM of Example 3 was the lowest of all phases shown in FIG. 9, but this is not surprising because of its high carbon loading.

Similarly, for the highly crosslinked $C_8$ stationary phase of Example 5, the pore volume decreased as the total amount of stationary phase (as measured by carbon content) increased (data not shown).

For chromatographic stationary phases, it is very important to determine if the stationary phase synthesis had significantly blocked any of the pores of the silica substrate. It is well known that pore blockage leads to poor mass transfer in the stationary zone, thus giving poor chromatographic efficiency. A couple of simple calculations using the inverse size exclusion chromatography data shown in FIG. 9 and carbon content data allows for a much more quantitative comparison of the crosslinked self-assembled CMPES phases and the sterically protected $C_{18}$ phase. This is done by comparing the volume of stationary phase as calculated from inverse size exclusion chromatography data and by the carbon content (loading) data. The volume of the stationary phase is calculated with the following equations, $$V_{PORE, ISEC} = V_{TOTAL} - V_{EX} \quad (3)$$

$$V_{PHASE, ISEC}(\text{Phase } X) = V_{PORE, ISEC}(\text{Bare Silica}) - V_{PORE, ISEC}(\text{Phase } X) \quad (4)$$

$$V_{PHASE, \% C} = \frac{(\% \text{ carbon}/100) * 0.85}{\rho} \quad (5)$$

where 0.85 is the number of grams of stationary phase in each column and $\rho$ is an estimate of the density (g/ml) of the stationary phase. If significant pore blocking is occurring, the $V_{PHASE,ISEC}$ will be significantly larger than the calculated $V_{PHASE, \% C}$. For a reasonably uniform coating of stationary phase (little or no pore blockage), the $V_{PHASE,ISEC}$ will be approximately equal to the calculated $V_{PHASE, \% C}$.

The results of this comparison are given in Table 9.

TABLE 9

Calculated Pore Accessibility Data for Sterically Protected $C_{18}$ and Crosslinked Self-Assembled Monolayer Stationary Phases.

| Stationary Phase | Percent Carbon (±0.10%) | $V_{PORE}$ by ISEC | Calculated $V_{Phase}$ by % $C^a$ | Calculated $V_{Phase}$ by ISEC |
|---|---|---|---|---|
| Bare Silica | 0.0% | 0.239 mL | 0.000 mL | 0.000 mL |
| CMPES-Silica (Example 1) | 11.0% | 0.168 mL | 0.072 mL | 0.071 mL |
| TPM-CMPES-SAM (Example 2) | 13.2% | 0.157 mL | 0.087 mL | 0.082 mL |
| Sterically Protected $C_{18}$ | 10.1% | 0.176 mL | 0.107 mL | Not Available[b] |
| SH-CMPES-SAM (Example 3) | 17.2% | 0.143 mL | 0.112 mL | 0.096 mL |
| Highly Crosslinked $C_8$-DC-CMPES (Example 5) | 13.0% | 0.176 mL | 0.065 mL | 0.061 mL |

[a]A reasonable estimate for the density of the phases was used in the calculation (1.3 g/mL for CMPES phases, 0.80 g/ml for Sterically Protected $C_{18}$).
[b]The pore volume of the bare silica used for this stationary phase was not provided by the manufacturer.

The $V_{PHASE,ISEC}$ for the self-assembled CMPES-SAM and all of the crosslinked self-assembled CMPES-SAM phases was approximately equal to the calculated $V_{PHASE, \% C}$. This is strong evidence that neither the self-assembly of CMPES nor the crosslinking leads to chromatographically deleterious pore blockage of the silica.

Similarly, for the material of Example 5, the $V_{PHASE,ISEC}$ was approximately equal to the calculated $V_{PHASE, \% C}$. This is strong evidence that none of the steps in the stationary phase synthesis leads to pore blockage of the silica.

The efficiency of crosslinked self-assembled CMPES-SAM phases and the sterically protected $C_{18}$ stationary phases were further compared by generating a flow curve and performing a van Deemter equation fit of the data. Styrene heptamer crosslinked CMPES-SAM (Example 3) was used for the comparison because of its high carbon loading. By comparing the phase with the highest loading to the sterically protected $C_{18}$, the "worst case" efficiency for the crosslinked self-assembled CMPES phases synthesized was determined.

Figure 10:
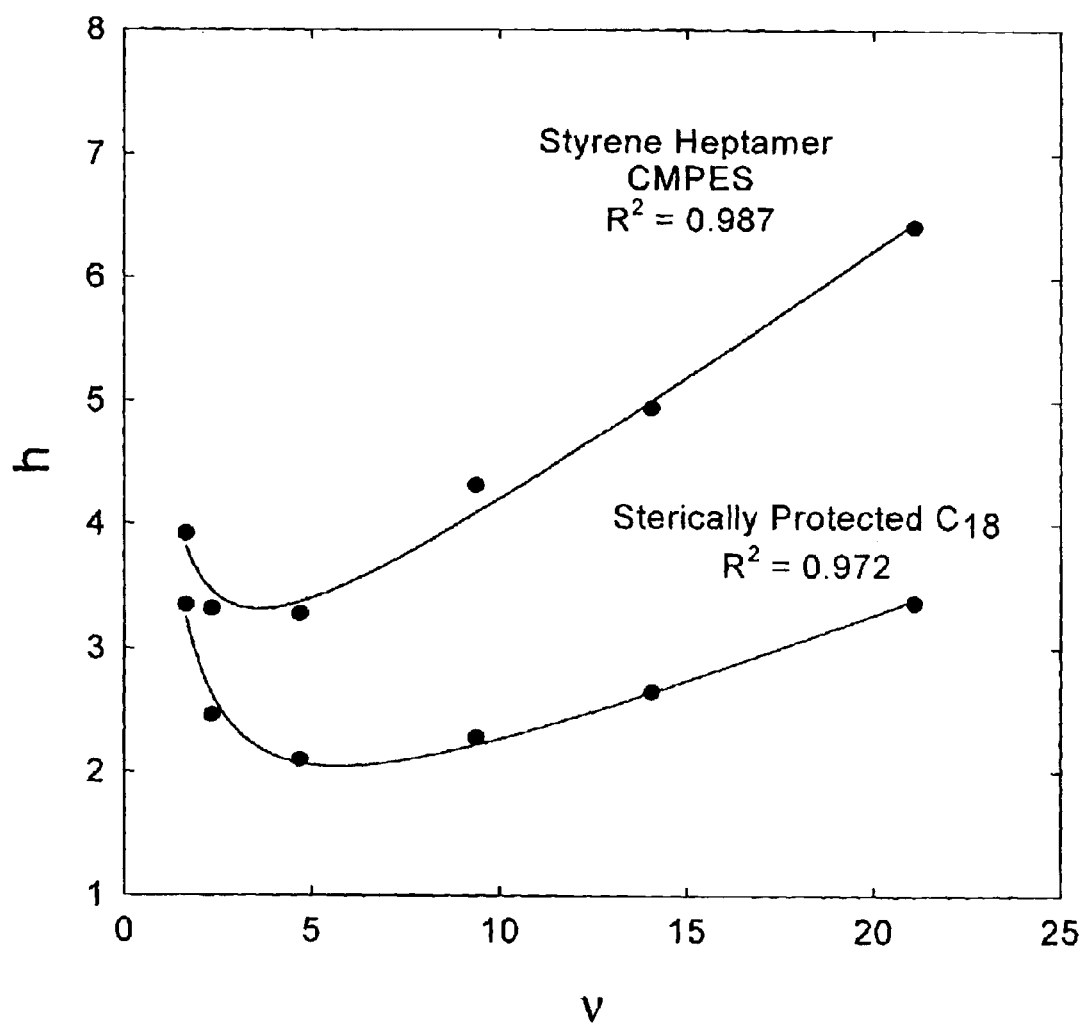
FIG. 10. Flow curve comparison of Sterically Protected $C_{18}$ and Styrene Heptamer Crosslinked CMPES (Example 3). The van Deemter equation was used to obtain the curve fit. Solute: Toluene (k'=1.6).

The flow curves for the two phases and the van Deemter coefficients are shown in FIG. 10 and Table 10.

TABLE 10 van Deemter Flow Curve Coefficients for Sterically Protected $C_{18}$ and Styrene Heptamer Crosslinked CMPES Stationary Phases

| Stationary Phase | A | B | C |
|---|---|---|---|
| Sterically Protected $C_{18}$ | 0.68 ± 0.21 | 3.9 ± 0.4 | 0.12 ± 0.01 |
| Styrene Heptamer CMPES (Example 3) | 1.78 ± 0.31 | 2.8 ± 0.6 | 0.22 ± 0.02 |

It is immediately obvious that the styrene heptamer crosslinked CMPES-SAM (A=1.78) is not as well-packed as the sterically protected $C_{18}$ phase (A=0.68). This is not surprising because the packing procedure for the styrene heptamer crosslinked CMPES has never been optimized. It is also evident that the resistance to mass transfer in the stationary zone is higher for the styrene heptamer crosslinked CMPES compared to the sterically protected $C_{18}$. This result is also not very surprising because the amount of stationary phase on the styrene heptamer crosslinked CMPES is 6% higher (as measured by carbon content) than the sterically protected $C_{18}$. It is very important to remember that the styrene heptamer crosslinked CMPES synthesis conditions have never been adjusted to optimize the chromatographic efficiency. Despite the lack of packing and synthetic optimization, the styrene heptamer crosslinked CMPES-SAM gave acceptable chromatographic efficiency.

Chromatography Experiments

The mobile phases, flow rates, and column temperatures are given in the figure captions.

Figure 11:
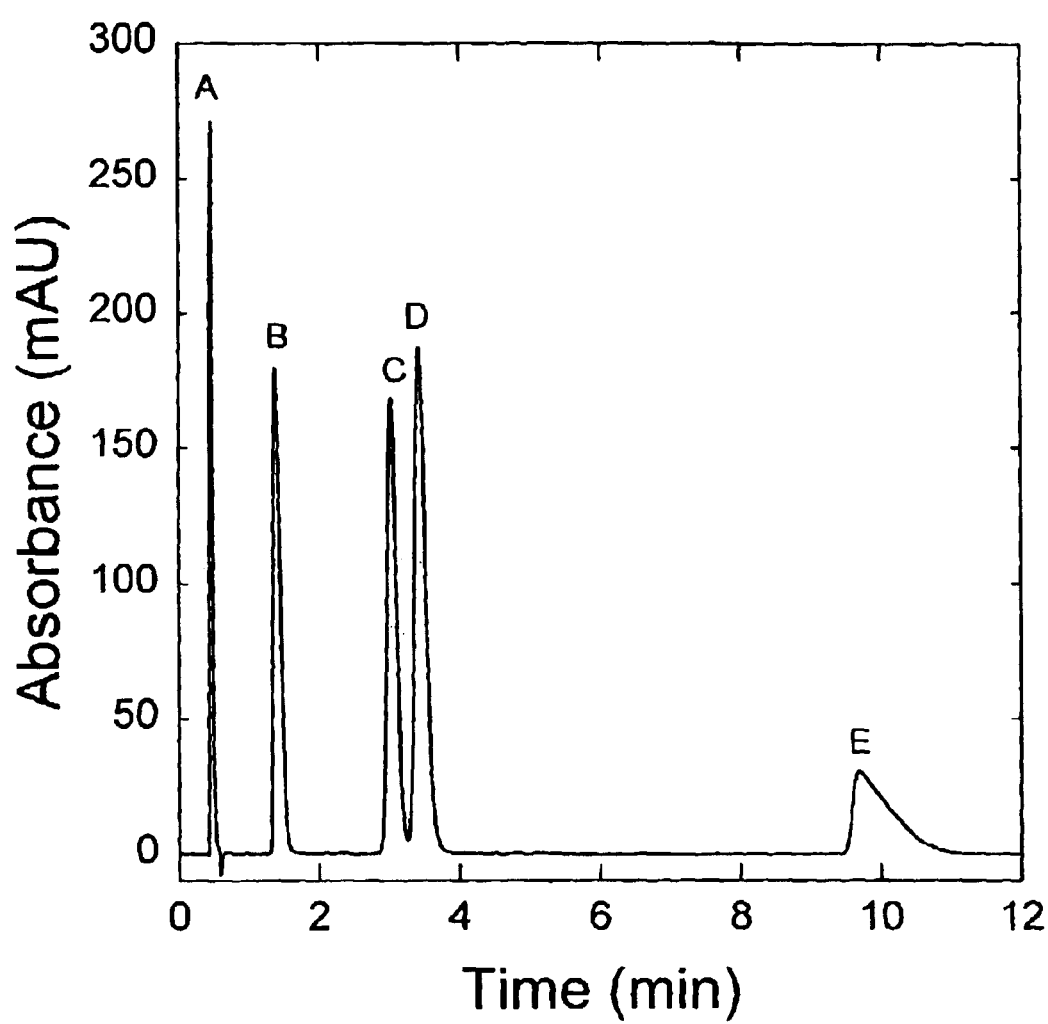
FIG. 11. Chromatogram showing the separation of basic drugs on sterically protected $C_{18}$. Solutes: A=Pyridine, B=Alprenolol, C=Nortriptyline, D=Amitriptyline, E=Meclizine. Mobile Phase: 35/65 1.0% TFA in ACN/1.0% TFA in $H_2O$, pH=1.0.

FIG. 11 shows the separation of select basic drugs at pH=1.0 on the sterically protected $C_{18}$ stationary phase (ZORBAX SB-C18 from Agilent). With the exception of meclizine, the peaks are reasonably symmetric. The sterically protected $C_{18}$ was chosen for two reasons. First, like the highly crosslinked styrene heptamer stationary phases described here, the sterically protected $C_{18}$ is not endcapped. Second, the sterically protected $C_{18}$ was synthesized on the exact same ZORBAX Type B silica particles as the commercial sterically protected $C_{18}$, thus eliminating any differences in silanophilicity that are attributable to the purity of the underlying silica.

Figure 12:
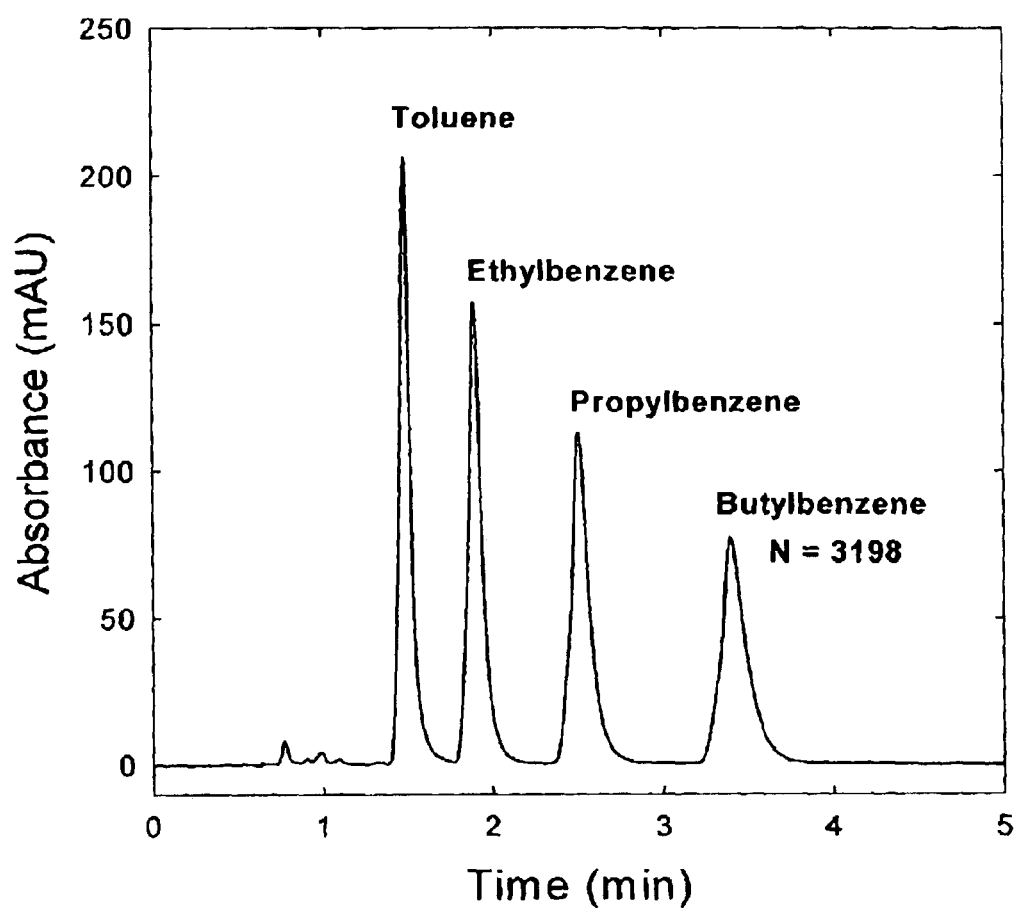
FIG. 12. Chromatogram showing the separation of alkylbenzenes on Styrene Heptamer Crosslinked CMPES (Example 3). Mobile phase: 58/42 ACN/Water. Flow Rate: 1.0 mL/min. Detection: 254 nm. Temperature: 50° C.
Figure 13:
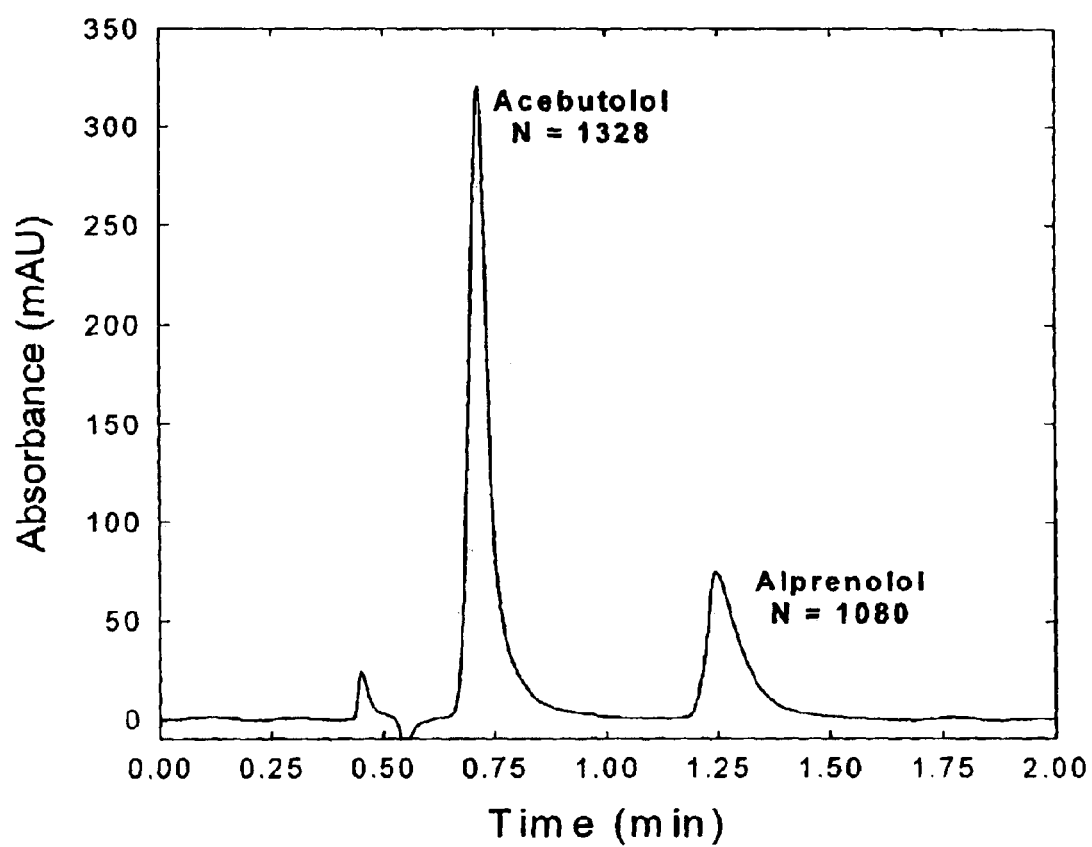
FIG. 13. Chromatogram showing the separation of β-blocker drugs on Styrene Heptamer Crosslinked CMPES (Example 3). Mobile phase: 40/60 ACN/5.0% (v/v) TFA. Flow Rate: 1.0 mL/min. Detection: 254 nm. Temperature: 50° C.

FIGS. 12 and 13 demonstrate good separation of alkyl benzenes (FIG. 12) and select drugs (FIG. 13) using the highly crosslinked styrene heptamer CMPES-SAM phase (Example 3), the peak shape is less than ideal. When the same drugs are used as those used for the chromatogram of FIG. 11, the U.S.P. tailing factors and the retention factors for the basic drugs are higher than for the commercial sterically protected $C_{18}$, which indicates that the highly crosslinked styrene heptamer CMPES-SAM phase is more silanophilic than the sterically protected $C_{18}$ stationary phase. In order to overcome the less than ideal chromatographic performance of the basic drugs on the highly crosslinked styrene heptamer CMPES-SAM stationary phase (Example 3), a highly crosslinked dialkyl analog of CMPES phase was developed, which cannot undergo any form of polysiloxane formation. Specifically, as described in Example 4, dimethylchloromethylphenylethyl silane (DM-CMPES) was covalently bonded to the silica. This silanization step is followed by Friedel-Crafts chemistry to obtain a highly crosslinked styrene heptamer DM-CMPES stationary phase.

Figure 14:
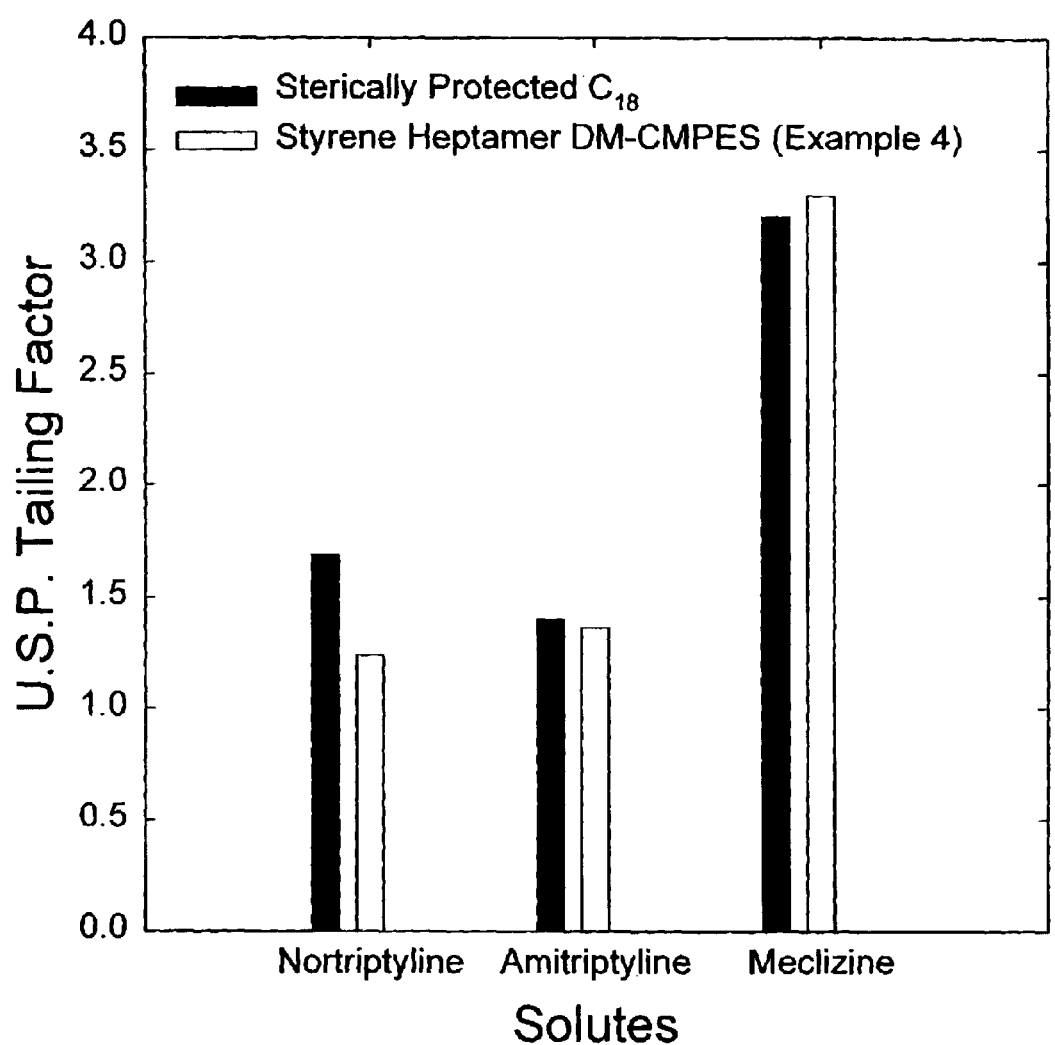
FIG. 14. Bar chart showing a comparison of U.S.P. tailing factors for select basic drugs at pH=2.0. Mobile Phase: 42/58 0.1% TFA in ACN/0.1% TFA in $H_2O$, pH=2.0.

In order to evaluate the silanophilicity of the highly crosslinked styrene heptamer DM-CMPES phase of Example 4, the mixture of drugs listed in FIG. 11 were separated. As shown in FIG. 14, the U.S.P. tailing factors for nortriptyline, amitriptyline, and meclizine are virtually identical on both the phases of Example 4 and the commercial sterically protected $C_{18}$ stationary phase at pH=2.0. Additionally, the retention factors for these solutes were in accordance with the difference in hydrophobicity of the phases. The highly crosslinked styrene heptamer DM-CMPES stationary phase of Example 4 provides both greatly enhanced acid stability and acceptable peak shapes for basic solutes.

Figure 16:
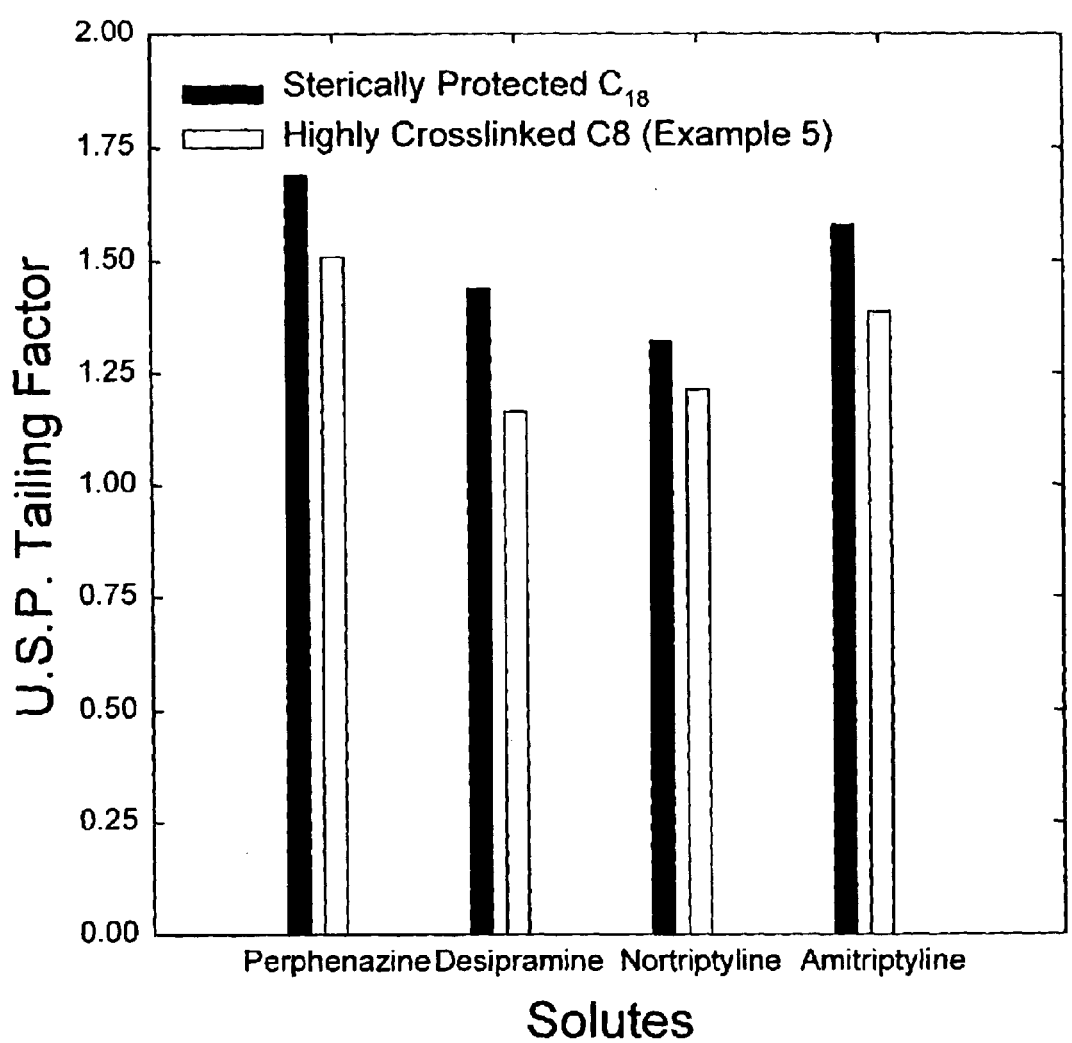
FIG. 16. Bar chart showing a comparison of U.S.P. tailing factors for select basic drugs at pH=2.0. All chromatographic conditions are identical to that used to generate the chromatograms of FIGS. 15A–B.

The separations of select basic solutes at pH=2.0 on commercial sterically protected $C_{18}$ stationary phase and the highly crosslinked $C_8$ stationary phase of Example 5 are shown in FIGS. 15A and 15B, respectively. The percentage of ACN in the mobile phase was decreased by 7% on the highly crosslinked $C_8$ phases to obtain similar retention factors, thus allowing for fair comparison of the basic drug peak shapes. Both phases gave acceptably symmetric peak shapes for the basic drugs. A more quantitative comparison of the phases is given in FIG. 16. As shown in FIG. 16, the U.S.P. tailing factors for all of the basic solutes are lower (less tailed) on the highly crosslinked $C_8$ phase compared to the sterically protected $C_{18}$. The improved peak shape is most likely due to the presence of embedded $CH_2OH$ groups in the stationary phase. It is likely that the embedded $CH_2OH$ groups are providing additional shielding of the silanol groups via hydrogen bonding, thus leading to lower U.S.P. tailing factors. Recently, several stationary phase manufacturers have developed "polar-embedded" phases which generally show additional silanol shielding resulting from hydrogen bonding interactions between a polar functionality (e.g., an embedded amide group) and the silanols on the surface. Polar embedded phases generally show improved peak shapes for basic drugs compared to a conventional alkyl bonded phase.

Figure 17:
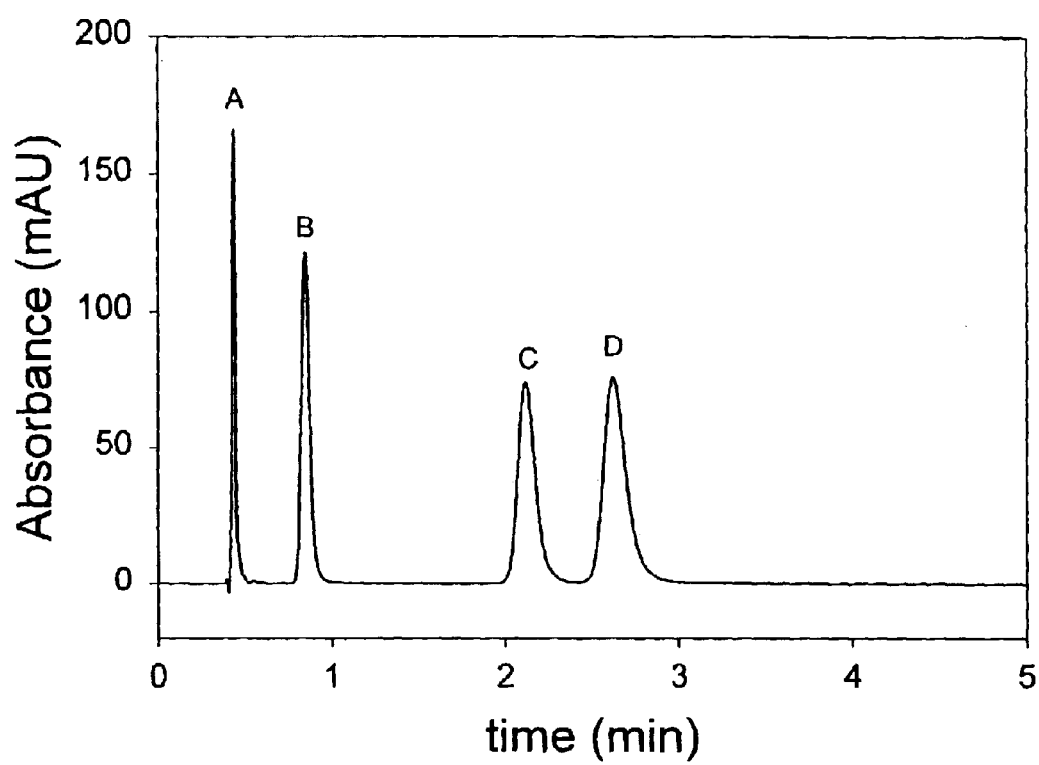
FIG. 17. Chromatogram showing the separation of basic drugs on highly crosslinked $C_8$ modified phase without residual chlorine based on highly crosslinked $C_8$ modified phase (Example 6). Solutes: A=Pyridine, B=Alprenolol, C=Nortriptyline, D=Amitriptyline. Mobile Phase: 67.95/32.05 0.1% TFA in ACN/0.1% TFA in $H_2O$, pH=2.0. Temperature: 35° C.
Figure 18:
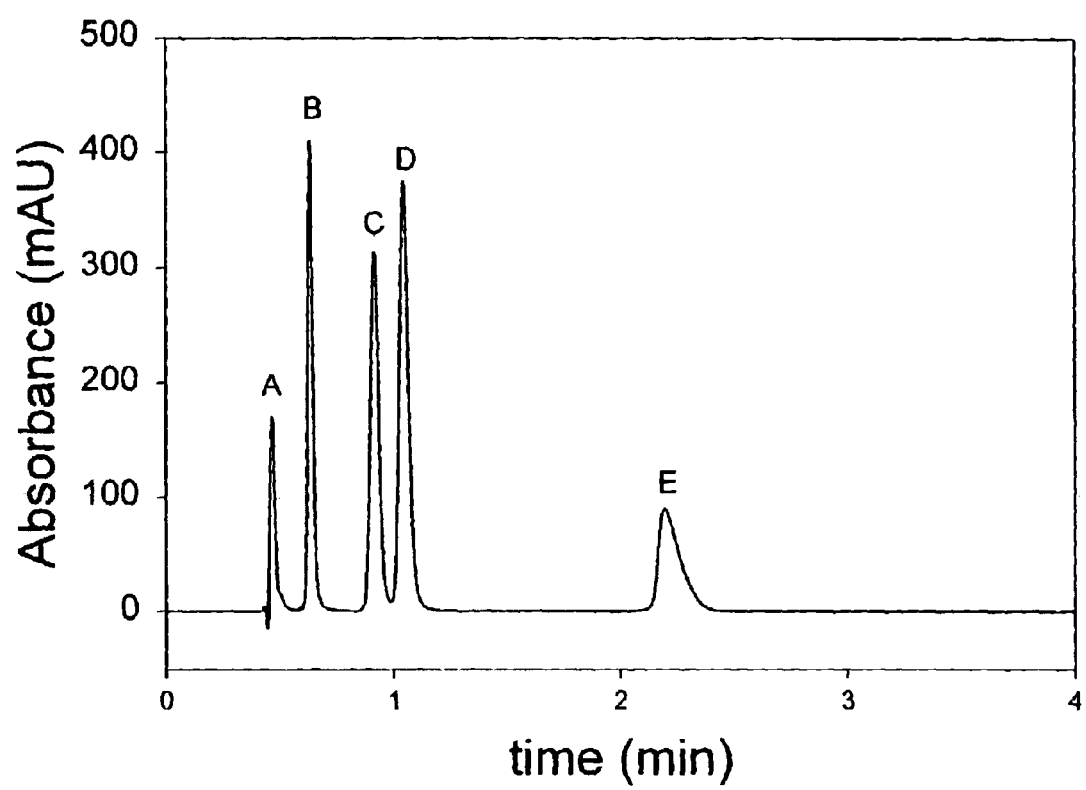
FIG. 18. Chromatogram showing the separation of basic drugs on highly crosslinked $C_8$ modified phase based on styrene heptamer TVS (Example 11). Solutes: A=Pyridine, B=Alprenolol, C=Nortriptyline, D=Amitriptyline, E=Meclizine. Mobile Phase: 41.94/58.06 0.1% TFA in ACN/0.1% TFA in $H_2O$, pH=2.0. Temperature: 35° C.

FIGS. 17 and 18 indicate chromatographic performance of the phases formed in Examples 6 and 11, respectively, which is quite comparable to the performance of the phase formed in Example 5. Thus, the very important class of compounds (organic bases) can be separated and analyzed on any of these phases. The chromatographic selectivities (band spacing) are different as expected based on differences in polarity. The highly crosslinked polyethyleneimine DM-CMPES phase (Example 8) was originally intended as an anion exchange phase and it does in fact act as a very efficient anion exchanger (see Table 11).

TABLE 11

| Solute | Retention Factor (k') | Plate Count (N) |
| --- | --- | --- |
| $NaNO_2$ | 12.62 ± 0.02 | 3352 ± 48 |
| $NaNO_3$ | 19.38 ± 0.03 | 398 ± 9 |
| $NaBrO_3$ | 7.11 ± 0.002 | 3508 ± 30 |
| $NaIO_3$ | 4.10 ± 0.001 | 4233 ± 45 |

[a]chromatography conditions: 100 mM NaAC, pH = 5, 35° C., 1 mL/min, 240 nm.

Figure 20:
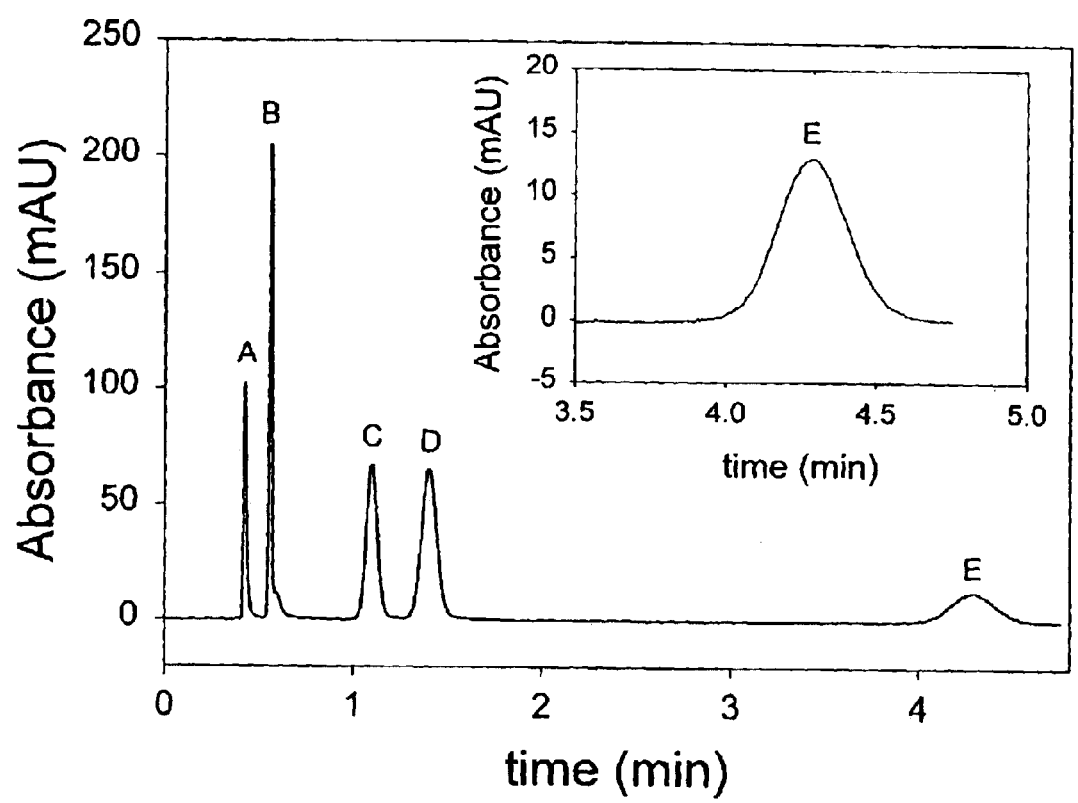
FIG. 20. Chromatogram showing the separation of basic drugs on highly crosslinked polyethyleneimine DM-CMPES phase (Example 8). Solutes: A=Pyridine, B=Alprenolol, C=Nortriptyline, D=Amitriptyline, E=Meclizine. Mobile Phase: 20/80 ACN/25 mM NaClO$_4$, 20 mM HClO$_4$. Temperature: 40° C.

However, somewhat surprisingly the material of Example 8 is also hydrophobic and it acts as a reversed phase stationary phase (see FIG. 19). The hydrophobicity is probably due to the presence of the ethylphenyl group in DM-CMPES. Given the surprisingly strong reversed phase character it is believed that the PEI crosslinked DM-CMPES phase could be made to act as a separation media for organic bases if its high positive charge which is responsible for the its anion exchange properties (see FIG. 20) could be cancelled out to allow positively charged organic bases to enter the pores. As shown in FIG. 20 excellent separations of organic bases are possible in perchlorate containing eluents. Furthermore these peaks are exceedingly symmetric and are far better than on the sterically protected C18 phase or any other of the highly crosslinked phases formed in this work. This is due to the fact that the amine groups in PEI act as permanently anchored silanol blocking agents.

HF Digest

Particles with a highly crosslinked C8 DM-CMPES phase, produced as described in Example 5, were subjected to the following HF digestion. A sample of 0.075 g of the particles was wet with 1 mL of methanol in a 50 mL polypropylene centrifuge tube under vacuum. To this was added 0.5 mL of 48% HF (ultra-high purity) and 5 mL of high purity water (resistance=18 M omega). The slurry was stirred and allowed to sit for at least 5 minutes. To this was added approximately 0.1 gram of boric acid in approximately 15 mL of high purity water (resistance=18 M omega) water to neutralize the residual HF. The residual particles were washed with an aliquot of 50 mL of 50/50 methanol/water and then the slurry was centrifuged at 3000 revolutions per minute (RPM) for 10 minutes. The supernatant was then removed from the centrifuge tube without loss of solids. The washing procedures were repeated four times. The particles were dried under vacuum at 80° C. for at least 8 hours. The before and after SEM pictures are shown in FIGS. 21A–B. This demonstrates that solid particles of pure polymer are left after all silica has been dissolved. This is conclusive proof that in this case a network polymer has been formed throughout the entire initial silica particle. This accounts for the extremely high acid stability (low loss of chromatographic retention) of the phases developed in this patent.

Retention Characterization of Highly Crosslinked $C_8$

Linear Solvent Strength Characterization

Figure 22:
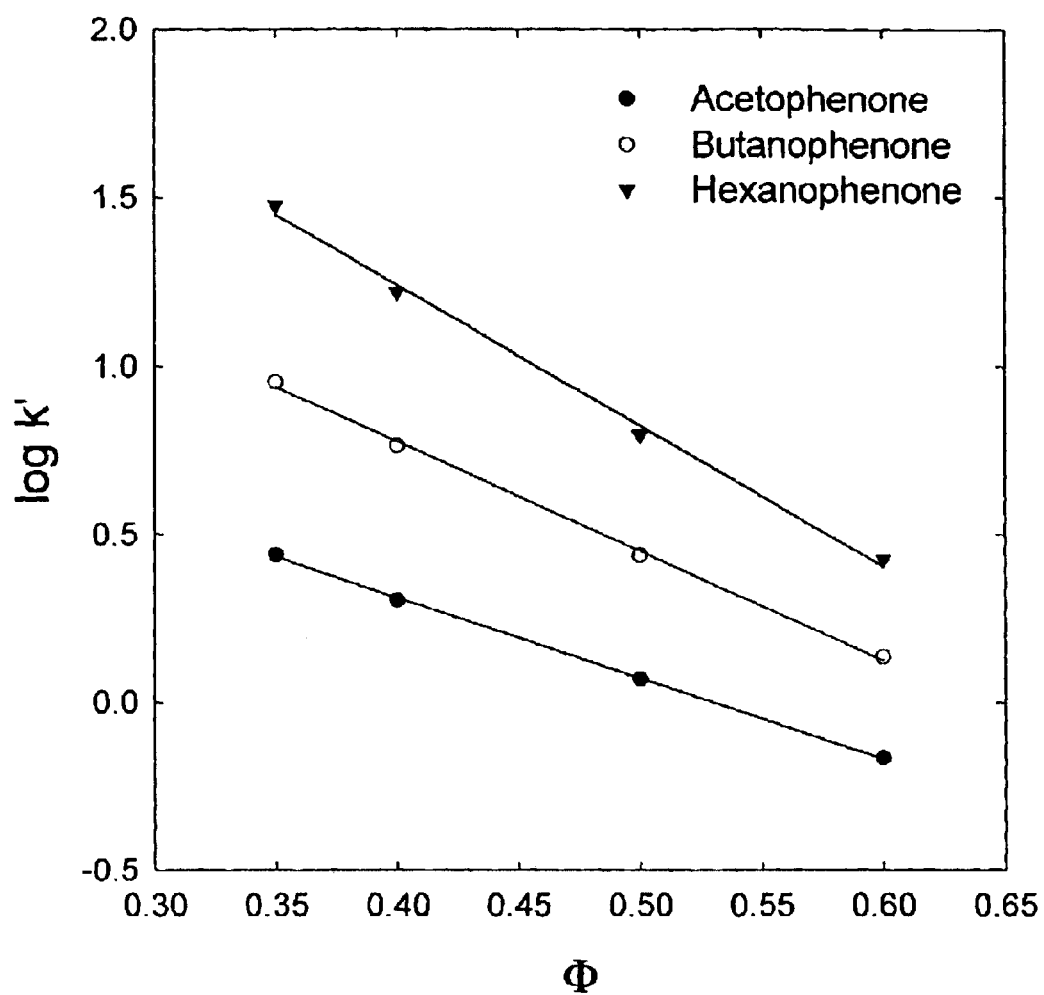
FIG. 22. Plot of linear solvent strength characterization of HC-C$_8$ (Example 5) using ACN/H$_2$O mobile phases. T=35° C.; Flow Rate=1.0 mL/min.

The linear relationship given below is often used to correlate the retention factor of a non-ionic solutes in RPLC with the volume fraction of organic modifier ($\phi$) in the mobile phase.

$$\log k' = \log k'_w - S\phi \quad (6)$$

where, $k'_w$ is the extrapolated retention of the non-ionic solute in 100% water and S is a solute specific parameter that controls the change in retention factor for a given change in $\phi$. It is important to remember that this relationship is only accurate (<1–2% deviation) over narrow ranges in $\phi$ ($\Delta\phi$= 0.20–0.25). A representative plot of log k' versus $\phi$ for alkylphenones on the highly crosslinked $C_8$ stationary phase of Example 5 is shown in FIG. 22.

Overall, the highly crosslinked $C_8$ phase behaves as a typical reversed phase material for non-ionic solutes. The value of the slope increases as the hydrophobicity of the solute increases in all three types of mobile phases. Additionally, the correlation coefficients are all above 0.995 indicating that the linear relationship given above adequately describes the retention data.

Energetics of Retention Characterization

Determining the free energy of transfer per methylene unit or the hydrophobic selectivity is a very important way to compare RPLC stationary phase. The magnitude of the calculated free energy of transfer per methylene unit quantitatively allows a direct comparison of the hydrophobicity of a set of stationary phases. The relationship used to calculate the free energy of transfer per methylene unit for a homologous series of solutes is called the Martin equation. The equation is given below:

$$\log k' = A + Bn_{CH2} \quad (7)$$

Linear regression of log k' versus $n_{CH2}$ plots allows the free energy of transfer per methylene unit to be calculated from the slope, B. The equation used to calculate the free energy of transfer per methylene unit is given below:

$$\Delta G°_{CH2} = -2.3RTB \quad (8)$$

Figure 23:
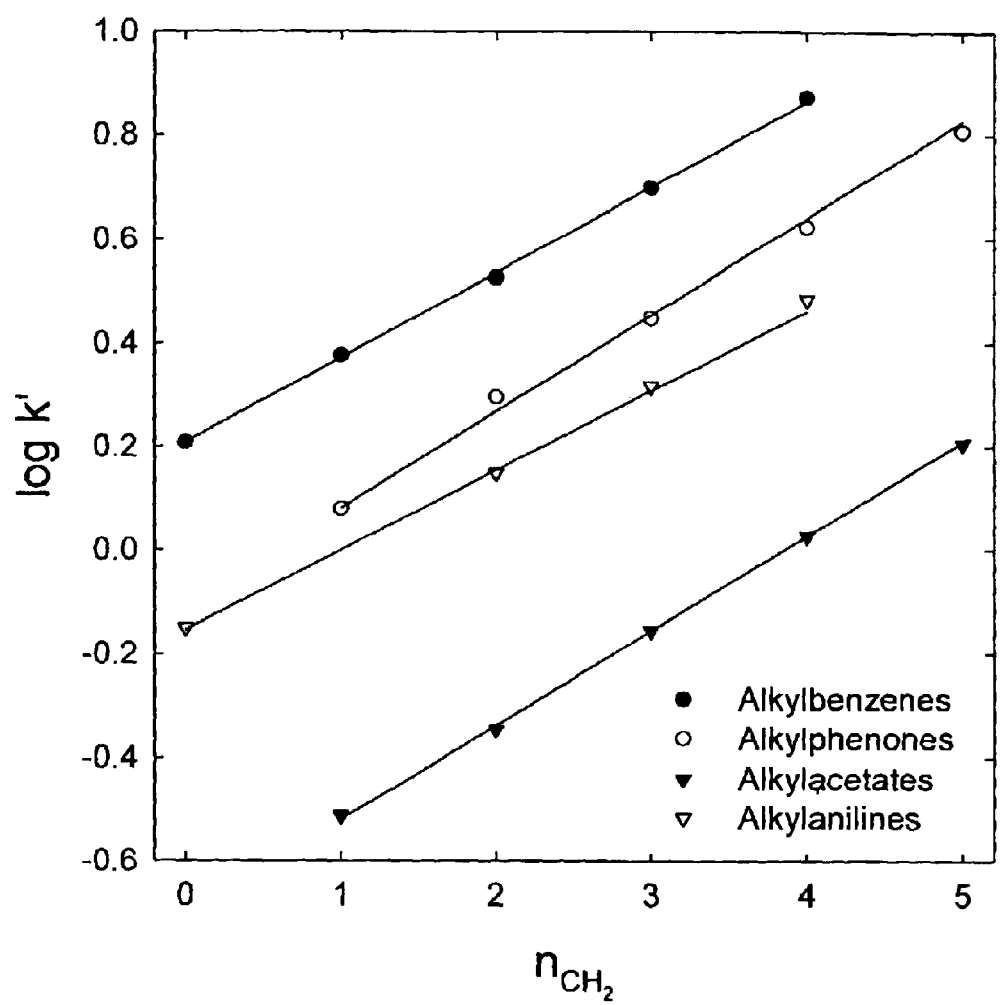
FIG. 23. Plot of log k' versus n$_{CH2}$ for four homologous series on HC-C$_8$ (Example 5). Mobile Phase: 50/50 ACN/H$_2$O; T=35° C.; Flow Rate=1.0 mL/min.

The log k' versus $n_{CH2}$ plots for four homologous series and the calculated $\Delta G°_{CH2}$ data for the highly crosslinked $C_8$ (material of Example 5) are given in FIG. 23. For all of the homologous series tested, the highly crosslinked $C_8$ phase of Example 5 is more retentive than a phenyl stationary phase. This result is not very surprising since the highly crosslinked $C_8$ phase has both phenyl and alkyl moieties in the stationary phase. Additionally, the highly crosslinked $C_8$ stationary phase is less retentive than the highly aromatic PRP-1 phase. Once again, this is not surprising. Since the PRP-1 phase is an entirely aromatic polymeric particle, it has a drastically higher amount of phenyl rings across its surface than the highly crosslinked $C_8$ phase, thus leading to a more favorable free energy of transfer per methylene unit.

The highly crosslinked $C_8$ stationary phase is substantially more stable than the sterically protected $C_{18}$ stationary phase under very aggressive acid aging. The peak shapes for basic solutes are equivalent or better on the highly crosslinked $C_8$ phase compared to a sterically protected $C_{18}$. Inverse size exclusion chromatography and van Deemter flow curve analysis shows no pore blockage and acceptable A and C terms respectively. The calculated free energy of transfer per methylene unit indicates that the highly crosslinked $C_8$ is less retentive than a conventional $C_{18}$ phase, but more retentive than a conventional phenyl phase. Additionally, the highly crosslinked $C_8$ phase offers unique selectivity for positional isomers, electron acceptor solutes and the 22 non-electrolyte solutes evaluated.

The complete disclosure of all patents, patent documents, and publications cited herein are incorporated by reference, as if individually incorporated. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

What is claimed is:

1. A silica-based material comprising a silica-based substrate and an in situ polymerized organic material disposed thereon, wherein the polymerized organic material is made by a method comprising providing a monolayer comprising reactive organic monomeric moieties bonded to the silica-based substrate, and crosslinking the reactive organic moieties with a reactive crosslinking agent having reactive functionality that is orthogonal to the reactive functionality of the reactive organic moieties; and
   further wherein the polymerized organic material forms a crosslinked network that conforms to the surface of the silica-based substrate.

2. The material of claim 1 wherein the polymerized organic material is bonded to the silica-based substrate.

3. The material of claim 1 wherein the reactive organic moieties form a self-assembled monolayer of a polymerizable material bonded to the silica-based substrate.

4. The material of claim 1 wherein the reactive organic moieties form a monomolecular monolayer of a polymerizable material bonded to the silica-based substrate.

5. The material of claim 1 wherein the silica-based material is stable under acidic conditions.

6. The material of claim 5, wherein the silica-based material is stable at a temperature of up to 150° C. and within a pH range of less than 7 down to 0.5.

7. The material of claim 1 wherein the silica-based substrate comprises particulate material.

8. The material of claim 7 wherein the particulate material comprises a silica gel.

9. The material of claim 1 wherein the silica-based substrate comprises pores and the polymerized organic material conforms to the surfaces of the pores.

10. The material of claim 1 wherein the reactive organic moieties comprise organosilane molecules bonded to the silica-based substrate.

11. The material of claim 10 wherein the reactive organic moieties are derived from an organosilane selected from the group consisting of a halosilane, an alkoxysilane, an unsaturated silane, a hydrosilane, a disilazane, a cyclic siloxane, an aminosilane, a carboxylic-functional silane, an epoxysilane, and combinations thereof.

12. The material of claim 11 wherein the organosilane is a chlorosilane.

13. A silica-based material comprising a silica-based substrate and an in situ polymerized organic material disposed thereon, wherein the polymerized organic material is made from reactive organic moieties bonded to the silica-based substrate, and further wherein the reactive organic moieties are derived from chloromethylphenylethyltrichlorosilane or dimethylchloromethylphenylethylchlorosilane.

14. The material of claim 11 wherein organosilane is trivinylchlorosilane.

15. The material of claim 13 wherein the polymerized organic material is polymerized by self-condensation of the reactive organic moieties.

16. The material of claim 13 wherein the polymerized organic material is made by crosslinking the reactive organic moieties with a reactive crosslinking agent.

17. The material of claim 1 wherein the reactive crosslinking agent is an unsaturated hydrocarbon.

18. The material of claim 1 wherein the polymerized organic material has a surface density of at least 2.0 micromoles/$m^2$.

19. A silica-based material comprising a silica-based substrate and an in situ polymerized organic material bonded to the silica-based substrate, wherein the polymerized organic material forms a crosslinked network that conforms to the surface of the silica-based substrate, wherein the silica-based material is stable at a pH of less than 7, with the proviso that there is substantially no residual non-crosslinked organic polymer disposed on the silica-based substrate; and further wherein the polymerized organic material is made by a method comprising providing a monolayer comprising reactive organic monomeric moieties bonded to the silica-based substrate, and crosslinking the reactive organic moieties with a reactive crosslinking agent having reactive functionality that is orthogonal to the reactive functionality of the reactive organic moieties.

20. The material of claim 19 wherein the polymerized organic material has a surface density of at least 2.0 micromoles/$m^2$.

21. The material of claim 19 wherein the silica-based substrate comprises pores and the polymerized organic material conforms to the surfaces of the pores.

22. The material of claim 19 wherein the polymerized organic material is made by crosslinking polymerizable material bonded to the silica-based substrate with at least two reactive crosslinking agents.

23. The material of claim 19 wherein the silica-based material is stable at a pH of 0.5 at 150° C.

24. The material of claim 19 wherein the silica-based material comprises a silica gel.

25. A silica-based material comprising a silica-based core comprising pores and a network of crosslinked organic material bonded to the silica-based core and conforming to the surfaces of the pores, wherein the network of crosslinked organic material is made by crosslinking reactive organic moieties with at least two different sequentially applied crosslinking chemistries, wherein the crosslinking chemistries have reactive functionality that is orthogonal to the reactive functionality of the reactive organic moieties.

26. The material of claim 25 wherein the silica-based material is stable at a temperature of 150° C. and a pH of less than 7.

27. The material of claim 25 wherein the network of crosslinked organic material comprises octyl groups.

28. The material of claim 25 wherein the silica-based material is stable under acidic conditions and has a surface density of at least 2.0 micromoles/m$^2$.

29. A silica-based material preparable by a method comprising: providing a silica-based substrate comprising a monolayer comprising reactive organic monomeric moieties; and causing the reactive organic monomeric moieties to react with themselves and at least two sequentially applied reactive crosslinking agents to form a polymerized organic material conformably disposed on the silica based substrate, wherein the crosslinking agents have reactive functionality that is orthogonal to the reactive functionality of the reactive organic moieties.

30. The silica-based material of claim 29 wherein the silica-based material is stable at a temperature of 150° C. and a pH of less than 7.

31. The silica-based material of claim 29 wherein the silica-based substrate comprising reactive organic moieties is formed by reacting a silica-based substrate with an organosilane comprising reactive organic moieties.

32. The silica-based material of claim 29 wherein the reactive organic moieties are formed during a process of forming the silica-based substrate.

33. A method of preparing a silica-based material, the method comprising:
    providing a silica-based substrate comprising a monolayer comprising reactive organic monomeric moieties; and
    causing the reactive organic monomeric moieties to react with a reactive crosslinking agent to form a polymerized organic material conformably disposed on the silica-based substrate, wherein the crosslinking agent has reactive functionality that is orthogonal to the reactive functionality of the reactive organic moieties.

34. The method of claim 33 further comprising a step of combining the polymerized material with a different reactive crosslinking agent to form a crosslinked network of polymerized organic material.

35. The method of claim 33 wherein the silica-based substrate comprising reactive organic moieties is formed by reacting a silica-based substrate with an organosilane comprising reactive organic moieties.

36. The method of claim 33 wherein the reactive organic moieties are formed during a process of forming the silica-based substrate.

37. A method of preparing a silica-based material, the method comprising:
    providing a silica-based substrate and an organosilane comprising reactive organic moieties;
    reacting the silica-based substrate with the organosilane to provide a monolayer comprising reactive organic monomeric moieties bonded to the silica-based substrate; and
    causing the reactive organic monomeric moieties to react with a reactive crosslinking agent to form a polymerized organic material conformably bonded to the silica-based substrate with substantially no residual non-crosslinked organic polymer, wherein the crosslinking agent has reactive functionality that is orthogonal to the reactive functionality of the reactive organic moieties.

38. A method of preparing an acid-stable silica-based material, the method comprising:
    providing a silica-based substrate and an organosilane comprising reactive organic moieties;
    bonding the organosilane to the silica-based substrate to provide a monolayer comprising reactive organic monomeric moieties bonded to the silica-based substrate; and
    crosslinking the reactive organic moieties of the organosilane bonded to the silica-based substrate with a reactive crosslinking agent to form an acid-stable silica-based material comprising a silica-based substrate and a polymerized organosilane material conformably disposed on the silica-based substrate, wherein the crosslinking agent has reactive functionality that is orthogonal to the reactive functionality of the reactive organic moieties.

39. The method of claim 38 wherein the silica-based material is stable at a temperature of up to 150° C. and within a pH range of less than 7 down to 0.5.

40. The method of claim 38 wherein the silica-based material comprises particulate material.

41. The method of claim 40 wherein the particulate material comprises a silica gel.

42. The method of claim 38 wherein the organosilane is selected from the group consisting of a halosilane, an alkoxysilane, an unsaturated silane, a hydrosilane, a disilazane, a cyclic siloxane, an aminosilane, a carboxylic-functional silane, an epoxysilane, and combinations thereof.

43. The method of claim 42 wherein the organosilane is a chlorosilane.

44. A method of preparing an acid-stable silica-based material, the method comprising:
    providing a silica-based substrate and an organosilane comprising reactive organic moieties;
    bonding the organosilane to the silica-based substrate; and
    polymerizing the organosilane bonded to the silica-based substrate to form an acid-stable silica-based material comprising a silica-based substrate and a polymerized organosilane material disposed on the silica-based substrate;
    wherein the organosilane is chloromethylphenylethyltrichlorosilane or dimethylchloromethylphenylethylchlorosilane.

45. The method of claim 42 wherein the organosilane is trivinylchlorosilane.

46. The method of claim 38 wherein polymerizing comprises self-condensing the reactive organic moieties of the organosilane.

47. A method of preparing an acid-stable silica-based material, the method comprising:
    providing a silica-based substrate and an organosilane comprising reactive organic moieties;
    bonding the organosilane to the silica-based substrate; and
    polymerizing the organosilane bonded to the silica-based substrate to form an acid-stable silica-based material comprising a silica-based substrate and a polymerized organosilane material disposed on the silica-based substrate;
    wherein polymerizing comprises self-condensing the reactive organic moieties of the organosilane using a self-condensation Friedel-Crafts reaction.

48. The method of claim 38 wherein crosslinking comprises crosslinking reactive organic moieties of the organosilane with at least two reactive crosslinking agents.

49. The method of claim 48 wherein the reactive crosslinking agent is an unsaturated hydrocarbon.

50. A method of preparing an acid-stable silica-based material, the method comprising:
providing a silica-based substrate and an organosilane comprising reactive organic moieties;
bonding the organosilane to the silica-based substrate; and
polymerizing the organosilane bonded to the silica-based substrate to form an acid-stable silica-based material comprising a silica-based substrate and a polymerized organosilane material disposed on the silica-based substrate;
wherein polymerizing comprises crosslinking reactive organic moieties of the organosilane with an unsaturated hydrocarbon using a Friedel-Crafts reaction.

51. A method of preparing an acid-stable silica-based material, the method comprising:
providing a silica-based substrate and an organosilane comprising reactive organic moieties;
bonding the organosilane to the silica-based substrate; and
polymerizing the organosilane bonded to the silica-based substrate to form an acid-stable silica-based material comprising a silica-based substrate and a polymerized organosilane material disposed on the silica-based substrate;
wherein polymerizing comprises crosslinking reactive organic moieties of the organosilane with a secondary reactive crosslinking agent, and further wherein the secondary, reactive crosslinking agent comprises a polyvalent nucleophilic reagent.

52. The method of claim 51 wherein the polyvalent nucleophilic reagent is selected from the group consisting of a polyethyleneimine, a triamine, a polyvinylamine, a polyvinylalcohol, a diol, a triol, a higher polyol, a dithiol, a trithiol, and combinations thereof.

53. A method of preparing an acid-stable silica-based material, the method comprising:
providing a silica-based substrate and an organosilane comprising reactive organic moieties;
bonding the organosilane to the silica-based substrate; and
polymerizing the organosilane bonded to the silica-based substrate to form an acid-stable silica-based material comprising a silica-based substrate and a polymerized organosilane material disposed on the silica-based substrate;
wherein polymerizing comprises crosslinking reactive organic moieties of the organosilane with a secondary, reactive, crosslinking agent; and further
wherein the secondary, reactive crosslinking agent comprises a polyvalent electrophilic reagent.

54. A method of preparing an acid-stable silica-based material, the method comprising:
providing a silica-based substrate and an organosilane comprising reactive organic moieties;
bonding the organosilane to the silica-based substrate; and
polymerizing the organosilane bonded to the silica-based substrate using a Friedel-Crafts reaction to form an acid-stable silica-based material comprising a silica-based substrate and a polymerized organosilane material disposed on the silica-based substrate.

55. The method of claim 54 wherein polymerizing comprises self-condensing the reactive organic moieties of the organosilane using a self-condensation Friedel-Crafts reaction.

56. The method of claim 54 wherein polymerizing comprises crosslinking the reactive organic moieties of the organosilane with a secondary, reactive, crosslinking agent using a Friedel-Crafts reaction.

57. The method of claim 56 wherein the secondary, reactive, crosslinking agent is an unsaturated hydrocarbon.

58. The method of claim 57 wherein the unsaturated hydrocarbon is an aromatic hydrocarbon.

59. The method of claim 58 wherein the aromatic hydrocarbon is selected from the group consisting of triphenylmethane, diphenylmethane, oligomers of styrene, biphenyl, terphenyl, naphthalene, anthracene, alkylated derivatives thereof, and combinations thereof.

60. The method of claim 54 further comprising adding $CH_3OCH_2Cl$ to the polymerized organosilane material bonded to the silica-based substrate.

61. The method of claim 60 further comprising adding water subsequent to adding the $CH_3OCH_2Cl$.

62. The method of claim 54 further comprising reacting the polymerized organosilane material disposed on the silica-based substrate with a nucleophilic reagent.

63. The method of claim 62 wherein the nucleophilic reagent is selected from the group consisting of benzene, toluene, octylbenzene, 1-hexene, and combinations thereof.

64. The method of claim 63 further comprising adding water subsequent to adding the nucleophilic reagent.

65. The method of claim 54 wherein the organosilane is selected from the group consisting of a halosilane, an alkoxysilane, an unsaturated silane, a hydrosilane, a disilazane, a cyclic siloxane, an aminosilane, a carboxylic-functional silane, an epoxysilane, and combinations thereof.

66. The method of claim 65 wherein the organosilane is a chlorosilane.

67. The method of claim 66 wherein the chlorosilane is chloromethylphenylethyltrichlorosilane or dimethylchloromethylphenylethylchlorosilane.

68. The method of claim 65 wherein the organosilane is trivinylchlorosilane.

69. A method of forming an acid-stable silica-based material, the method comprising:
providing a silica-based substrate and an organosilane comprising reactive organic moieties;
bonding the organosilane to the silica-based substrate; and
polymerizing the organosilane bonded to the silica-based substrate to form an acid-stable silica-based material comprising a silica-based substrate and a polymerized organosilane material disposed on the substrate;
wherein polymerizing comprises combining the organosilane bonded to the silica-based substrate with a polyvalent nucleophilic reagent.

70. The method of claim 69 wherein the polyvalent nucleophilic reagent is selected from the group consisting of a polyethyleneimine, a triamine, a polyvinylamine, a polyvinylalcohol, a diol, a triol, a higher polyol, a dithiol, a trithiol, and combinations thereof.

71. The method of claim 70 wherein the polyvalent nucleophilic reagent is a polyethyleneimine.

72. The method of claim 69 wherein the organosilane is selected from the group consisting of a halosilane, an alkoxysilane, an unsaturated silane, a hydrosilane, a disilazane, a cyclic siloxane, an aminosilane, a carboxylic-functional silane, an epoxysilane, and combinations thereof.

73. The method of claim 65 wherein the organosilane is chloromethylphenylethyltrichlorosilane, dimethylchloromethylphenylethylchlorosilane, or trivinylchlorosilane.

74. A silica-based material comprising a silica-based substrate and an in situ polymerized organic material bonded to the silica-based substrate, wherein the polymerized organic material forms a crosslinked network that conforms to the surface of the silica-based substrate, wherein the silica-based material is stable at a temperature of 150° C., with the proviso that there is substantially no residual uncrosslinked organic polymer disposed on the silica-based substrate, and further wherein the polymerized organic material is made by a method comprising providing a monolayer comprising reactive organic monomeric moieties bonded to the silica-based substrate, and crosslinking the reactive organic moieties with a reactive crosslinking agent having reactive functionality that is orthogonal to the reactive functionality of the reactive organic moieties.

75. The material of claim 74 wherein the silica-based material is stable under acidic conditions and has a surface density of at least 1.0 micromoles/m$^2$.

* * * * *